United States Patent
Rapp, III

(10) Patent No.: US 7,079,906 B2
(45) Date of Patent: **\*Jul. 18, 2006**

(54) PAPERLESS TABLET AUTOMATION APPARATUS AND METHOD

(76) Inventor: Roy W. Rapp, III, 2494 Leonard Rd., Martinsville, IN (US) 46151

( * ) Notice: Subject to any disclaimer, the term of this patent is extended or adjusted under 35 U.S.C. 154(b) by 0 days.

This patent is subject to a terminal disclaimer.

(21) Appl. No.: 10/639,565

(22) Filed: Aug. 12, 2003

(65) Prior Publication Data

US 2004/0117233 A1    Jun. 17, 2004

Related U.S. Application Data

(60) Division of application No. 09/724,115, filed on Nov. 28, 2000, now abandoned, which is a continuation-in-part of application No. 09/478,251, filed on Jan. 6, 2000, now Pat. No. 6,400,997.

(51) Int. Cl.
G06F 19/00 (2006.01)
G06F 11/34 (2006.01)
G07C 1/10 (2006.01)

(52) U.S. Cl. .............................. 700/96; 705/11; 705/32

(58) Field of Classification Search ................. 700/83, 700/96, 111, 108, 109; 340/825; 705/11, 705/32

See application file for complete search history.

(56) References Cited

U.S. PATENT DOCUMENTS

| | | | |
|---|---|---|---|
| 4,380,796 A | 4/1983 | Ostby | |
| 4,716,542 A | 12/1987 | Peltz | |
| 5,068,787 A | 11/1991 | Pipella et al. | |
| 5,212,635 A | 5/1993 | Ferriter | |
| 5,266,780 A | 11/1993 | Kamata et al. | |
| 5,309,351 A | 5/1994 | McCain et al. | |
| 5,367,624 A | 11/1994 | Cooper | |
| 5,508,911 A | 4/1996 | Vanko et al. | |
| 5,579,231 A * | 11/1996 | Sudou et al. | 700/95 |
| 5,631,825 A | 5/1997 | Van Weele et al. | |
| 5,650,940 A | 7/1997 | Tonozuka et al. | |
| 5,682,476 A | 10/1997 | Tapperson et al. | |

(Continued)

FOREIGN PATENT DOCUMENTS

WO    WO96/21203    7/1996

(Continued)

OTHER PUBLICATIONS

EPIC (Electronic Portable Information Collection System), http://science.ksc.nasa.gov/payload/projects/qapdc/, Rev. Aug.-Sep. 1998 (3 pgs.).

(Continued)

Primary Examiner—Leo Picard
Assistant Examiner—Ryan A. Jarrett
(74) Attorney, Agent, or Firm—Bose McKinney & Evans LLP

(57) ABSTRACT

A factory floor tablet automation system enables the storing, collecting and processing manufacturing data generated at one or more facilities during manufacturing, and making manufacturing data accessible from the one or more facilities. A local processor is located at each facility, and a plurality of portable tablet devices are located in each facility. One or more transceivers located throughout each facility, each transceiver being connected to the local processor in each facility. The plurality of portable tablet devices is in wireless communication with the local processor through the transceivers and the tablet antennas. A server computer having a processor unit and storage device is connected to local processors through a network.

19 Claims, 49 Drawing Sheets

U.S. PATENT DOCUMENTS

| | | | |
|---|---|---|---|
| 5,717,867 A * | 2/1998 | Wynn et al. | 705/32 |
| 5,842,181 A | 11/1998 | Fanjoy | |
| 5,854,994 A | 12/1998 | Canada et al. | |
| 5,864,784 A | 1/1999 | Brayton et al. | |
| 5,877,961 A | 3/1999 | Moore | |
| 5,907,491 A | 5/1999 | Canada et al. | |
| 5,909,672 A | 6/1999 | Madore et al. | |
| 5,933,353 A | 8/1999 | Abriam et al. | |
| 6,073,058 A | 6/2000 | Cossen et al. | |
| 6,088,625 A * | 7/2000 | Kellstrom, Jr. | 700/97 |
| 6,108,727 A | 8/2000 | Boals et al. | |
| 6,167,464 A | 12/2000 | Kretschmann | |
| 6,188,402 B1 | 2/2001 | Csipkes et al. | |

FOREIGN PATENT DOCUMENTS

| | | |
|---|---|---|
| WO | WO96/27171 | 9/1996 |

OTHER PUBLICATIONS

Design of Electronic Portable Information Collection (EPIC) System to Execute Work Procedures by John Lekki et al., 1998 (5 pgs.).

EPIC (Darcy Miller) presentation, 1998 (13 pgs.).

Software for Network Processing of Work Orders, date unknown, http://www.nasatech.com/Briefs/Feb02/KSC12172.html (2 pgs.).

Going Paperless, Commercial Benefits—Spinoffs, date unkown, http://www.sti.nasa.gov/tto/spinoff1999/ct6.htm (2 pgs.).

Fact Sheet, Sentel Commercializes NASA Information Collection System, date unknown, http://technology.ksc.nasa.gov/WWWaccess/Stories/Facts/EPICfactsheet.pdf (5 pgs.).

Potential for Paperless Payload Processing, *Aerospace Technology Innovation* vol. 6, No. 4, Jul./Aug. 1998, http://nctn.hq.nasa.gov/innovation/Innovation64/sbir.htm (3 pgs.).

"Screen Shots for Product Demonstration", date unknown, http://www.realtrac.com/REALTRACdemo.htm.

"REALTRAC Offers Expanded Data Report Capabilities", Jul. 15, 1999, http://www.realtrac.com/pr-2.htm.

"Precision Metal Fabricator Increases On Time Delivery With Shop Control Software and Improved Workflow", Modern Machine Shop ,Dec. 1999 Issue, http://www.realtrac.com/mm-online.htm.

"REALTRAC Announces Enhanced Bill of Material Function", Sep. 10, 1999, http://www.realtrac.com/pr-bom.htm.

"REALTRAC Offers Quick Start Implementation Program", Jan. 4, 2000, http://www.realtrac.com/pr-qs.htm.

Paperless Manufacturing for IC Assembly. Ram, S. N. and Wang, S.T., ASIC, Motorola, Inc., O-7803-0630-5/92, IEEE, 1992.

* cited by examiner

PAPERLESS TABLET AUTOMATION APPARATUS AND METHOD

CROSS-REFERENCE TO RELATED APPLICATIONS

This is a divisional of U.S. patent application Ser. No. 09/724,115, filed Nov. 28, 2000 now abandoned, which is a continuation-in-part of U.S. patent application Ser. No. 09/478,251, filed Jan. 6, 2000, now U.S. Pat. No. 6,400,997, the disclosures of which are expressly incorporated herein by reference.

FIELD OF THE INVENTION

The present invention is related to apparatus and methods for factory automation and tracking. In particular, the present invention is directed to a factory automation apparatus which includes a plurality of portable tablets and an automation server in wireless communication, and the software for implementing a paperless factory automation system with that apparatus.

BACKGROUND OF THE INVENTION

Facilities which machine custom parts are traditionally managed with a variety of paper systems. For example, time records are kept on time cards which need to be gathered and analyzed. Component drawings for a given job are created on large sheets of paper and provide the necessary dimensional and manufacturing requirements for the job. Other examples include manufacturing orders, manufacturing instructions, statistical process control (SPC) data sheets and yellow tag or discrepant component data sheets. Each of these paper systems require manpower to gather and analyze the data and physical space to store and archive the various papers.

Additionally, the nature of the paper system is susceptible to lost information, incorrect information, and information recorded in disparate documents which are not readily available to the person needing the information. Papers can be misplaced or information transcribed incorrectly. Paper systems also significantly delay responses to customer inquires because the manager must determine who is working on the job, either seek out that person or check a job board for status and sometimes determine additional information, such as why a job is suspended. The potential also exists that the information located on the job board is not current.

Therefore, a need exists for a system that can move beyond the traditional paper management systems and allow employees to enter all types of data into an easily accessible system that collects, processes and stores the data in a central location which is also easily accessible from various locations within or remote from the facility. The system needs to collect and compile employee data, such as time records, location and current assignments; and job information, such as schedules, current status and supporting documentation. The system also needs to enable managers the capability to instantly view the employee and job information so that the manager can respond to customer inquires and can quickly reallocate resources to meet scheduling requirements.

SUMMARY OF THE INVENTION

The present invention is directed to an apparatus and method for a paperless factory automation system. The apparatus of the paperless factory automation system includes a plurality of portable tablets used by operators, a central automation server in wireless communication with the tablets. The method collects, processes and stores information for a plurality of jobs being performed by a plurality of operators in a facility.

The factory floor tablet automation system collects, stores and processes manufacturing data generated throughout a facility during manufacturing, and makes the manufacturing data accessible from various locations throughout the facility. The factory floor tablet automation system includes a server computer, multiple portable tablet devices, and one or more transceivers. The server computer has a processor unit and storage device, and maintains a plurality of databases including a job assignment database, an operator assignment database, a job description database, a drawing repository, a process control database, and a time keeping database. Each of the multiple portable tablet devices has a processor unit, a memory device, a display screen, an input/output device and a tablet antenna. The transceivers are located throughout the facility and each transceiver is connected to the server computer. The plurality of portable tablet devices is in wireless communication with the server computer through the transceivers and the tablet antennas. A job is assigned to an operator in the facility and one of the portable tablet devices is allocated to the operator. The operator accesses and receives information from the server computer and the storage device through the allocated portable tablet device. The server computer receives, stores and processes information from the operator through the allocated portable tablet device for tracking the status of the job and for tracking time allocation of the operator.

The factory floor tablet automation system can also include a command center which has a processor unit, a display device, and an input device. The command center communicates with the server computer, and is used to populate and retrieve data from the databases stored on the central server, and to determine job status and operator time allocation. A bar code printer and a bar code reader can be connected to the command center. The bar code reader communicates with the server computer, and the command center prints a job bar code for each job using the bar code printer. The operator acknowledges receipt of the job by scanning the job bar code with the bar code reader and inputting an operator identifier. The server computer associates the job with the operator that scanned the job bar code.

The factory floor tablet automation system can also include a discrepant material report station having a processor unit, a display device, and an input device. The discrepant material report station communicates with the server computer. Discrepant material reports that identify discrepant materials or parts discovered during processing of a discrepant job are sent to the discrepant material report station. The discrepant material report station tracks proposed dispositions of the discrepant material identified in each of the discrepant material reports, and tracks the approval of the proposed dispositions. The discrepant material report station can present the user with a list of proposed dispositions for the discrepant material including a rework disposition. When the rework disposition is selected, the discrepant material report station enables the user to view scheduled operations, to add operations, to delete operations, to resequence operations, and to associate sketches or resources with operations for further processing of the discrepant material.

The factory floor tablet automation system can also include a statistical process control (SPC) parameter setup station having a processor unit, a display device, and an input device. The SPC station communicates with the server computer. The SPC station enables a user to add an SPC data entry point by positioning an SPC icon for the SPC data entry point on a sketch associated with an job and associating a quality characteristic of the job with the SPC data entry point. A portable tablet device displays the SPC icon for the SPC data entry point when the sketch is displayed on the portable tablet device. The operator can enter SPC data for the quality characteristic of the SPC job by selecting the SPC icon of the SPC data entry point on the portable tablet device.

A method for factory floor automation which includes collecting, processing, storing and accessing information for a plurality of jobs being performed by a plurality of operators in a facility. Job information is stored for the plurality of jobs on a central computer having a processor unit and a storage device. One of a plurality of portable computing devices is allocated to one of the operators. Each of the portable computing devices includes a processor unit, a memory device, a display device, an input/output device and an antenna, and each of the portable computing devices communicates wirelessly with the central computer. At least one of the jobs is assigned to an assigned operator. An assigned portable computing device is associated with the assigned job by knowing the operator assigned to the job and the portable computing device allocated to the assigned operator. The job information for the job is made accessible to the assigned operator through the assigned computing device. Manufacturing information for each of the jobs is collected, stored and processed on the central computer. The manufacturing information for the jobs is entered by the assigned operator on the assigned computing device. The time allocation of each of the operators to one or more phases of each of the jobs is tracked. The time allocation for each job by an operator is based upon entries made by the operator on their allocated computing device.

The method can include allotting jobs to each operator and then querying the operator through the allocated portable computing device as to whether they accept or reject the allotted job. Then assigning the job to the operator only if they indicate that they accept the allocated job.

The method can include providing the assigned operator, on their assigned computing device, with a selection of available work centers for performing the assigned job. When the operator selects a work center on the assigned computing device, that work center is allocated to the operator for performing the assigned job.

The method can also include collecting first piece inspection data which is part of the manufacturing information. The assigned operator is queried, through their assigned portable computing device, as to whether a first piece inspection is to be performed on the assigned job. When the operator indicates on the assigned computing device that a first piece inspection is to be performed on the assigned job, the method does not permit the assigned operator to indicate completion of the assigned job until first piece inspection data is entered for the assigned job.

The method can include displaying a job information window on the assigned computing device which shows job information for one of the assigned jobs. The job information window can include a job scroll bar having a job selection button for each of the assigned jobs, enabling the assigned operator to select the assigned job for which job information is shown in the job information window by selecting the job selection button for the assigned job. The job information in the job information window can include time allocation information.

The method can also provide access to a plurality of sketches stored as manufacturing information, and each of the sketches is associated with one or more jobs. The job information window can include a view sketch button that enables the assigned operator to select a sketch associated with the selected job, and to display the selected sketch on their assigned computing device.

The method can also collect statistical process control (SPC) data and provide a plurality of SPC data entry points for entering SPC data. Each of the SPC data entry points is associated with at least one sketch. An available SPC data entry point is displayed on the assigned computing device when the assigned operator selects a sketch and the available SPC data entry point is associated with the selected sketch. Entry of the SPC data can be made through the assigned computing device by selecting the SPC data entry point. The assigned operator is not permitted to indicate completion of the selected job until all the SPC data is entered for the selected job.

The method can also include a simulated break button in the job information window which allows time tracking to be suspended for the operator and jobs assigned to the operator. This could be used for a break or at lunch. When a portable computing device is allocated to an operator, the portable computing device accepts identification information from the operator to identify the operator. The method then determines whether the operator has suspended tracking of time allocation. If the operator has suspended tracking of time allocation, time tracking is resumed for all of the assigned jobs.

The method can also include a stop job button displayed in the job information window which enables the assigned operator to indicate end of assignment of the selected job. When the assigned operator selects the stop job button, the operator, using the assigned computing device, indicates whether the selected job is complete or incomplete. When the assigned operator indicates that the selected job is complete, the method checks that all necessary manufacturing information has been entered for the selected job and does not permit complete status for the selected job unless all necessary manufacturing information has been entered. When the job is determined to be complete, the job is flagged as complete, and the job is removed from the assigned jobs of the operator. When the assigned operator indicates that the assigned job is incomplete, the method collects and stores manufacturing information through the assigned computing device related to the status of the job.

A factory floor tablet automation system for storing, collecting and processing manufacturing data generated at a facility during manufacturing, and for making manufacturing data accessible from the facility, can also include a local processor at the facility, and a plurality of portable tablet devices, each of the plurality of portable tablet devices having a processor unit, a memory device, a display screen, an input/output device and a tablet antenna. One or more transceivers are located throughout the facility, each transceiver being connected to the local processor in the facility, and the plurality of portable tablet devices are in wireless communication with the local processor through the transceivers and the tablet antennas. A server computer having a processor unit and storage device, the storage device maintaining a plurality of databases is connected to local processors through a network.

Another method of collecting, processing, storing and accessing information for a plurality of jobs being performed by a plurality of operators in one or more facilities connected through a network includes the steps of storing job information for the plurality of jobs on a central computer having a processor unit and a storage device, and wirelessly linking a plurality of portable computing devices to a local processor in each facility. Each of the local processors in each facility is linked to the central computer, and one of a plurality of portable computing devices is allocated to one of the plurality of operators. An assigned computing device of the plurality of portable computing devices is associated with the at least one of the plurality of jobs, and the job information for the at least one of the plurality of jobs is accessible by the assigned operator through the assigned computing device. Manufacturing information for each of the plurality of jobs is collected, stored, and processed on the central computer.

Additional objects, advantages and novel features of the invention are set forth in the description that follows, and will become apparent to those skilled in the art upon reviewing the drawings in connection with the following description.

BRIEF DESCRIPTION OF THE DRAWINGS

FIG. 30 shows an example of a DMR selection window;

FIG. 33 shows an example of a rework operations window;

DETAILED DESCRIPTION OF THE PREFERRED EMBODIMENTS

Figure 1:
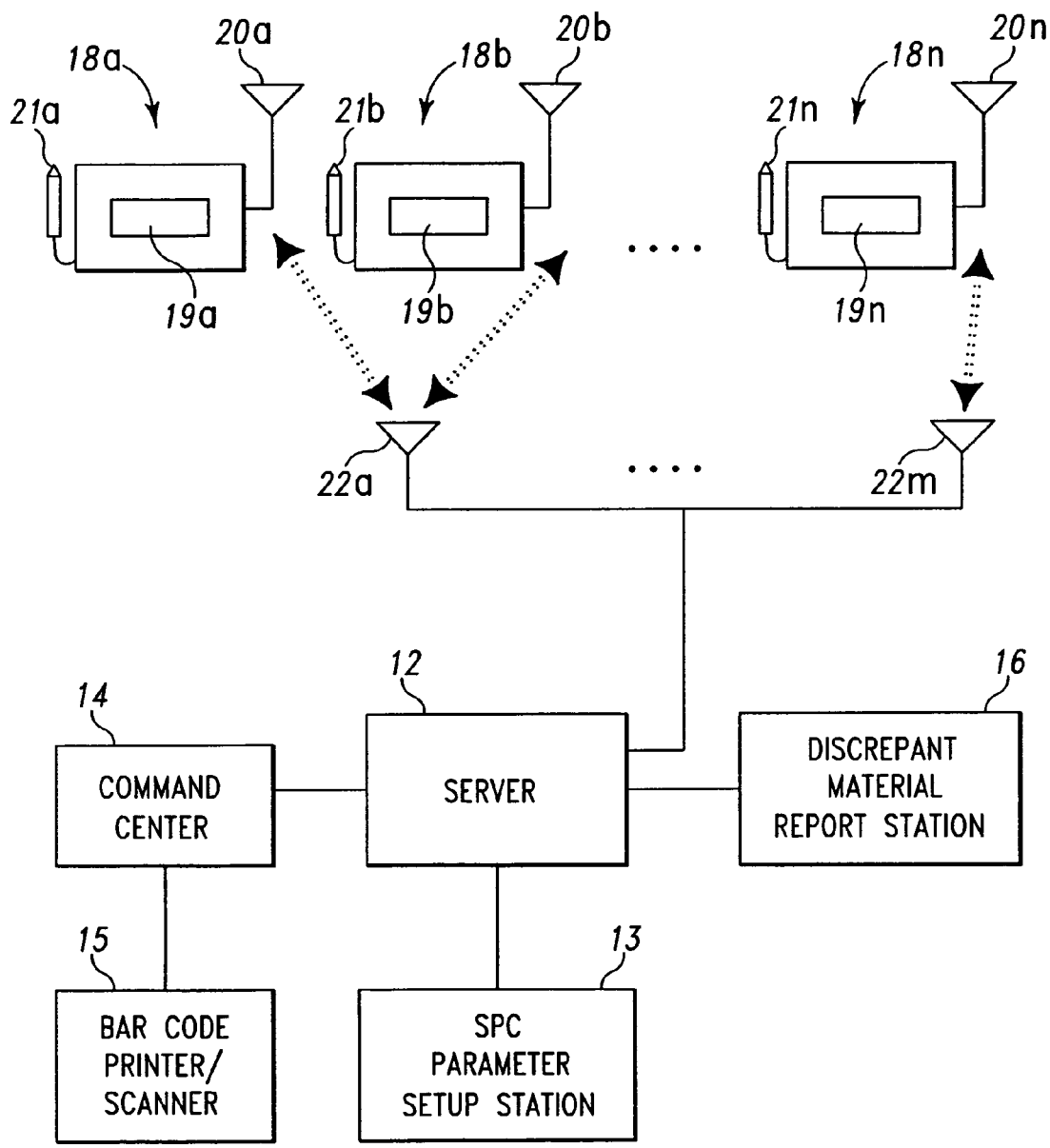
FIG. 1 shows an overview schematic of the main components of a paperless tablet system.

A block diagram of a factory floor tablet automation system 10 is shown in FIG. 1. The tablet automation system 10 includes a server computer 12, a command center 14, a plurality of portable tablet computer units 18a–18n, and a plurality of transceivers 22a–22m which are part of a Radio Frequency Local Area Network (RF LAN). Each tablet unit 18a–18n includes an antenna 20a–20n. The server 12 is connected to the transceivers 22a–22m which are distributed throughout the factory. The tablet units 18a–18n communicate with the server 12 through transceivers 22a–22m.

A tablet unit 18 includes a central processor, memory, a display screen 19 and an operator input device, such as a stylus 21 as shown in FIG. 1. It has been found that a VADEM PC Companion Model C-100 with RF antenna and stylus peripherals works well in this application.

The command center 14 is used to create identifiers for operators and manufacturing orders and to assign operators to tasks. FIG. 1 shows a bar code printer/scanner 15 connected to the command center 14. The bar code printer/scanner 15 can print bar codes which are used to identify operators and to identify orders as they pass through the manufacturing process. When an order is assigned to an operator, the bar code of the order is scanned and the bar code of the operator is scanned to enable the tracking of location, status and progress for the order by the tablet automation system 10.

The tablet automation system 10 can also include a discrepant material report (DMR) station 16 to create, process and track the disposition of discrepant material reports (DMRs). When an operator, supervisor or engineer finds a discrepancy in a part, e.g. measurement outside of tolerance, a DMR is written. Inspectors and/or engineers inspect the part and determine the cause of the discrepancy and the proper disposition of the part, e.g. rework or scrap. The DMR station 16 is used to process the DMR and to track to recommended disposition of the parts associated with the DMR.

The tablet automation system 10 can also include a Statistical Process Control (SPC) Parameter Setup Station 13 to pre-process sketches in order to add SPC hotspots to sketches used in the tablet automation system 10. The sketch of an item to be produced, or a portion thereof, is loaded from a drawing repository 26 for the user to mark SPC hotspots. The SPC hotspots have tolerances which must be verified by the operator during manufacture of the item. The user of the SPC Parameter Setup Station 13 creates an association between each SPC hot-spot on the sketch and a characteristic of the item being manufactured.

Figure 2:
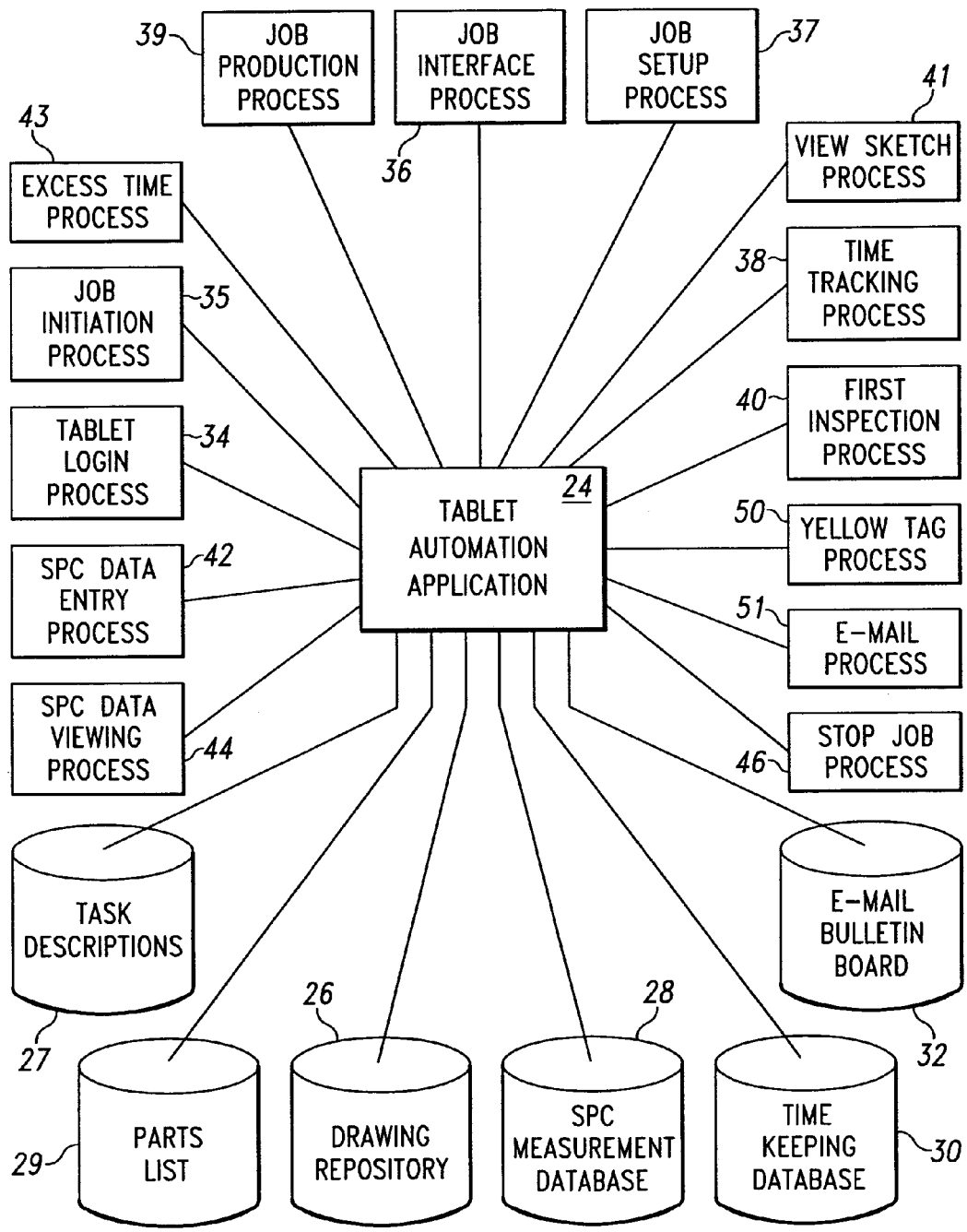
FIG. 2 shows an overview diagram of the main processes of a tablet automation application for implementing the paperless tablet system.

The tablet automation system 10 is controlled by a tablet automation software application 24 represented in FIG. 2. The tablet automation application 24 includes of a tablet login process 34, a job initiation process 35, a job interface process 36, a job setup process 37, a time tracking process 38, a job production process 39, a first piece inspection process 40, a view sketch process 41, an SPC data entry process 42, an excess time process 43, an SPC data viewing process 44, a stop job process 46, a yellow tag process 50 and an e-mail process 51. The processes of the tablet automation application 24 interact to track factory floor operations and to supply necessary data to operators through the tablet units 18. The data created and used by the tablet automation application 24 is stored in a plurality of databases which include an electronic drawing repository 26, a tasks description database 27 containing production steps for manufacturing orders, an SPC measurement database 28, a parts list database 29, a time keeping database 30 and an e-mail bulletin board 32. The management of the databases can be accomplished by different systems, such as a time keeping system for the time keeping database 30, and/or by database software, such as Oracle Manufacturing.

In one embodiment, the tablet application 24 is installed on server 12 via a removable mass storage device and is accessed by each tablet unit 18 over the RF LAN 22. This enables software maintenance and updates for the automation system 10 to be performed at one location. Alternatively, the tablet application 24 can be installed on each individual tablet 18. The server 12 functions as the network server for the factory automation system 10 and manages additional factory automation tools which interface with the factory automation system 10. Server 12 includes access to the databases used by the tablet application 24. Data is communicated between the tablets 18 and the server 12 through the tablet antennas 20 and the plurality of transceivers 22.

The creation of a manufacturing order for the production of a finished product includes several steps. One or more task descriptions are created and stored in the task descriptions database 27 which includes the production steps that are to be carried out in completing the final product. A parts list is created, stored in the parts list database 29, and associated with each task description, which identifies the parts that the operator should need in performing the task description. Any necessary sketches are scanned or otherwise entered into the drawing repository 26. The SPC parameter setup station 13 is used to associate any SPC hotspots in the production process with the appropriate operations sketches. The command center 14 is used to create order identifiers which are associated with production pouches which an operator will use in the manufacture of the finished product or an intermediate product manufactured in the process of making the finished product.

At the beginning of a shift, an operator is provided with a tablet 18. If the tablet 18 is not turned on, the operator turns on the tablet 18 and waits for a connection to be established between the tablet 18 and the server 12, and for the tablet application 24 to start the tablet login process 34.

Figure 3A:
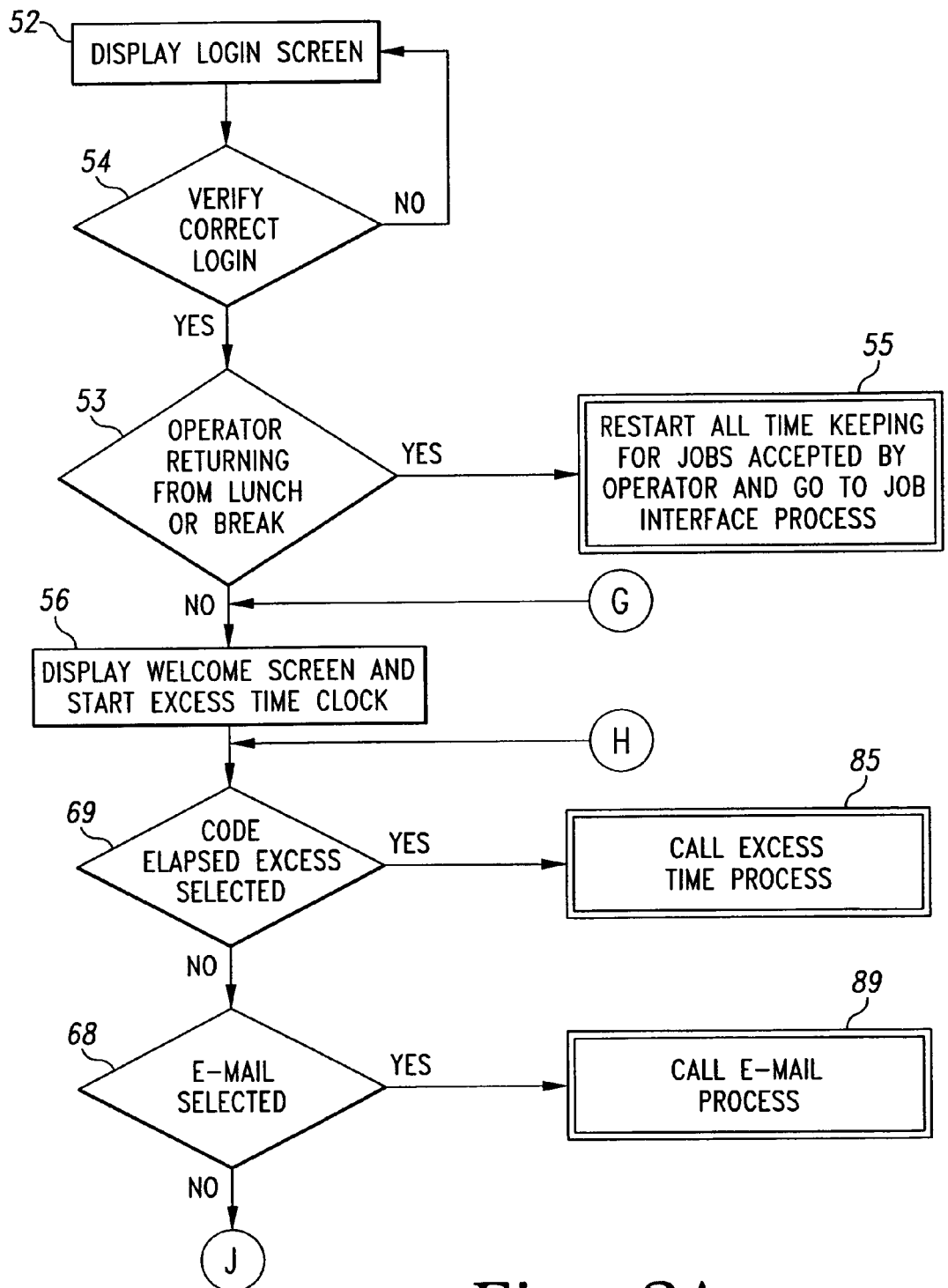
FIGS. 3a and 3b show a functional representation of a tablet login process.
Figure 3B:
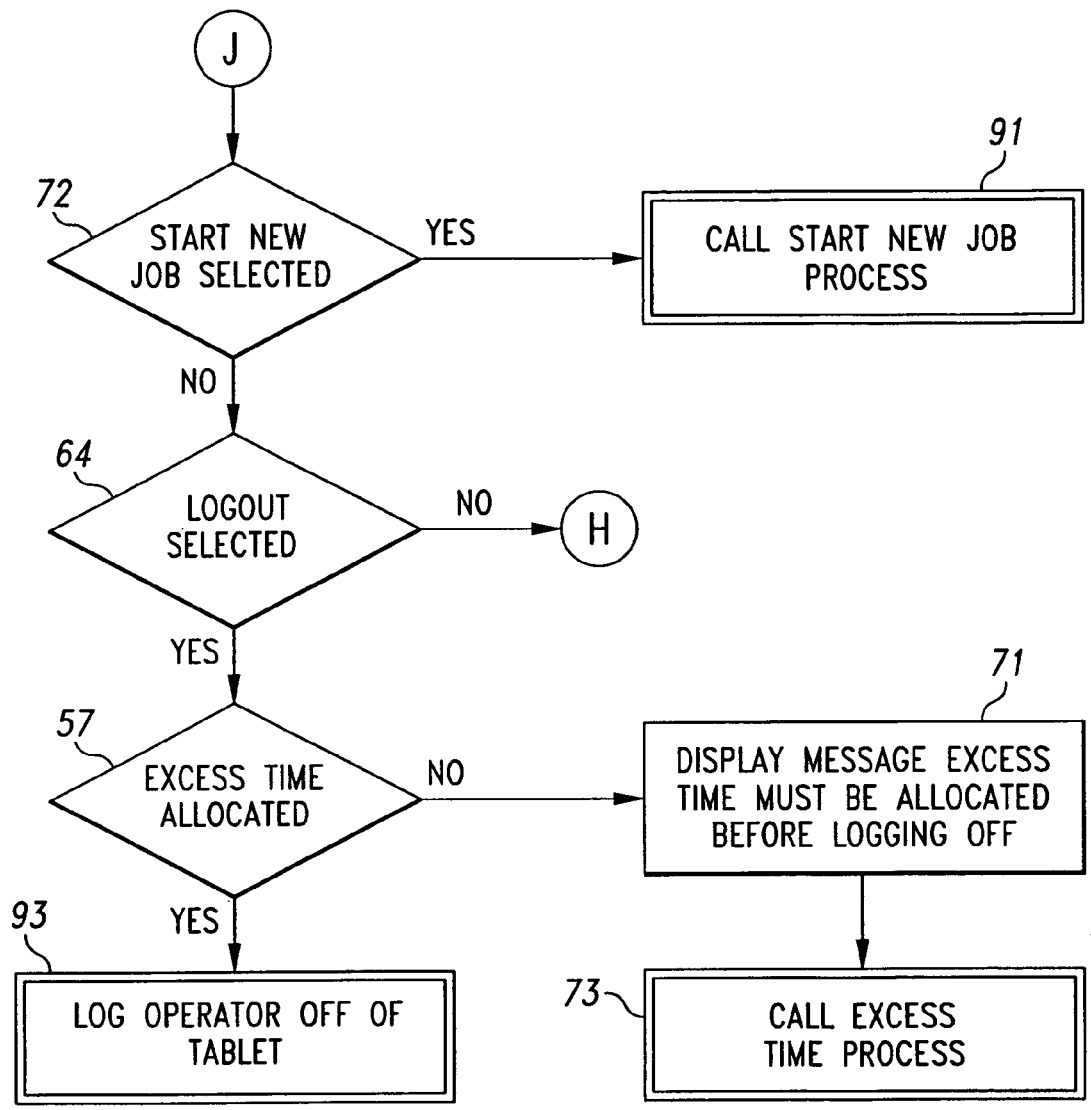
Figure 4:
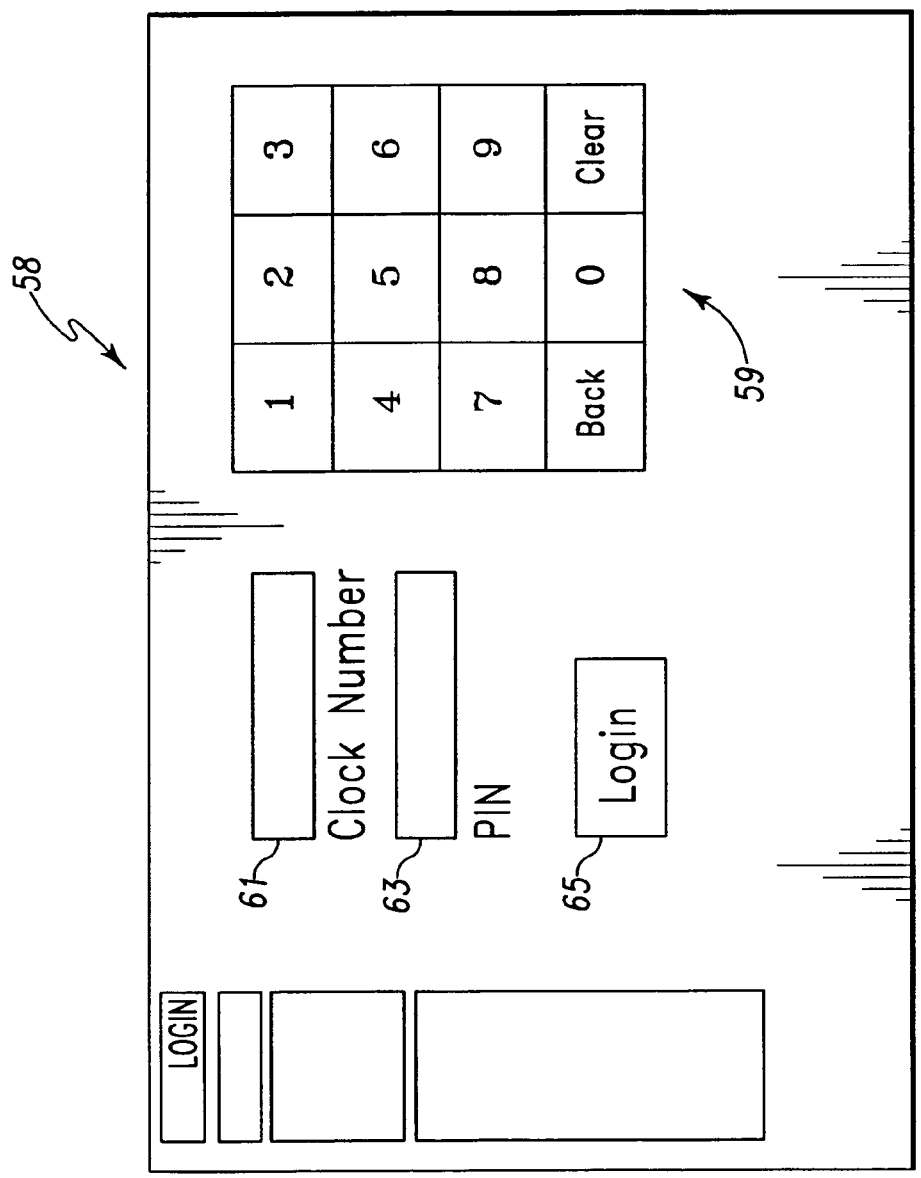
FIG. 4 shows an example of a user login screen.

The tablet login process 34, represented in FIGS. 3a and 3b, verifies a correct user login and associates a particular tablet 18 with the operator identified by the verified login information. At step 52, the tablet login process 34 displays a login screen 58 on the tablet 18. An example of the login screen 58 is shown in FIG. 4. The login screen 58 includes a keypad 59, a clock number field 61, a PIN number field 63 and a simulated login button 65. The operator, using the keypad 59 and/or the tablet stylus 21, enters his assigned clock number in the clock number field 61 and his selected personal identification number (PIN) in the PIN number field 63. After the operator has entered his login information, he selects the login button 65. In an alternative embodiment, the tablet 18 is equipped with a bar code reader and the operator's company identification badge includes a bar code containing identifying information. In this alternative embodiment, the operator enters his login information by scanning the bar code on his company identification badge and then selects the login button 65.

When the operator selects the login button 65, the tablet login process 34 verifies the login information at step 54. If the login information is incorrect, control is returned to step 52 and the login screen 58 is redisplayed. If the login information is correct, the tablet login process 34 proceeds to step 53.

Figure 11:
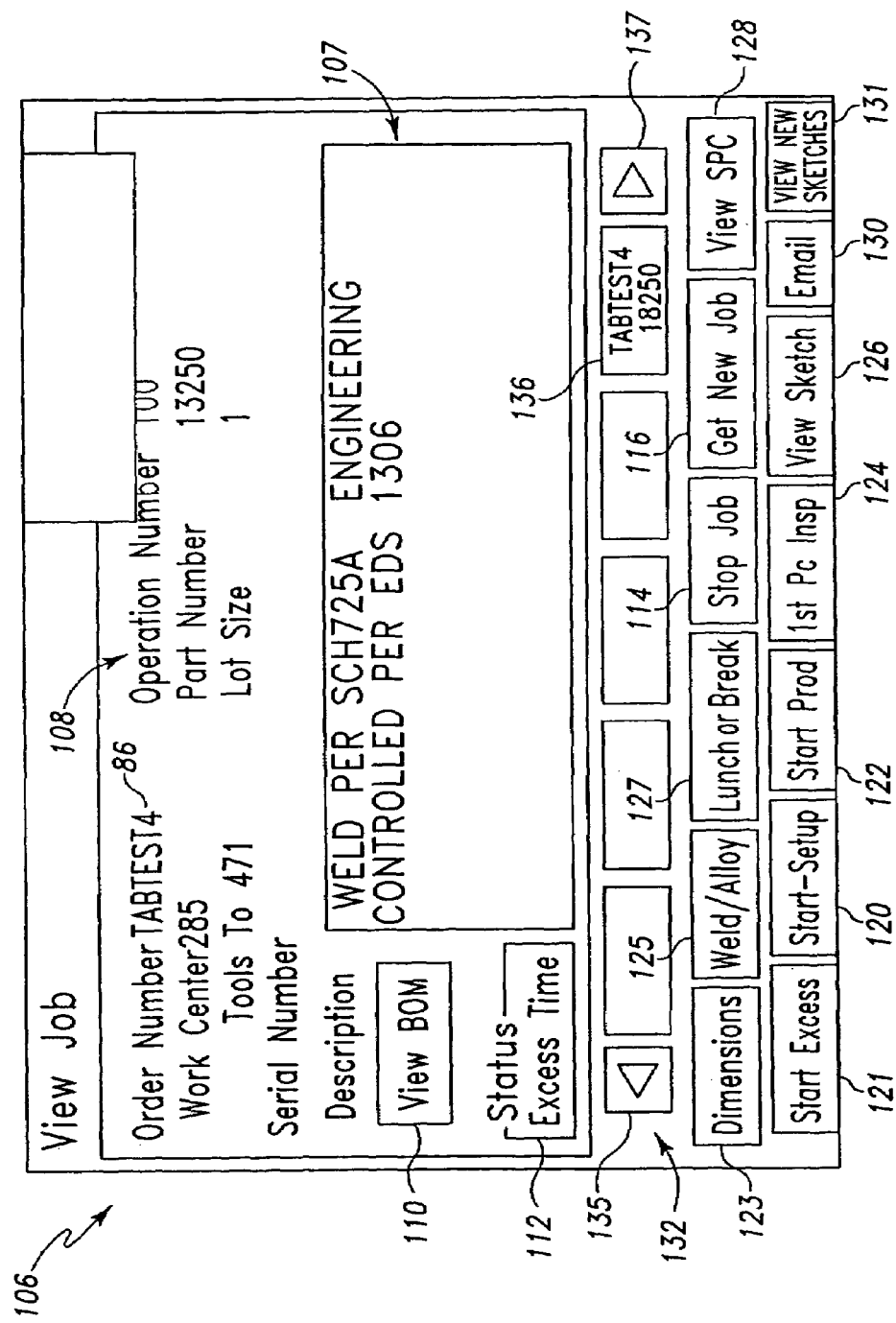
FIG. 11 shows an example of a main job window.

At step 53, the tablet login process 34 checks to determine whether the previous time that the operator logged off the tablet application 24 they used the Lunch or Break button 127 on the job window 106 which is shown in FIG. 11 (this window and button is discussed later). If the operator last logged off the tablet application 24 using the Lunch or Break button 127, then control is transferred to step 55 at which all time keeping for the operator and jobs accepted by the operator is restarted and control is transferred to the job interface process 36. If the operator did not use the Lunch or Break button 127 the last time they logged off the tablet application 24, then control is transferred to step 56 which displays a welcome screen 60 and starts an excess time clock for tracking the operator's time.

Figure 5:
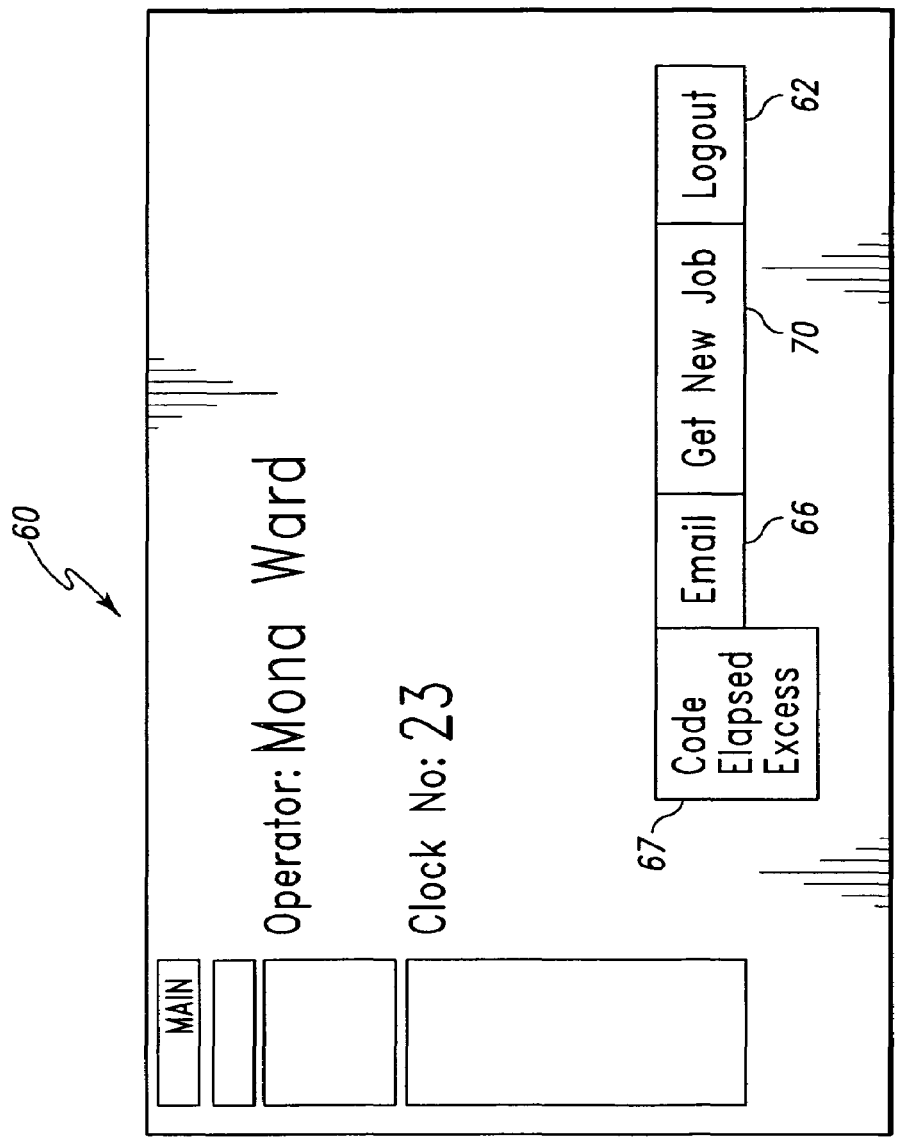
FIG. 5 shows an example of a welcome screen.

An example of a welcome screen 60 is shown in FIG. 5. The welcome screen 60 displays the name and clock number of the operator that successfully logged onto the tablet 18. The welcome screen 60 also displays a simulated Email button 66, a simulated Get New Job button 70, a simulated Code Elapsed Excess Time button 67, and a simulated Logout button 62. The tablet login process 34 then waits for the operator to select one of the Email button 66, the Get New Job button 70, the Code Elapsed Excess Time button 67, and the Logout button 62.

If the Code Elapsed Excess Time button 67 is selected, then step 69 is activated which transfers control to step 85. At step 85, the excess time process 43 is activated which allows the operator to enter a code for the excess time that has elapsed.

If the e-mail button 66 is selected, then step 68 is activated which transfers control to step 89. At step 89, the e-mail process 51 is activated which allows the operator to check his electronic mail.

If the Get New Job button 70 is selected, then step 72 is activated which transfers control to step 91. At step 91, the start new job process is activated which initiates the job initiation process 35.

If the Logout button 62 is selected, then step 64 is activated which checks to see whether the operator has allocated their accumulated excess time. If excess time has accumulated above a predefined duration, for example 5 minutes, then the operator must allocate their excess time to a specific category before being able to log off of the tablet automation application 24. Otherwise, the operator can log off and the accumulated excess time is allocated to a default category. If the operator must allocate some accumulated excess time, then at step 71, the tablet login process 34 displays a message indicating to the operator that they must allocate their excess time before logging off and, at step 73, control is transferred to the excess time process 43. If the operator does not need to allocate accumulated excess time, then control is transferred to step 93. At step 93, the logout process is activated which logs the operator off of the tablet 18 and makes the tablet 18 available for use by another operator. The tablet automation application 24 also makes sure that all of the operator's jobs are stopped and their status entered as either complete or incomplete before allowing the operator to log off.

For each order number identifying a product order, a list of required operations to build the product is stored in the task descriptions database 27 and a list of the necessary parts for completing the order are stored in the parts list database 27. The Oracle Manufacturing Application can be used to assist in these operations. Other applications and modules can also be used to assist personnel at the command center 14 in tracking the completion of tasks and optimizing the use of available resources in the assignment of individual tasks to available operators and work centers. When the order is initiated, a bar code tag is created for each order number which is associated with the order throughout the manufacturing process.

The command center 14 allocates jobs to operators and an operator accepts a job through the tablet automation application 24. The operator picks up the necessary parts with the associated order number for the assigned job at a central location, for example the stores window in the factory. When the operator is finished with the assigned task, whether it is complete or incomplete, the operator returns the parts and associated order identifier to the central location or to the next location for further processing. An operator can be working on multiple orders at the same time. The tablet automation application 24 tracks counters, clocks and flags independently for each order being worked on by the operator. When an operator picks up an allocated order at the stores window, he is assigned the order by scanning his operator bar code and the bar code associated with the allocated order. By knowing the orders that an operator has accepted and by knowing the tablet 18 that the operator has logged onto, the tablet automation application 24 knows the tablet to which each order is associated.

Figure 6:
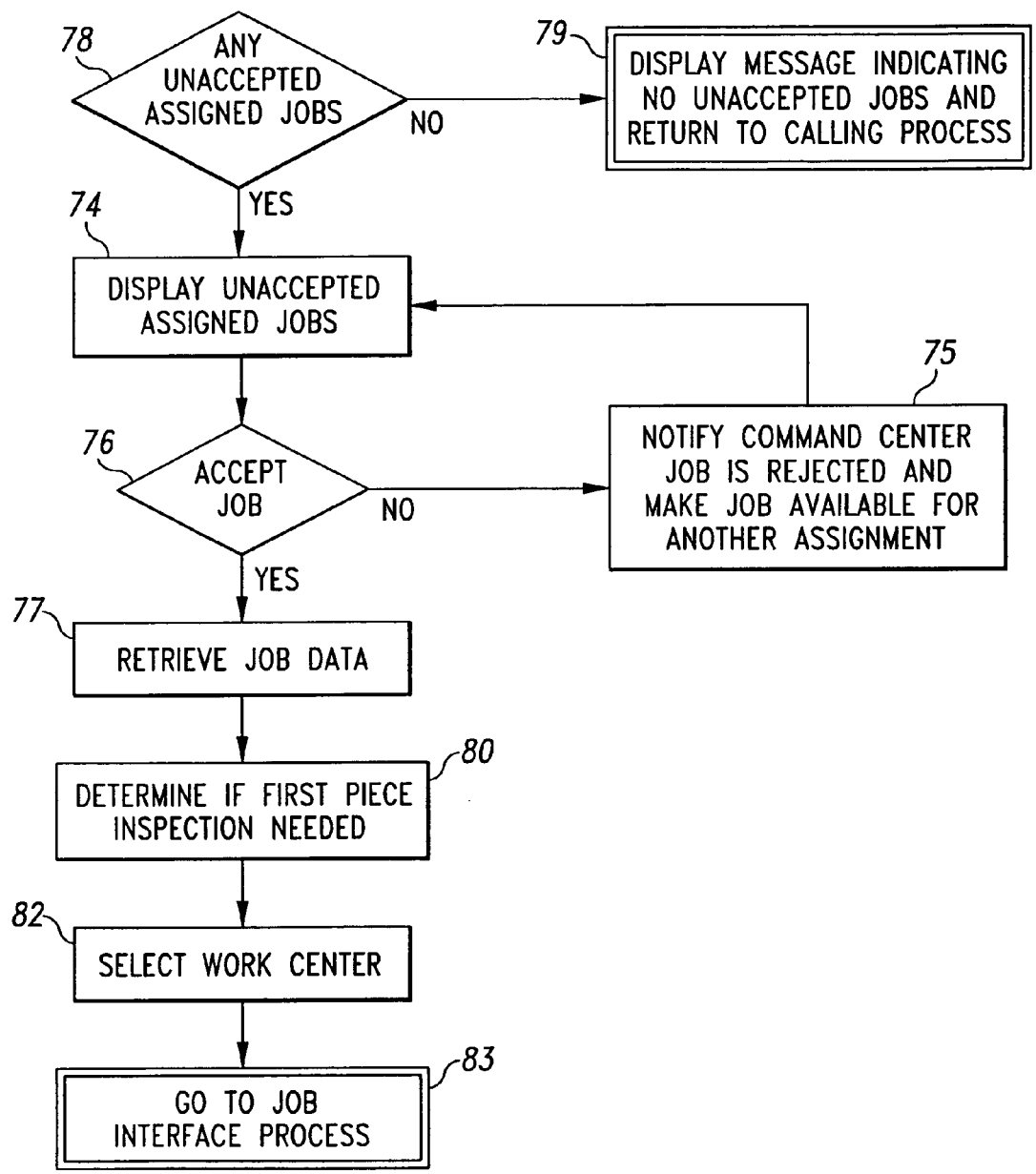
FIG. 6 shows a functional representation of a job initiation process.
Figure 7:
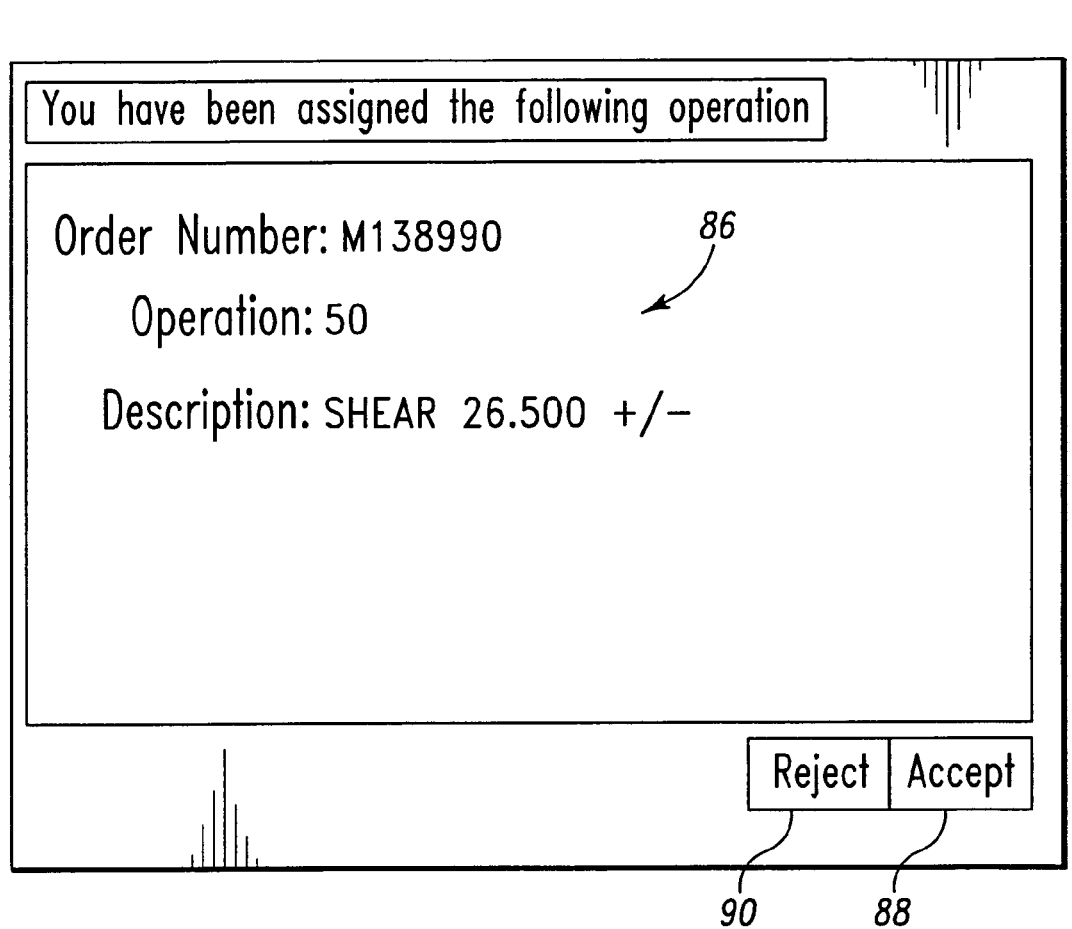
FIG. 7 shows an example of an assigned operations screen.

The job initiation process 35, represented in FIG. 6, tracks the assignment of jobs to operators, the acceptance of jobs by operators and the assignment of jobs to work centers. Upon entry to the job initiation process 35, at step 78, the system checks whether the operator has any unaccepted assigned jobs. Unaccepted assigned jobs are jobs which have been assigned to the operator, because the operator scanned the operator and order bar codes, but which the operator has not yet accepted or rejected in the tablet automation application 24. If there are no unaccepted assigned jobs for the operator then, at step 79, the job initiation process 35 displays a message on the tablet 18 indicating that there are no unaccepted assigned jobs for the operator and returns control to the calling process. If there are unaccepted assigned jobs for the operator then, at step 74, the job initiation process 35 displays the unaccepted assigned jobs for the operator. If the operator has multiple unaccepted assigned jobs, then a list of the unaccepted assigned jobs is displayed. When the operator has only one unaccepted assigned job or after the operator selects a job from the list of unaccepted assigned jobs, a jobs assigned screen 84 is displayed which contains information about an unaccepted assigned job that has been picked up by the operator logged onto the tablet 18. FIG. 7 shows an example of the jobs assigned screen 84. The jobs assigned screen 84 includes job information 86 such as order number, operation and job description. The jobs assigned screen 84 also includes a simulated Accept button 88 and a simulated Reject button 90.

If the operator rejects a job by selecting the Reject button 90, step 76 of the job initiation process 35 transfers control to step 74. At step 74, the tablet automation application 24 notifies the command center 14 that the job has been rejected and releases the job for assignment to another operator. The operator that rejected the job should also return any materials picked up for the job to the stores window for reassignment. Control is then returned to step 74 to display other unaccepted/unrejected assigned jobs to the operator on the tablet 18.

If the operator accepts a job by selecting the Accept button 88, the job initiation process 35 collects necessary data for tracking and supporting the job. At step 77, the job initiation process 35 retrieves data associated with the accepted job from the databases accessible through the tablet automation application 24. The data would include the production steps to be performed, a list of SPC parameters which must be entered, the filenames of any SPC charts, the filenames of any sketches associated with the job, a list of parts for the job, and appropriate work centers for performing the job.

Figure 8:
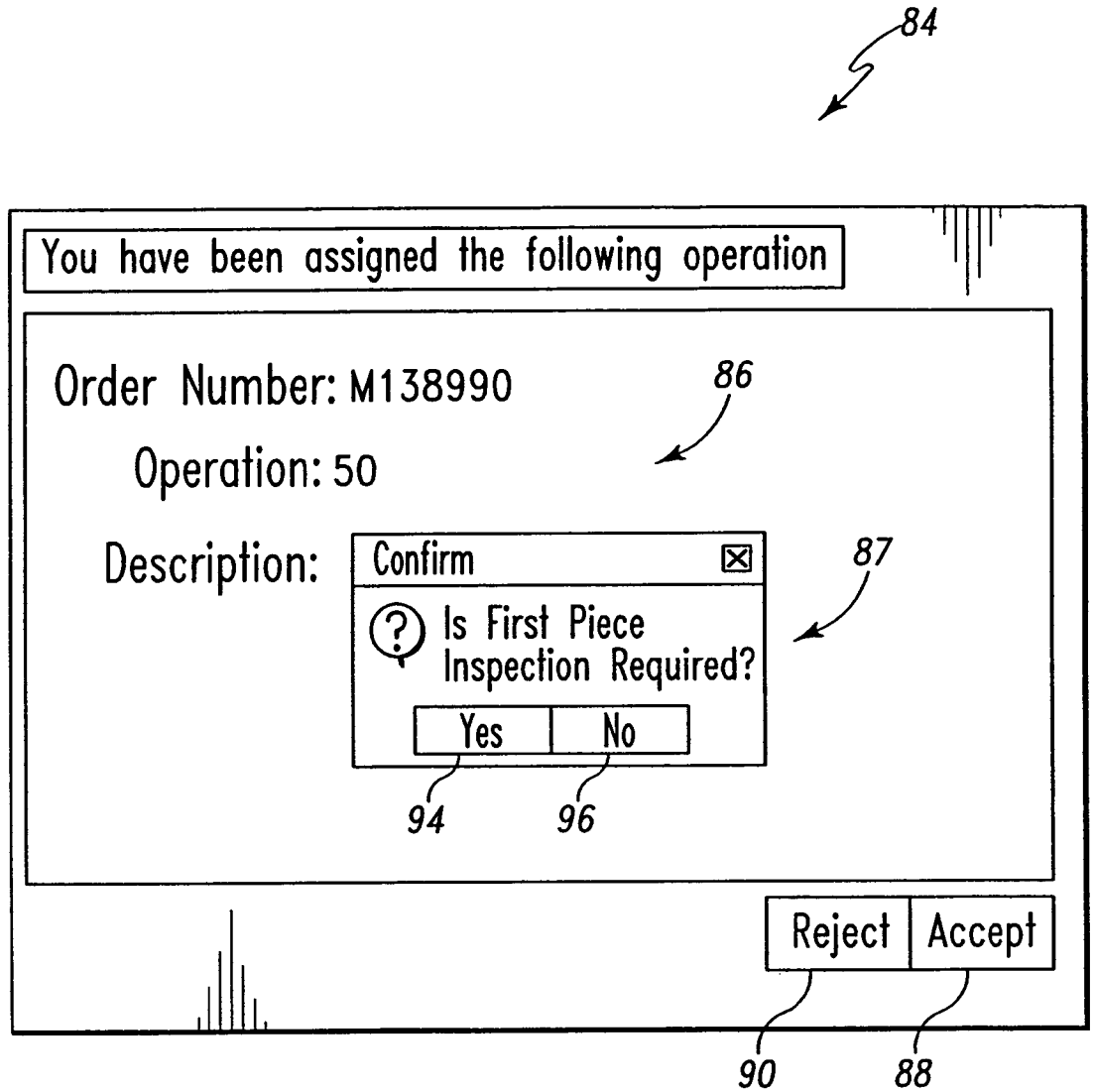
FIG. 8 shows an example of the assigned operations screen with a first piece inspection query pop up window.

At step 80, the job initiation process 35 determines if a first piece inspection is required for the selected job. A first piece inspection pop-up window 87, shown in FIG. 8, is displayed which includes a simulated Yes button 94 and a simulated No button 96. The operator determines whether a first piece inspection is required for the accepted job. The operator then indicates to the automated tablet application 24 whether or not a first piece inspection is required by selecting the Yes button 94 or the No button 96, respectively. If the operator indicates that a first piece inspection is required by selecting the Yes button 94, the automated tablet application 24 stores that a first piece inspection is required for the selected operation and verifies that a first piece inspection is performed before the operation is marked as completed.

Figure 9:
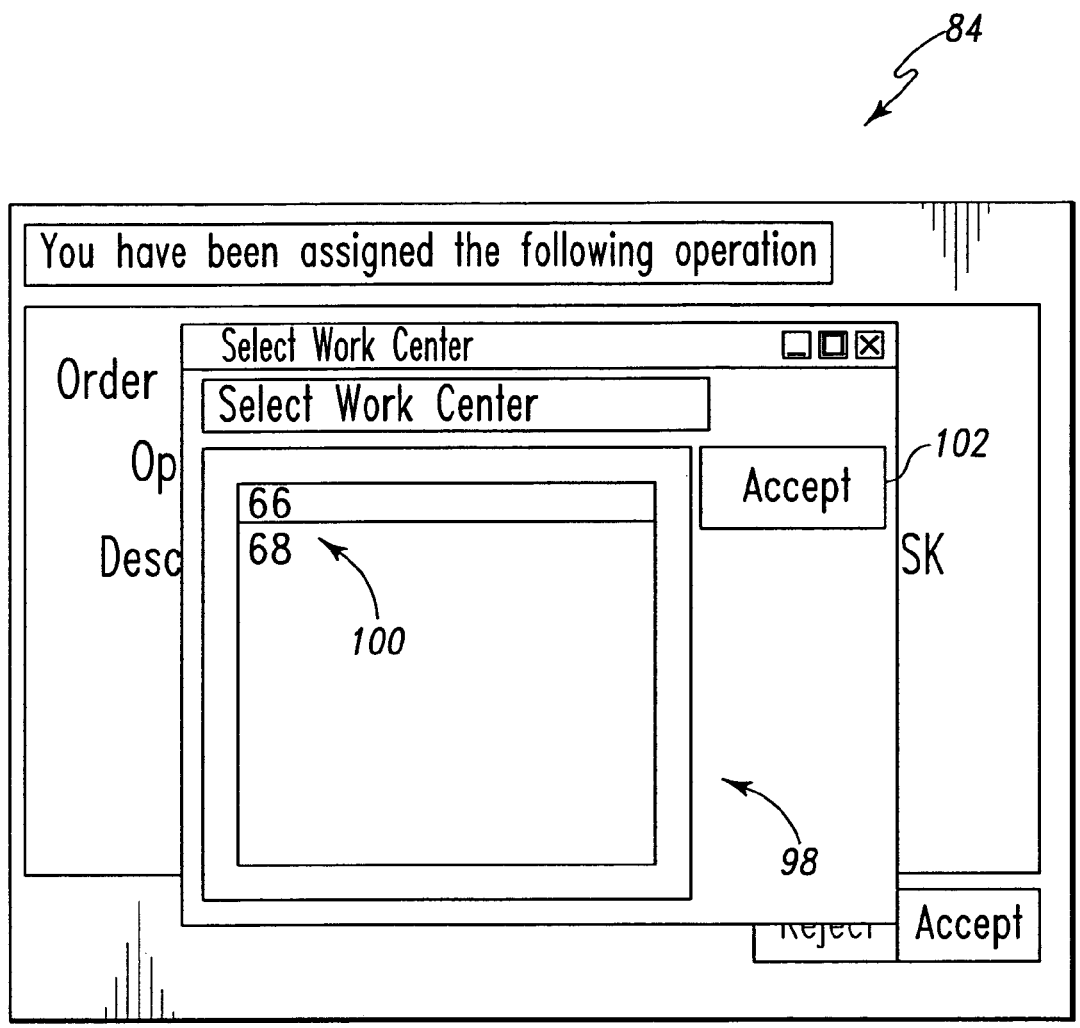
FIG. 9 shows an example of the assigned operations screen with a select work center pop up window.

At step 82, the job initiation process 35 displays a work center selection pop-up window 98 in which the approved work centers for performing the job are displayed to the operator. An example of the work center selection window 98 is shown in FIG. 9. The work center selection window 98 includes a list of available work centers 100 and a simulated Accept button 102. The work centers can be ordered so that a primary work center 101 is displayed as the first entry in the list 100 of approved work centers. At step 82, the operator selects a desired work center by highlighting the desired work center in the work center list 100 using the stylus 21, and selecting the Accept button 102.

After the operator makes the necessary selections in the job initiation process 35, the tablet application 24 transfers control to the job interface process 36 and the time tracking process 38. The operator obtains the required raw stock or components from the factory stores or from the tool mover and proceeds to the selected work center with the tablet 18. The tablet application 24 also updates the databases on server 12 to reflect the selections made by the operator during the job initiation process 35. This allows for real-time querying of information by managers concerning the status of jobs.

Figure 10A:
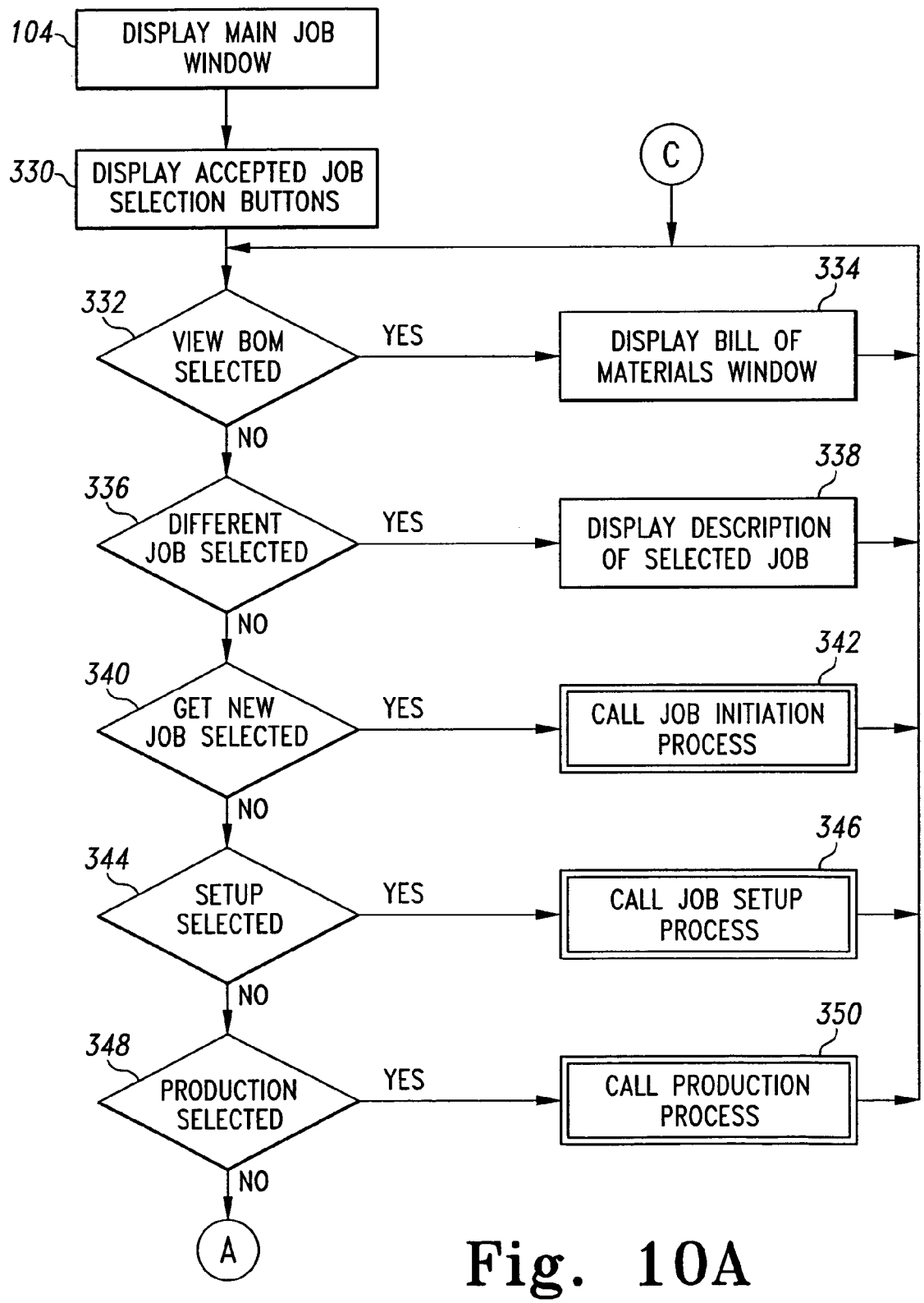
FIGS. 10a, 10b and 10c show a functional representation of a job interface process.

The job interface process 36 provides access to most of the other processes of the tablet automation application 24. The job interface process 36, represented in FIGS. 10a–10c, starts at step 104 by displaying a main job window. FIG. 11 shows an example of a main job window 106. The job window 106 includes a job information section 108, a job description list 107 of tasks to be performed in completing the selected job, and a job scroll bar 132. The job window 106 also includes several simulated buttons allowing the user to view job information and move between processes for any of the jobs selected by the operator. The simulated buttons include a view BOM button 110, a Dimension button 123, a Weld Alloy button 125, a Lunch or Break button 127, a Stop Job button 114, a Get New Job button 116, a View SPC button 128, a Start Excess button 121, a Start Setup button 120, a Start Production button 122, a First Piece Inspection button 124, a View Sketch button 126, and an Email button 130. The main job window 106 also displays a time status indicator 112 which indicates to the user the category in which time is currently accumulating for the job displayed in the job information section 108.

As the main job window 106 is being displayed, the job interface process 36 also sets up and displays the accepted job selection buttons at step 330. The accepted job selection buttons are displayed in the job scroll bar 132 which includes multiple job selection buttons 136 displaying identifying information for jobs that have been accepted by the operator. For example, the highlighted job selection button 136 in FIG. 11 contains the order number and part number for the job currently displayed in the job information section 108. For each job that has been accepted by the operator through the job initiation process 35, a job selection buttons 136 on the job scroll bar 132 will contain identifying information about the accepted job. An operator can switch between the accepted jobs in the job scroll bar 132 by selecting the appropriate job selection button 136. When a different job selection button 136 is selected, the information in the job information section 108, the job description section 107, the time status indicator 112, and the simulated buttons of the main job window 106 which are active change to the appropriate information and status for the newly selected job. The job scroll bar 132 also includes a forward scroll button 137 and a backward scroll button 135. The scroll buttons 135, 137 are only active if there are more accepted jobs than there are job selection buttons 136 that can be displayed in the job scroll bar 132. For example, FIG. 11 shows five job selection buttons 136 displayed in the job scroll bar 132. If the operator has not accepted more than five jobs, then the accepted jobs would be displayed in the displayed job control buttons 136 and the scroll buttons 135, 137 would not be active. Alternatively, if the operator has accepted more than five jobs, then the accepted jobs can not be displayed in the five displayed job control buttons 136 and at least one of the scroll buttons 135, 137 would be active to provide the operator with access to the non-displayed jobs.

When the operator selects the View BOM button 110, step 332 of the job interface process 36 is activated and, at step 334, the job interface process 36 displays the bill of materials for the job which is currently displayed in the job information fields 108. If there is no bill of materials for the job which is currently displayed in the job information fields 108, then the view BOM button 110 will not be displayed in the main job window 106.

When the operator selects a different job from the job scroll bar 132, step 336 of the job interface process 36 is activated and, at step 338, the job interface process 36 updates the job information section 108, the job description list 107, the time status indicator 112, and the simulated buttons of the main job window 106 which are active to display information for the newly selected job.

When the operator selects the Get New Job button 116, step 340 of the job interface process 36 is activated and, at step 342, the job initiation process 35 is called. The job initiation process 35 was described above and is represented in FIGS. 6–9. By selecting the Get New Job button 116 from the main job view screen 106, the operator can initiate additional jobs concurrently with the already accepted jobs. It is frequent in a machine shop environment for an operator to be working concurrently on multiple jobs because of the programmability of modern tools, for example, a lathe. Therefore, the operator can program the lathe with the desired tool paths to create the part for one selected job and, while the lathe automatically carries out the provided instructions, the operator can be programming or performing another job. The job scroll bar 132 contains a job selection button 136 for each job accepted through the job initiation process 35. The operator switches between accepted jobs using the job selection buttons 136.

When the operator selects the Start Setup button 120, step 344 of the job interface process 36 is activated and, at step 346, the job setup process 37 is called. The job setup process 37, described in more detail below, tracks the time the operator spends setting up for the job which is currently displayed in the job information section 108 of the main job window 106.

When the operator selects the Start Production button 122, step 348 of the job interface process 36 is activated and, at step 350, the job production process 39 is called. The job production process 39, described in more detail below, tracks the time the operator spends in production for the job which is currently displayed in the job information section 108 of the main job window 106.

Figure 10B:
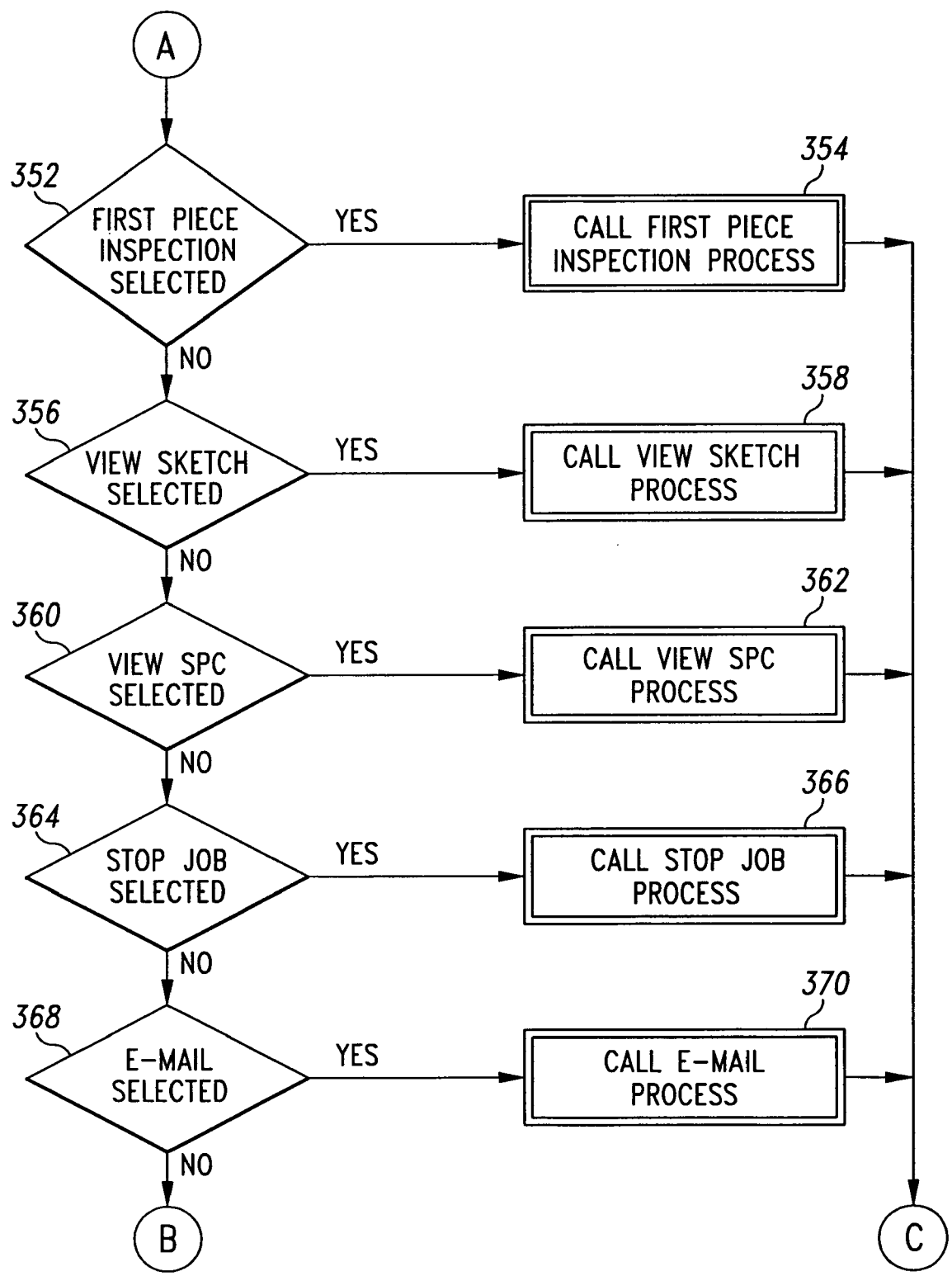

Continuing with the representation of the job interface process 36 in FIG. 10b, when the operator selects the First Piece Inspection button 124, step 352 of the job interface process 36 is activated and, at step 354, the first piece inspection process 40 is called. The first piece inspection process 40, described in more detail below, confirms that a first piece inspection has been performed on the operation which is currently displayed in the job information section 108 of the main job window 106.

When the operator selects the View Sketch button 126, step 356 of the job interface process 36 is activated and, at step 358, the view sketch process 41 is called. The view sketch process 41, described in more detail below, is used to view sketches and schedules for the job which is currently displayed in the job information section 108 of the main job window 106.

Figure 12:
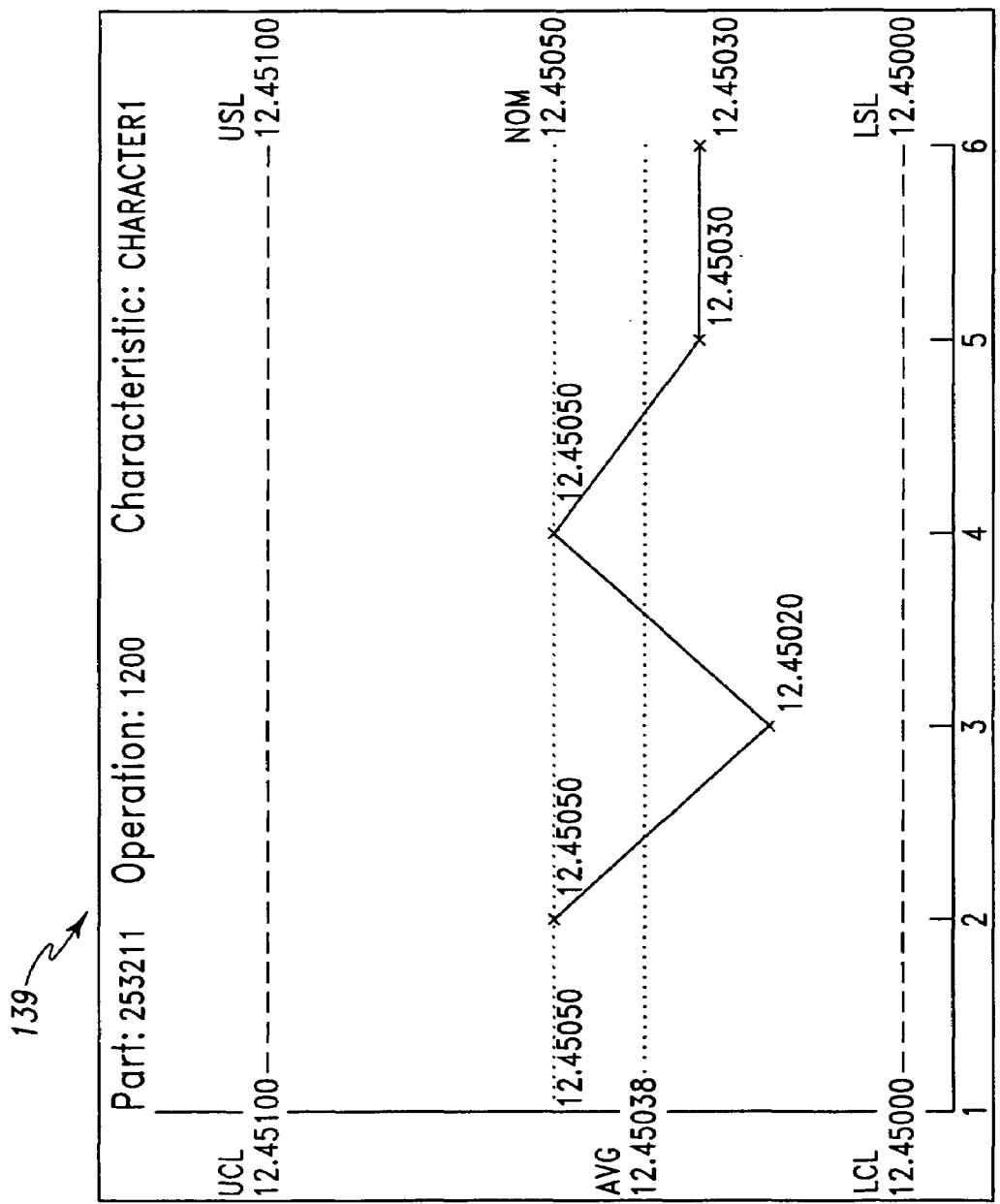
FIG. 12 shows an example of an X-bar chart window.

When the operator selects the View SPC button 128, step 360 of the job interface process 36 is activated and, at step 362, the SPC data viewing process 44 is activated. The SPC data viewing process 44 displays a window with a list of SPC charts available for the job which is currently displayed in the job information section 108 of the main job window 106. There should be n charts available for viewing, where n is the number of SPC parameters that will be collected for the job. SPC charts are normally X-bar and R charts. The SPC data viewing process 44 allows the operator to view a selected SPC chart and to switch between available SPC charts for the job. FIG. 12 shows an example of an X-bar chart window 139 for one of the SPC characteristics.

When the operator selects the Stop Job button 114, step 364 of the job interface process 36 is activated and, at step 366, the stop job process 46 is called. The stop job process 46, described in more detail below, is used to when the job which is currently displayed in the job information section 108 of the main job window 106 has been completed, reassigned, needs to be yellow-tagged or the operator's shift is over.

Figure 26:
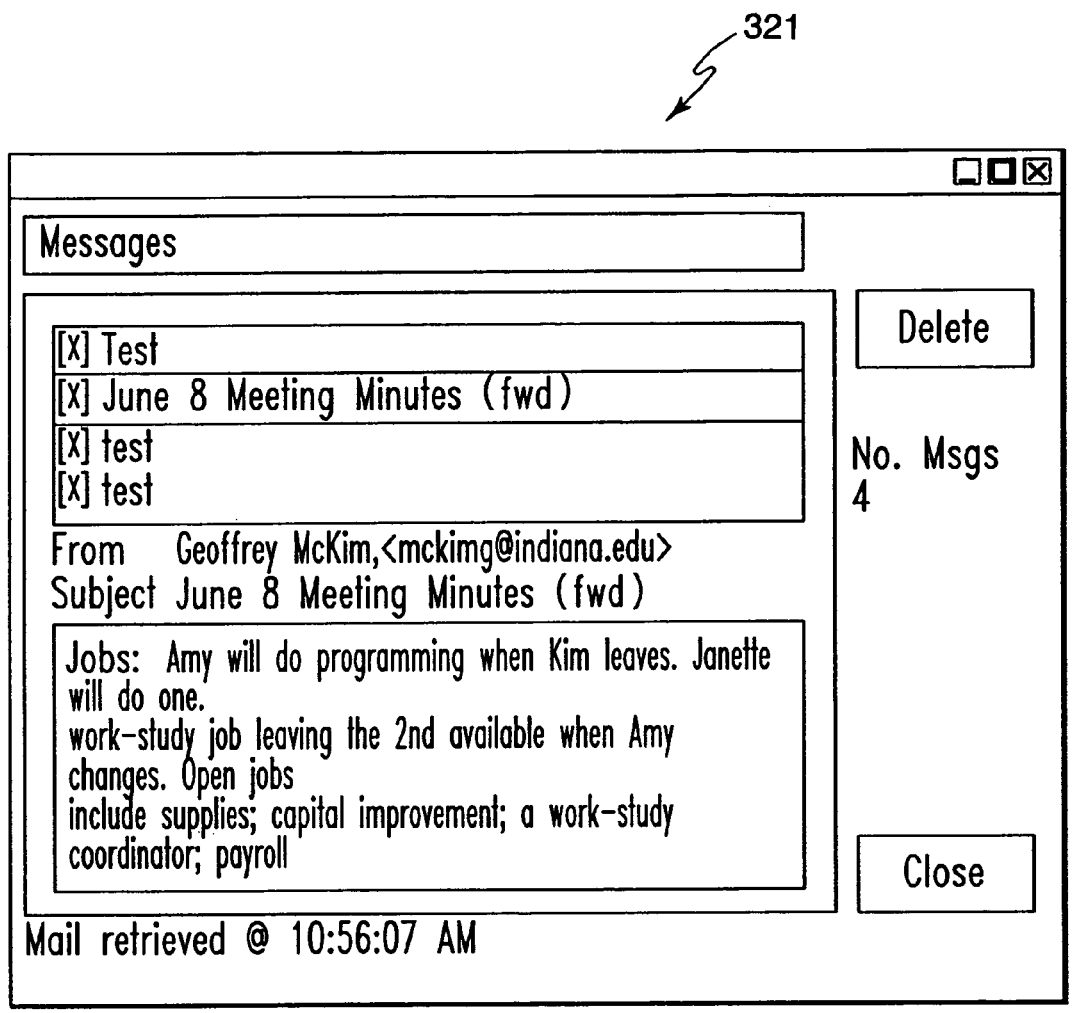
FIG. 26 shows an example of an e-mail window.

When the operator selects the e-mail button 130, step 368 of the job interface process 36 is activated which transfers control to step 370. At step 370, the e-mail process 51 is called. The e-mail process 51 is used by the operator to receive and read electronic messages and bulletins. The e-mail process 51 displays an e-mail window on the tablet 18. An example of an e-mail window 321 is shown in FIG. 26. In the preferred embodiment, the e-mail process 51 does not enable the operator to generate and send e-mail messages. The e-mail process 51 can automatically delete messages that have aged in an operators queue after a certain number of days.

Figure 10C:
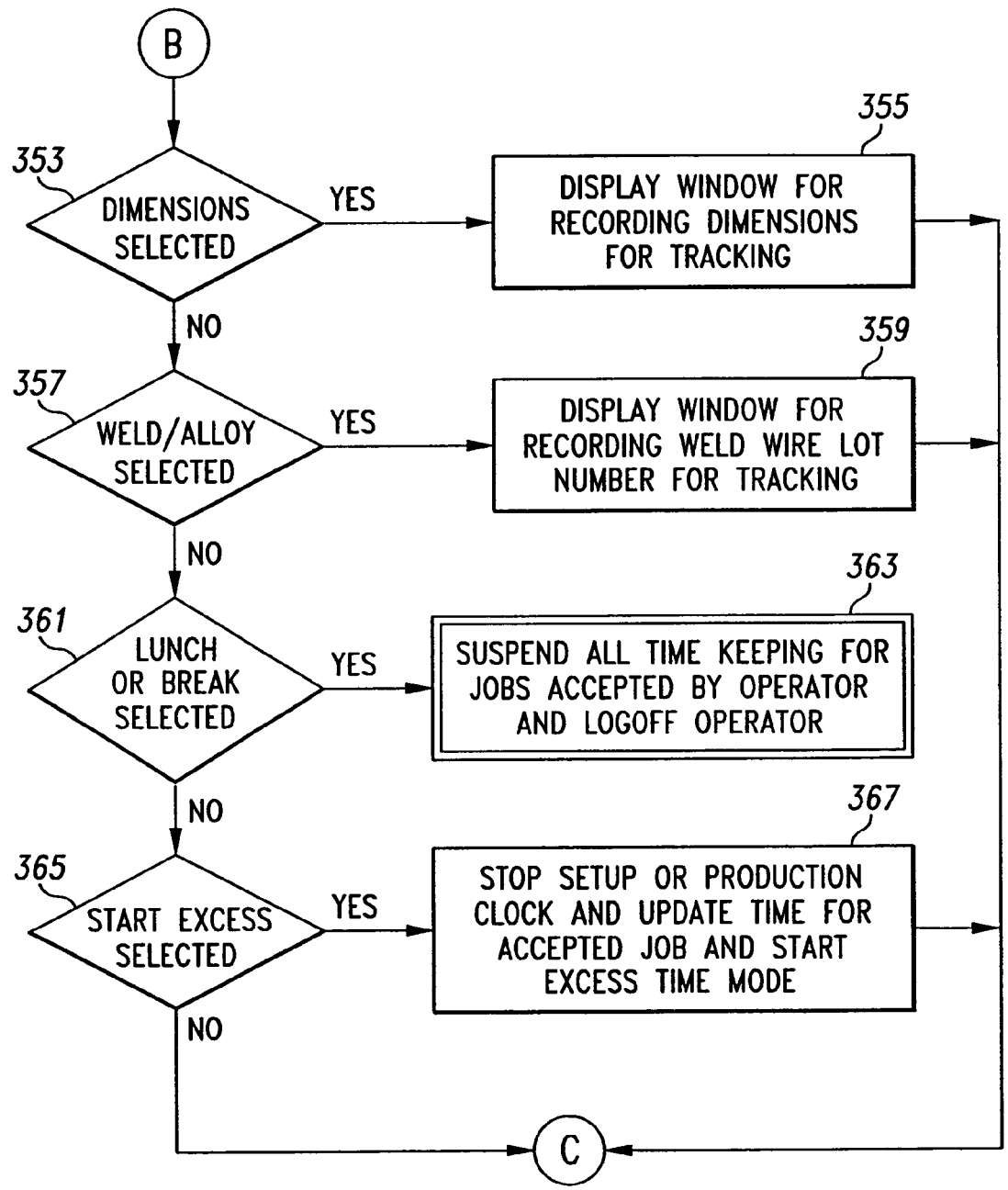

Continuing with the representation of the job interface process 36 in FIG. 10c, when the operator selects the Dimensions button 123, step 353 of the job interface process 36 is activated which transfers control to step 355. At step 355, a window is displayed for the operator to record dimensions of the part being produced for tracking. For example, a gap distance of the part may be measured and recorded.

When the operator selects the Weld/Alloy button 125, step 357 of the job interface process 36 is activated which transfers control to step 359. At step 359, a window is displayed for the operator to record weld or alloy lot numbers being used in the operation for tracking. The recorded data can then be archived and retrieved at a later time to determine the components that went into producing the part.

When the operator selects the Lunch/Break button 127, step 361 of the job interface process 36 is activated which transfers control to step 363. At step 363, time keeping for the operator and for all jobs accepted by the operator is suspended, and the operator is logged off of the tablet application 24. The jobs remain assigned to the operator. When the operator logs back onto a tablet 18, the tablet application 24 will restart time keeping for the operator and for all jobs accepted by the operator and will start the operator directly in the job interface process 36 displaying the main job window 106.

When the operator selects the Start Excess button 121, step 365 of the job interface process 36 is activated which transfers control to step 367. The Start Excess button 121 is only made available for selection when the operator has just one job in setup or production. The Start Excess button 121 is used by the operator to indicate that the accepted job is not in either setup or production. At step 367, the job interface process 36 stops the setup or production clock for the job accepted by the operator, updates the setup or production time, and switches to excess time mode. The switch to excess time mode is evidenced by the time status indicator 112.

Figure 13:
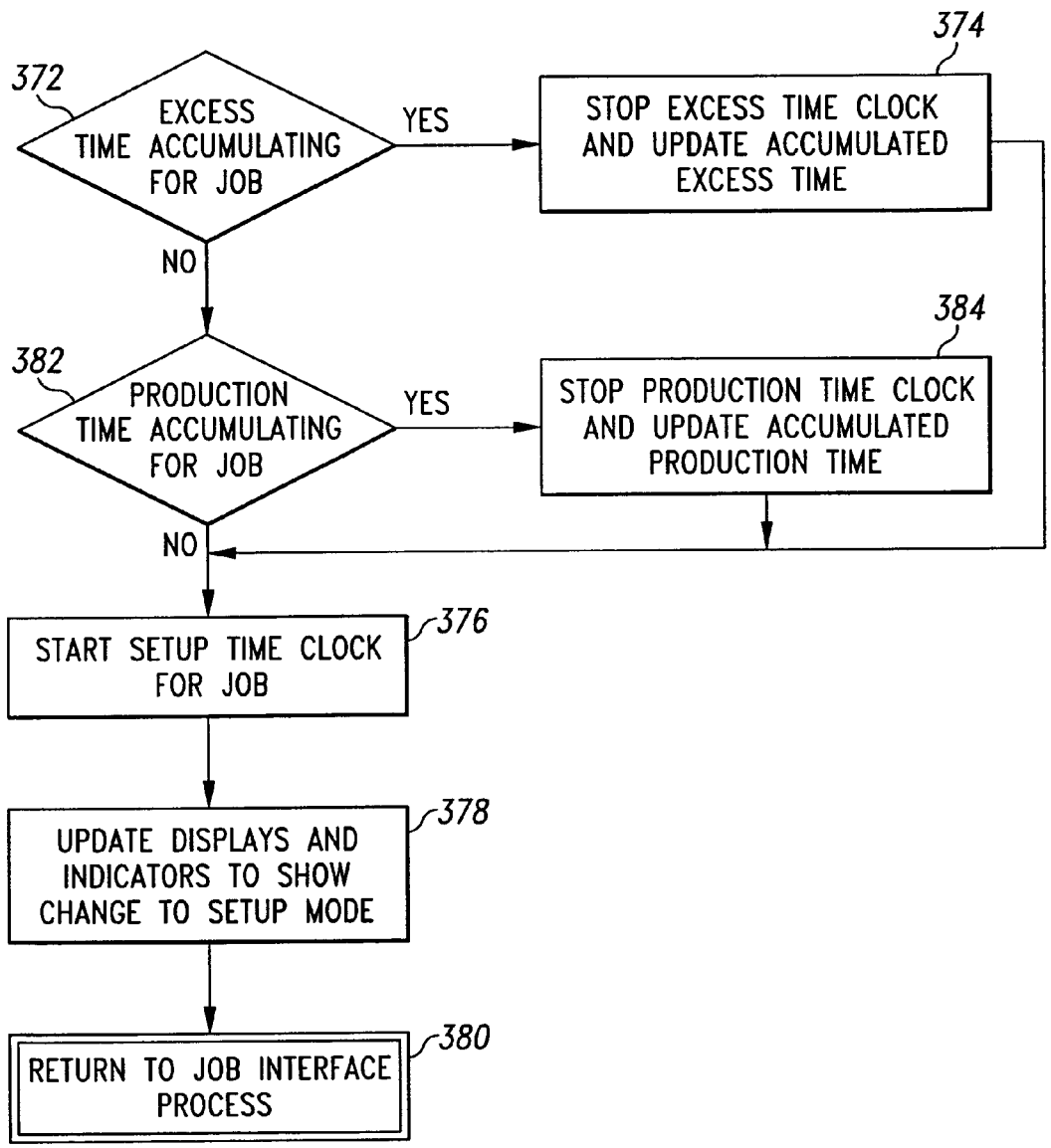
FIG. 13 shows a functional representation of a job setup process.

The job setup process 37, represented in FIG. 13, tracks the time the operator spends setting up the work center according to the instructions for the job which is displayed in the job information section 108 of the main job window 106 when the Start Setup button 120 is selected.

At step 372, the job setup process 37 determines whether excess time is currently accumulating for the job. This would occur when the operator has accepted the job but has not started either setup or production for the job. If the operator is currently accumulating excess time then step 374 is activated. At step 374, the job setup process 37 stops the excess time clock and updates the accumulated excess time in the tablet automation system 24 and/or passes this information to an interfacing time keeping system. Step 374 then transfers control to step 376 to start the setup time clock.

If the operator is not currently accumulating excess time then step 382 is activated. The operator would not be accumulating excess time when a job accepted by the operator is in either setup or production mode. At step 382, the job setup process 37 determines whether production time is currently accumulating for the job. If production time is currently accumulating for the job then step 384 is activated, otherwise step 376 is activated. At step 384, the job setup process 37 stops the production time clock and updates the accumulated production time for the job in the tablet automation system 24 and/or passes this information to an interfacing time keeping system. Step 384 then transfers control to step 376 to start the setup time clock.

At step 376, the start time is recorded for the setup clock and time begins to accumulate as setup time for the selected job. At step 378, the job setup process 37 updates displays and indicators to indicate that the job is in setup mode, which would include changing the status indicator 112 to show Setup Time. Then at step 380 control is returned to the job interface process 36.

Figure 14:
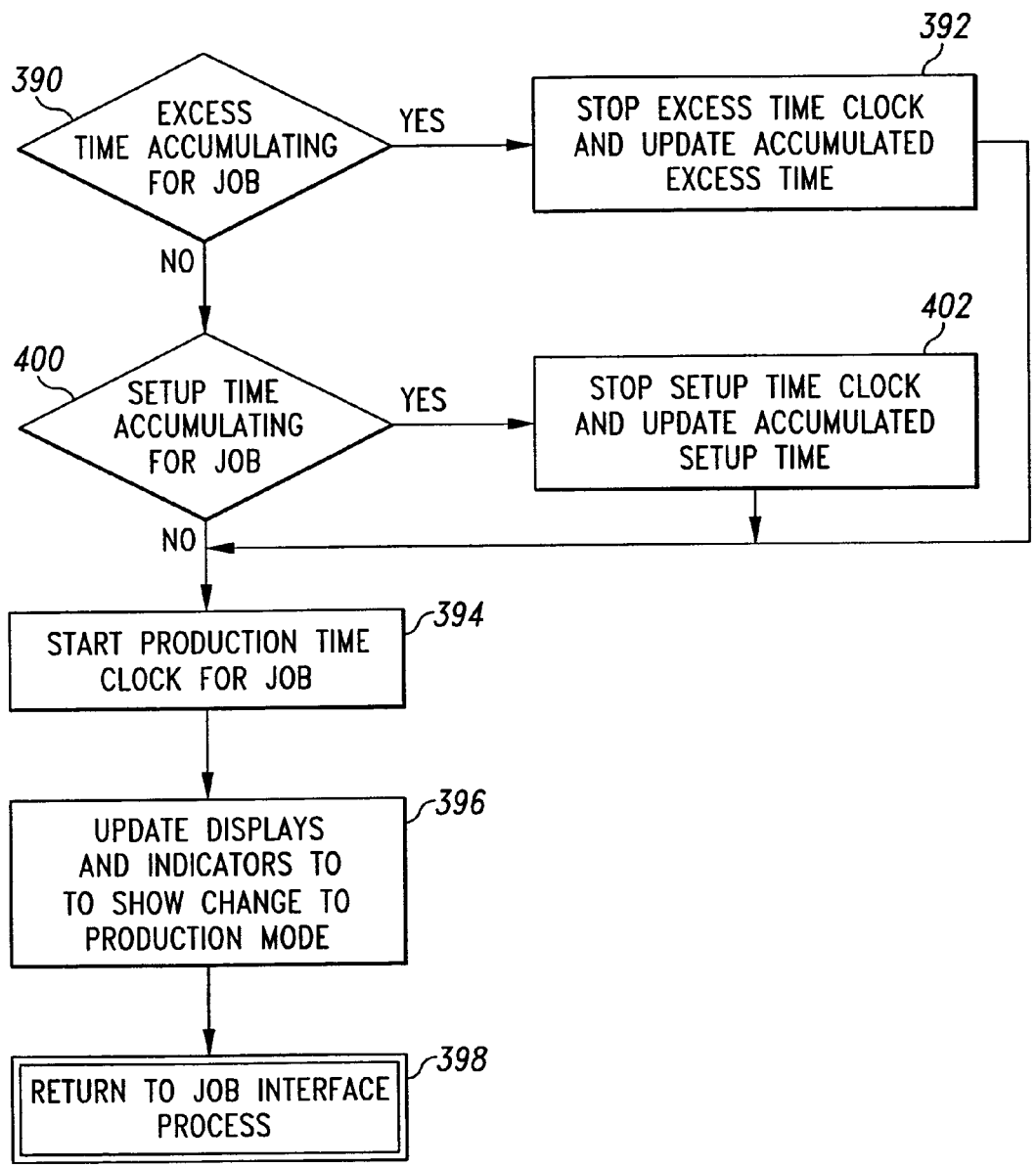
FIG. 14 shows a functional representation of a job production process.

The job production process 39, represented in FIG. 14, tracks the time the operator spends performing the production operations specified in the job description list 107 of the main job window 106 when the Start Production button 122 is selected.

At step 390, the job production process 39 determines whether excess time is currently accumulating for the job. This would occur when the operator has accepted the job but has not started either setup or production for the job. If the operator is currently accumulating excess time then step 392 is activated. At step 392, the job production process 39 stops the excess time clock and updates the accumulated excess time in the tablet automation system 24 and/or passes this information to an interfacing time keeping system. Step 392 then transfers control to step 394 to start the production time clock.

If the operator is not currently accumulating excess time then step 400 is activated. The operator would not be accumulating excess time when a job accepted by the operator is in either setup or production mode. At step 400, the job production process 39 determines whether setup time is currently accumulating for the job. If setup time is currently accumulating for the job then step 402 is activated, otherwise step 394 is activated. At step 402, the job production process 39 stops the setup time clock and updates the accumulated setup time for the job in the tablet automation system 24 and/or passes this information to an interfacing time keeping system. Step 402 then transfers control to step 394 to start the production time clock.

At step 394, the start time is recorded for the production clock and time begins to accumulate as production time for the selected job. At step 396, the job production process 39 updates displays and indicators to indicate that the job is in production mode, which would include changing the status indicator 112 to show Production Time. Then at step 398 control is returned to the job interface process 36.

The first piece inspection process 40 is used to confirm that a first piece inspection has been performed on a job. The operator initiates the first piece inspection process 40 by selecting the First Piece Inspection button 124 from the main job window 106 shown in FIG. 11. A first piece inspection is often required for the first piece in a given lot of parts. If the first piece passes inspection, then other parts produced by the operator using the same production process are expected to meet the same criteria. After the first piece is produced, the operator takes the first piece and the tablet 18 to an inspection area to have a supervisor inspect the piece. If a first piece inspection is required for an operation, and the operator does not have a first piece inspection verified through the first piece inspection process 40, the operator will not be able to sign off on the job as being complete.

Figure 15:
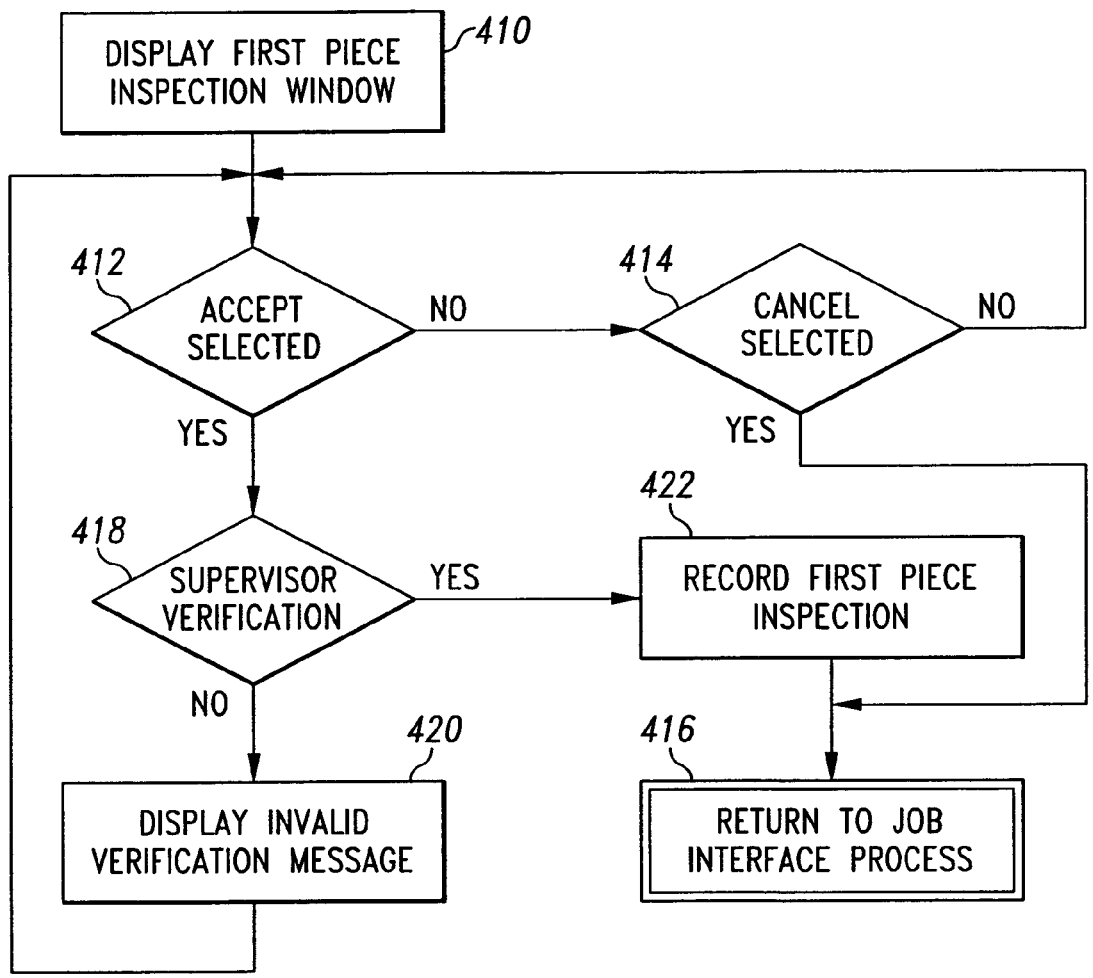
FIG. 15 shows a functional representation of a first piece inspection verification process.
Figure 16:
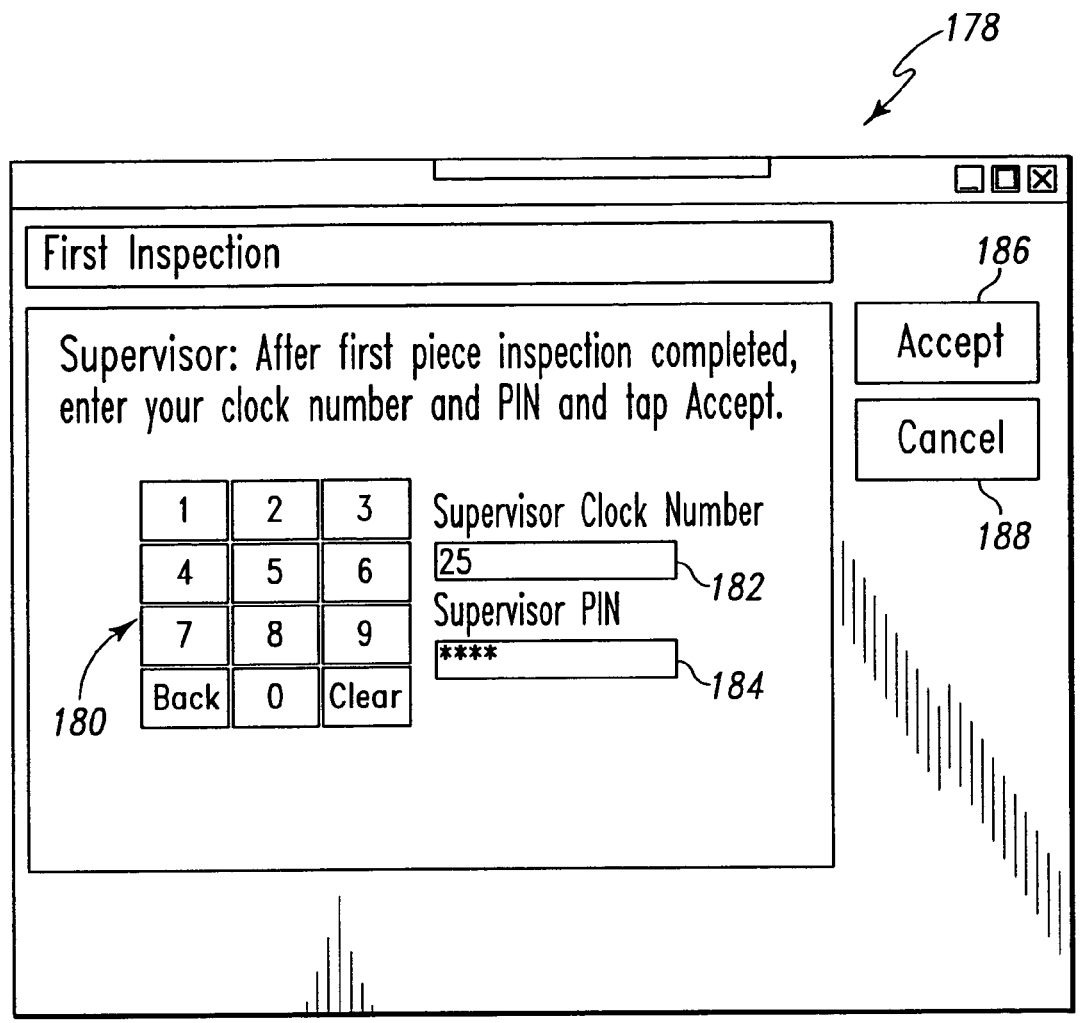
FIG. 16 shows an example of a first piece inspection verification window.

The first piece inspection process 40 is functionally represented in FIG. 15. The first piece inspection process 40 is called from the job interface process 36 when the operator selects the First Piece Inspection button 124 from the main job window 106. At step 410, the first piece inspection process 40, displays a first piece inspection window 178, shown in FIG. 16, through which the supervisor verifies that he has inspected the first piece. The first piece inspection window 178 includes a keypad 180, a supervisor clock number field 182, a supervisor PIN number field 184, a simulated Accept button 186 and a simulated Cancel button 188. At steps 412 and 414, the first piece inspection process 40 checks whether the Accept button 186 or the Cancel button 188, respectively, have been selected.

The Cancel button 188 is used to exit the first piece inspection process 40 without verification of a first piece inspection being performed on the selected job. When the Cancel button 188 is selected, then at step 414, control is transferred to step 416. Step 416 returns control back to the job interface process 36.

The Accept button 186 is used to verify that a first piece inspection has been performed on the selected job, and then to exit the first piece inspection process 40. After the first piece inspection has been completed, the supervisor enters his clock number in the supervisor clock number field 182 and enters his PIN number in the supervisor PIN number field 184 using the keypad 180. After the supervisor has entered his clock and PIN numbers, the Accept button 186 is selected. When the Accept button 186 is selected, step 412 transfers control to step 418. At step 418, the supervisor clock and PIN numbers are verified. If the supervisor clock or PIN number is incorrect, at step 420 an invalid verification message is displayed and the first piece inspection process 40 returns to wait for the Accept or Cancel button to be selected. If the supervisor clock and PIN numbers are correct, at step 422 the first piece inspection process 40 records the first piece inspection for the selected job and the supervisors verification, and at step 416 control is returned to the job interface process 36.

The view sketch process 41 is used to view sketches or schedules associated with the selected job. The operator initiates the view sketch process 41 by selecting the View Sketch button 126 from the main job window 106 shown in FIG. 11. The View Sketch button 126 is only available for selection on the main job window 106 when there is a sketch associated with the job displayed in the job information section 108. Statistical Process Control (SPC) measurements that need to be recorded for a particular operation are indicated on sketches with SPC hotspot icons. Sketches may or may not have SPC hotspots for SPC data collection associated with them. An example of a sketch 222 with SPC hotspots is shown in FIG. 19 and an example of a sketch 201 without SPC hotspots is shown in FIG. 18.

Figure 18:
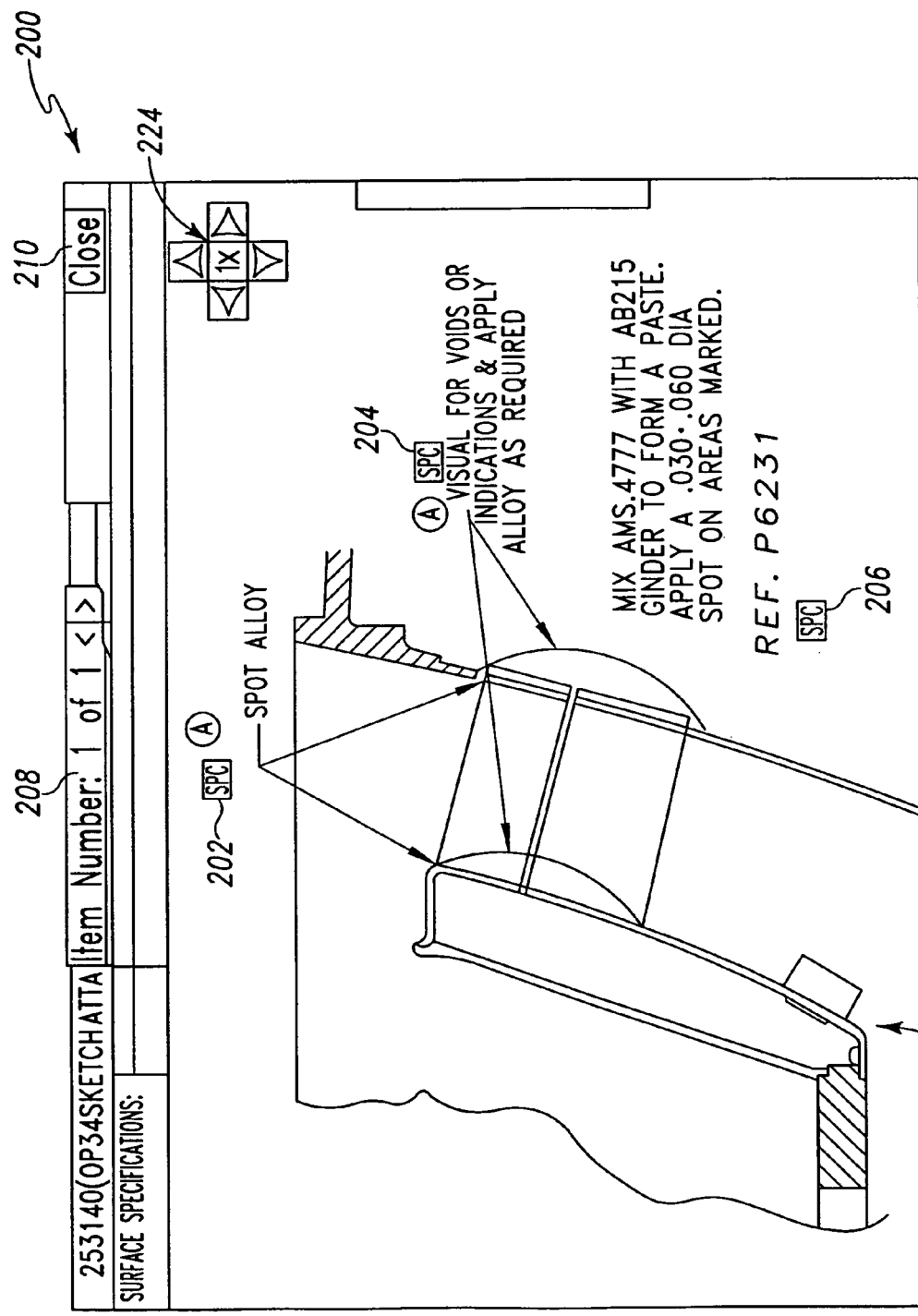
FIG. 18 shows an example of a sketch window displaying a sketch with SPC hotspots.

FIG. 18 shows a sketch window 200 which includes the sketch 201, a scroll/zoom control box 224, an item number control box 208, a close control 210, and SPC hotspots 202, 204, 206. By selecting the up, down, right or left pointing arrow in the scroll/zoom control box 224, the operator can scroll the sketch 222 up, down, right or left, respectively, in the sketch window 220 on the screen 19 of the tablet 18. By selecting the zoom box in the scroll/zoom control box 224, the operator can zoom in or zoom out on the sketch 222 in the sketch window 220 of the tablet 18 through a cycle of preset zoom levels. The item number control 208 indicates which item within a lot the sketch is being used for. By using the right and left arrows on the left side of the item number control box 208, the operator can look at sketch for the next or previous item in the lot, respectively. For example, if there are two items in a lot and SPC measurements need to be entered for each item in the lot, then the operator could enter SPC measurements for the first item, advance the item control number and enter SPC measurements for the second item. The SPC hotspots 202, 204, 206 are placed on the sketch next to dimensions which are to be measured and recorded for quality assurance and tracking. By selecting one of the SPC hotspots, the operator can enter an SPC measurement for the characteristic associated with the selected SPC hotspot. Prior to data entry, the SPC hotspot is displayed in a yellow box, and after data entry it is displayed in a green box. This enables the operator to easily tell from the sketch which measurements have already been entered and which still need to be entered.

Figure 19:
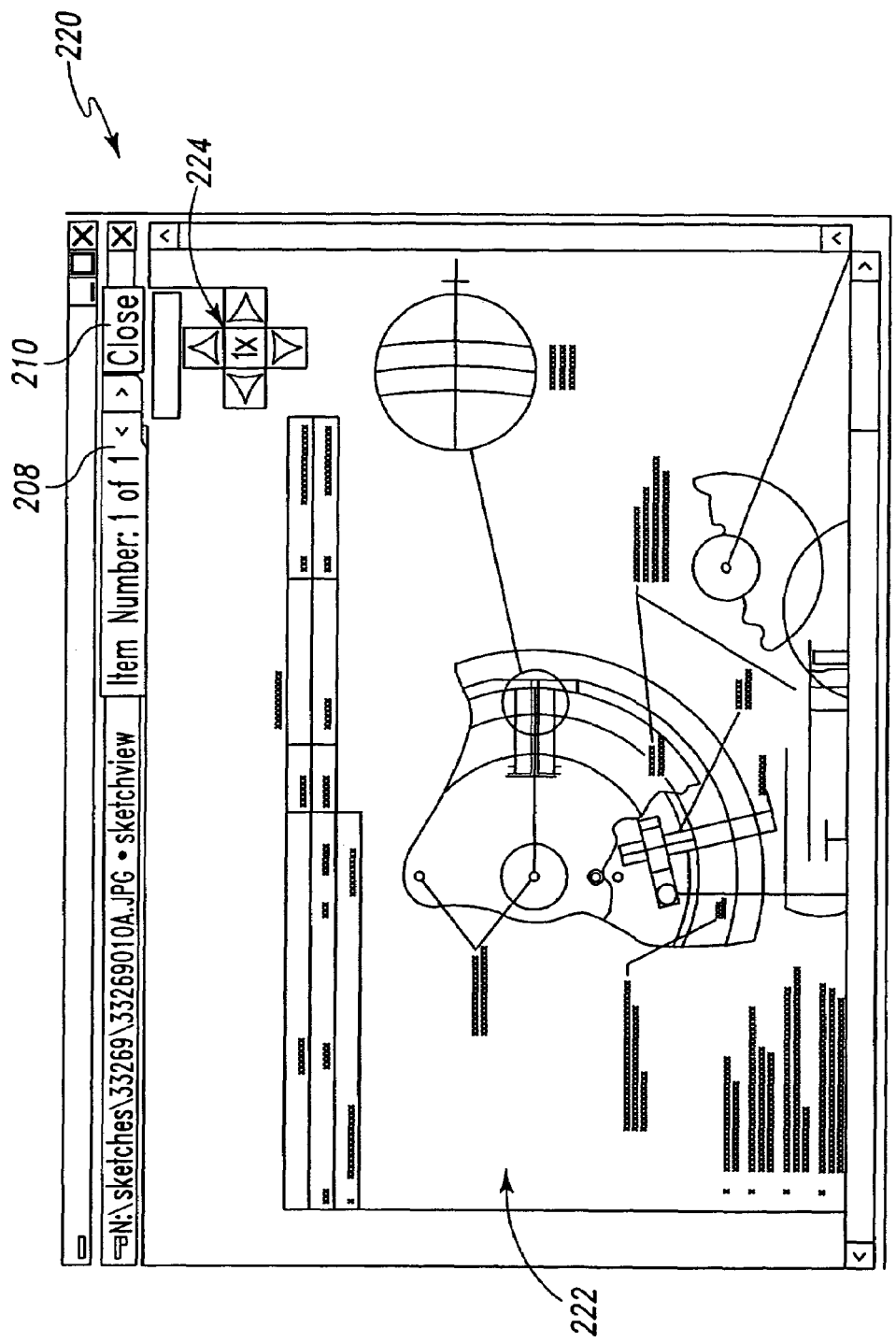
FIG. 19 shows an example of a sketch window displaying a sketch without SPC hotspots.

FIG. 19 shows a sketch window 220 which includes the sketch 222, the scroll/zoom control box 224, the item number control box 208, and the close control 210. The scroll/zoom control box 224, the item number control box 208 and the close control 210 perform the same functions described with regard to FIG. 18. By selecting the close control 210, the operator can close the sketch and return to the main job screen 106 shown in FIG. 11.

Figure 17:
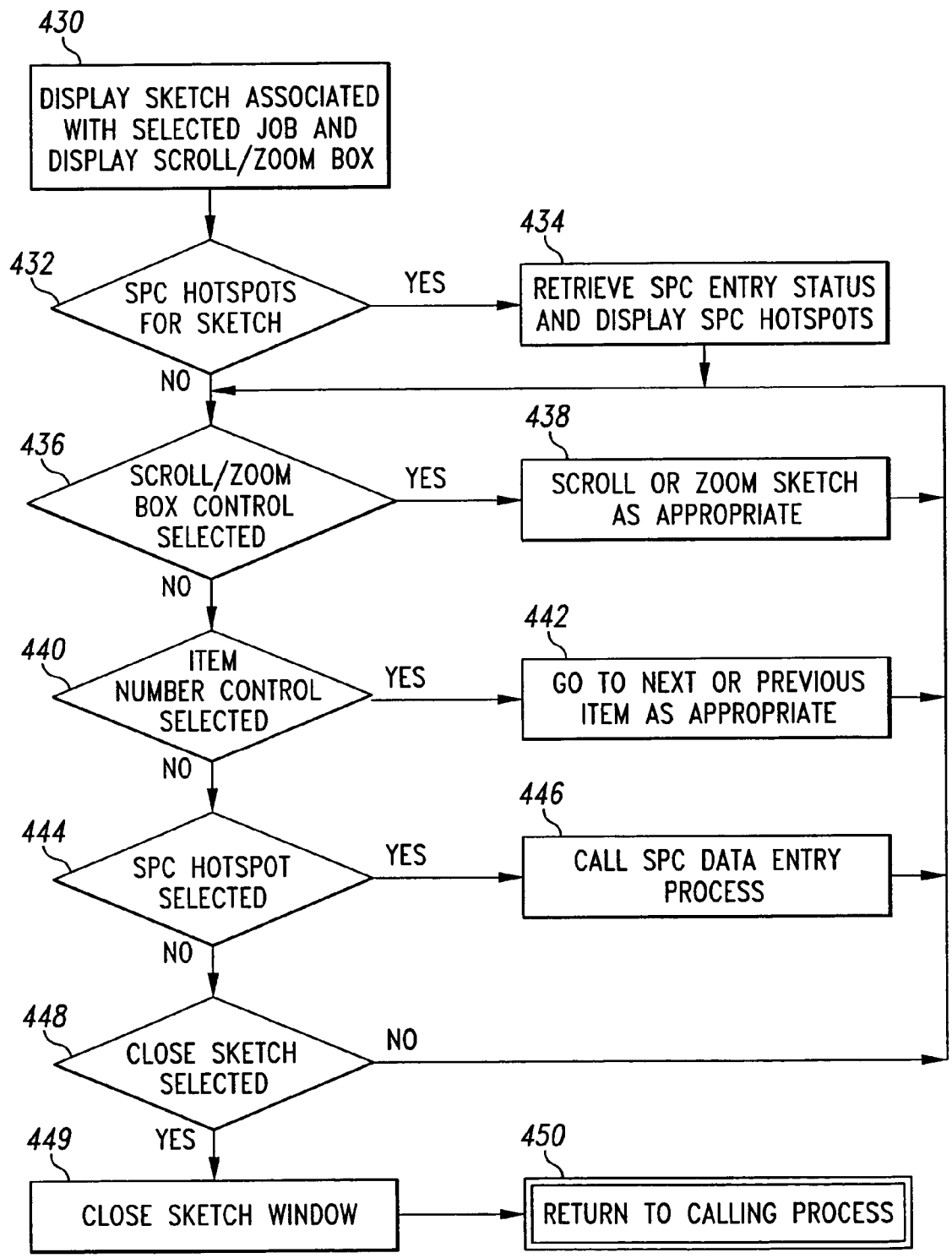
FIG. 17 shows a functional representation of a view sketch process.

A functional representation of the view sketch process 41 is shown in FIG. 17. The view sketch process 41 is activated when the operator selects the View Sketch button 126 on the main job window 106. The View Sketch button 126 is only available for selection if there is a sketch for the selected job. If there is more than one sketch for the job, the view sketch process 41 displays a list of sketches. The operator can then choose the desired sketch from the list. At step 430, the view sketch process 41 retrieves and displays the sketch associated with the selected job or the sketch selected from the list of sketches, and displays the control boxes for the sketch window 220. At step 432, the view sketch process 41 checks whether there are any SPC hotspots for the sketch. If there are any SPC hotspots, then, at step 434, the status of the SPC hotspots is determined and the SPC hotspots are displayed. The status is used to indicate to the operator whether or not an SPC measurement has been entered for a particular SPC hotspot. The view sketch process 41 then awaits a control selection by the operator.

If the operator selects one of the scroll arrows or the zoom control of the scroll/zoom control box 224, step 436 is activated which transfers control to step 438. At step 438, the view sketch process 41 scrolls or zooms the sketch in the sketch window 220. The view sketch process 41 then returns to await another control selection by the operator.

If the operator selects one of the arrows of the item number control 108, step 440 is activated which transfers control to step 442. At step 442, the view sketch process 41 displays the sketch 201 for next or the previous item of the lot in the sketch window 220 depending on whether the right or left arrow, respectively, was selected. The view sketch process 41 then returns to await another control selection by the operator.

If the operator selects one of the SPC hotspots 202, 204 or 206, step 444 is activated which transfers control to step 446. At step 446, the SPC data entry process 42 (described below) is called. After the SPC measurement has been entered, the view sketch process 41 then returns to await another control selection by the operator.

If the operator selects the close sketch control 210, step 448 is activated which transfers control to step 449. At step 449, the sketch window 220 is closed and then, at step 450, control is returned to the calling process.

Figure 21:
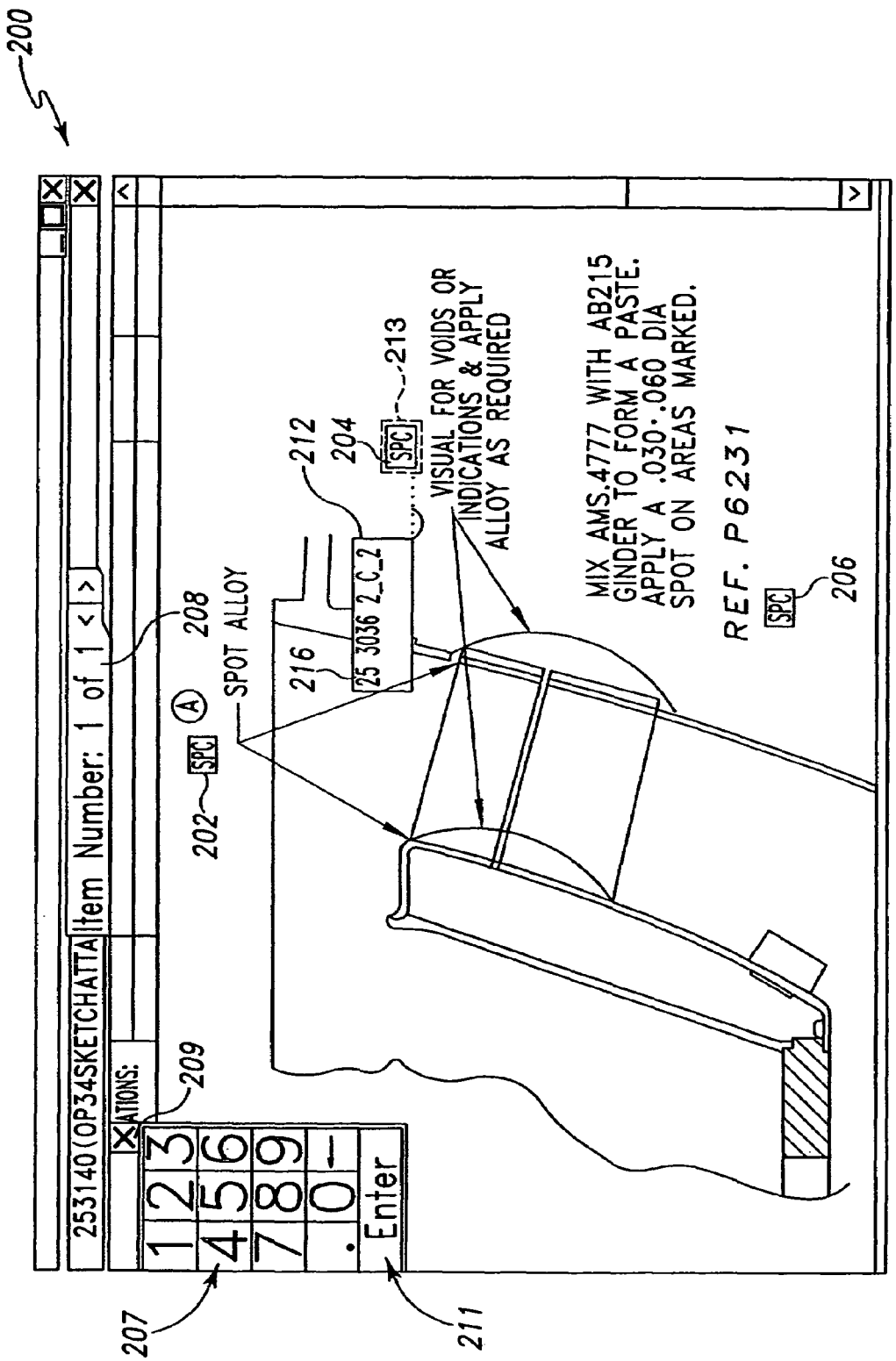
FIG. 21 shows an example of a sketch with a selected SPC hotspot for measurement entry.

The SPC data entry process 42 is activated when an operator selects an SPC hotspot from a sketch window while in the view sketch process 41. FIG. 21 shows the same sketch 201 shown in FIG. 18 after the SPC hotspot 204 has been selected. When the SPC hotspot 204 is selected, the SPC data entry process 42 is activated which adds a numeric keypad 207 with a close icon 209 and an enter button 211, an outline appearance 210 to the hotspot 204 showing that it is currently active, and an SPC data entry field 212 which includes the name of the characteristic 216 associated with the SPC hotspot 204. The operator can enter the SPC data into data entry field 212 with stylus 21 and keypad 207.

Statistical process control, SPC, is used to verify that the critical dimensions of a given lot of parts are within acceptable tolerances. It is the job of the operator to make sure that every nth part, such as every twentieth part, of the lot meets the required tolerances.

Figure 20:
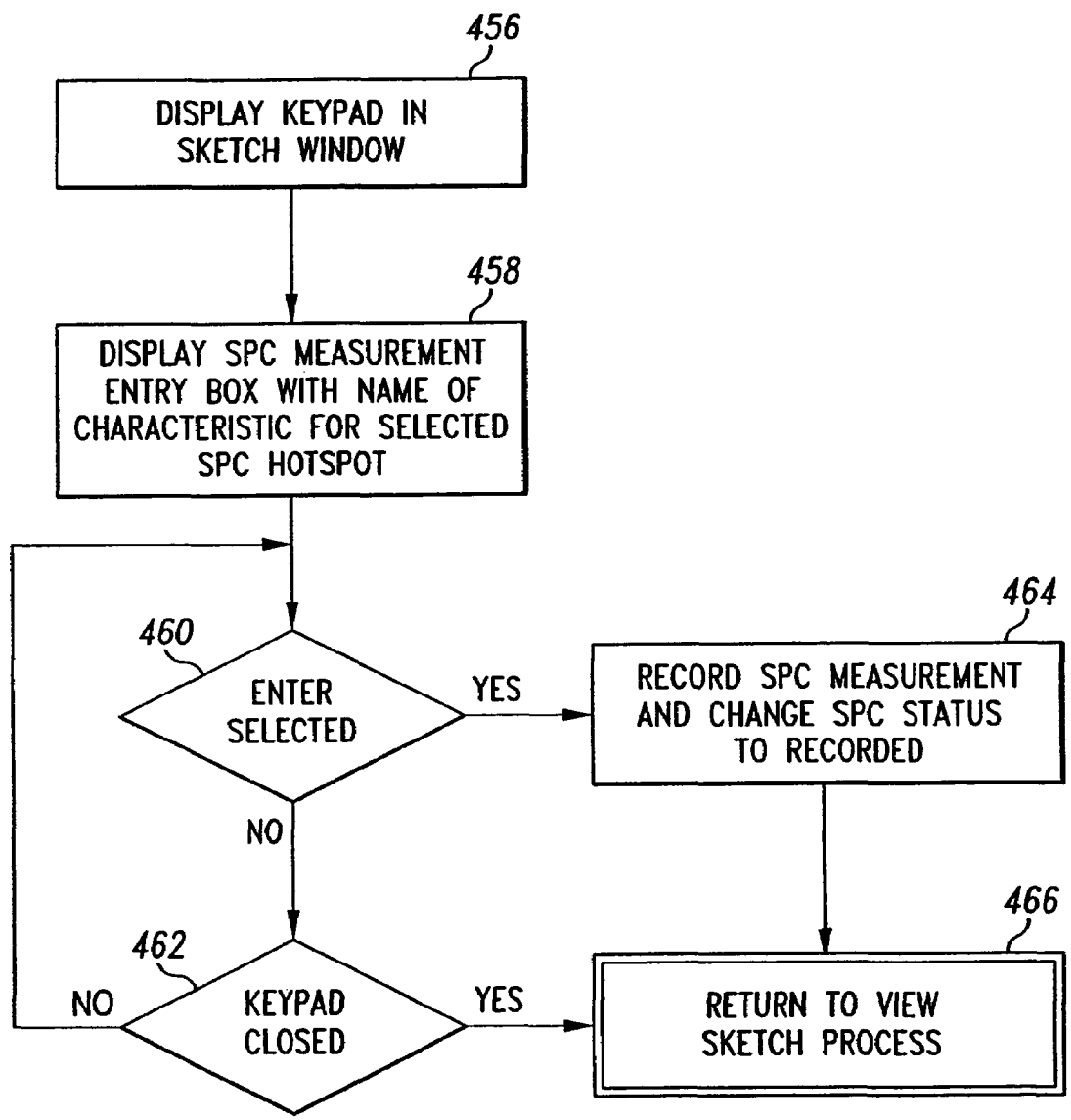
FIG. 20 shows a functional representation of an SPC data entry process.

A functional representation of the SPC data entry process 42 is shown in FIG. 20. When the operator selects an SPC hotspot, for example hotspot 204 in FIG. 18, the SPC data entry process 42 is activated. At step 456, the numeric keypad 207 is added to the sketch window 200 (see FIG. 21). At step 458, the SPC measurement entry box 212 is displayed and the characteristic name 216 to be recorded is displayed in the SPC measurement entry box 212. The SPC data entry process 42 then waits for either the enter key 211 or the close icon 209 of the numeric keypad 207 to be selected by the operator. Meanwhile, the operator uses the stylus 21 to enter an SPC measurement using the numeric keypad 207, to select the enter key 211, or to select the close icon 209.

The operator selects the enter key 211 after entering the SPC measurement in the SPC entry field 212. When the enter key 207 is selected, step 460 is activated which transfers control to step 464. At step 464, the SPC data entry process 42 records the SPC measurement entered in the SPC entry field 212 and changes the SPC status to recorded. When the SPC status for a hotspot is recorded, the color of the SPC hotspot on the sketch is green to indicate that a measurement has already been recorded for the SPC hotspot. Then at step 466, the SPC data entry process 42 returns control to the view sketch process 41.

The operator selects the close icon 209 to exit the SPC data entry process 42 without entering an SPC measurement. When the close icon 209 is selected, step 462 is activated which transfers control to step 466. At step 466, the SPC data entry process 42 returns control to the view sketch process 41.

Since sketches 222 and associated data are often subject to change, operators are alerted when viewing a sketch 222 that has changed recently. When an operator presses the View Sketch button 126, a "View New Sketches" button 131 becomes available if the selected sketches 222 have changed. The operator presses the View New Sketches button 131 to view the new sketches 222. After a predetermined number of operations of the View New Sketch button 131, the View New Sketch button 131 no longer appears, thus ensuring that the operator is knowledgeable about the changes to sketch 222. Alternatively, instead of a View New Sketches button 131 appearing, the View Sketch button 126 toggles to contain the "View New Sketch" caption. After a predetermined number of operations, the View New Sketch caption disappears, thus ensuring that the operator is knowledgeable about the changes to sketch 222.

The tablet application 24 requires that the operator stop every active job before logging off of the tablet 18. The stop job process 46 is used by an operator to end his assignment to a job and to indicate the status of the job when he has completed his assignment. When a job is stopped, it is either a completed job or an incomplete job for at least one of a number of reasons. The operator initiates the stop job process 46 by selecting the Stop Job button 114 of the main job window 106 shown in FIG. 11.

Figure 22A:
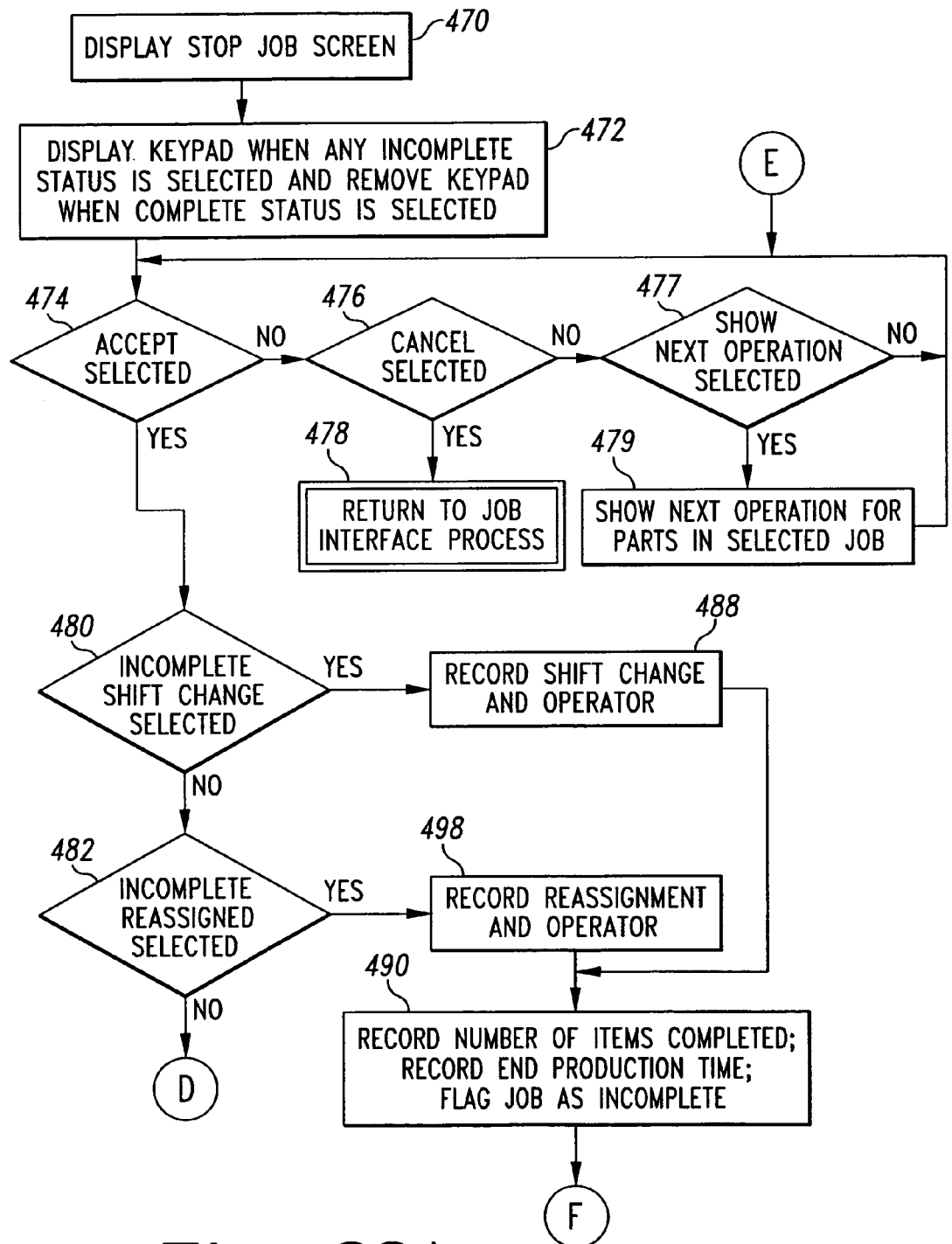
FIGS. 22a and 22b show a functional representation of a stop job process.
Figure 22B:
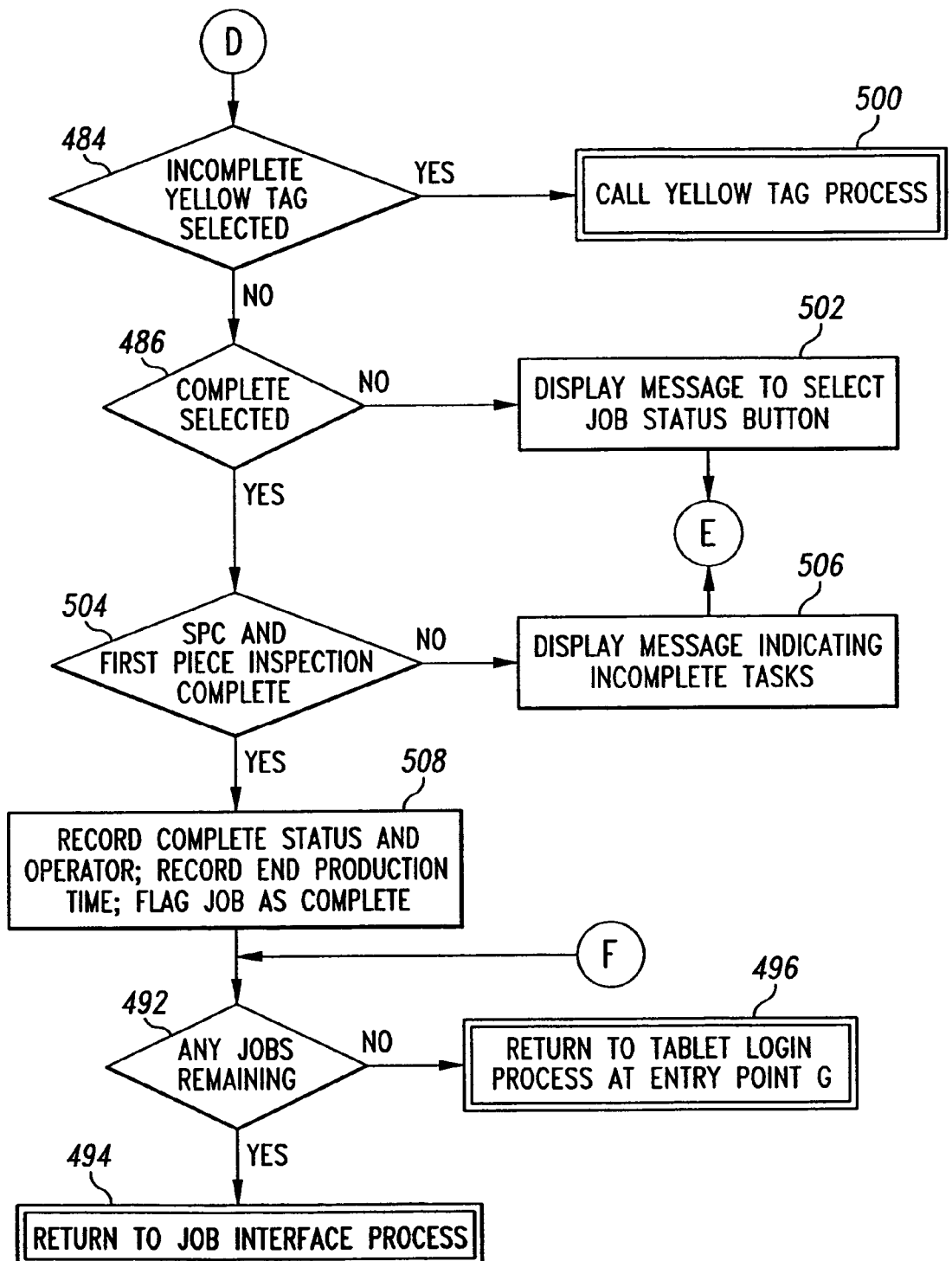
Figure 23:
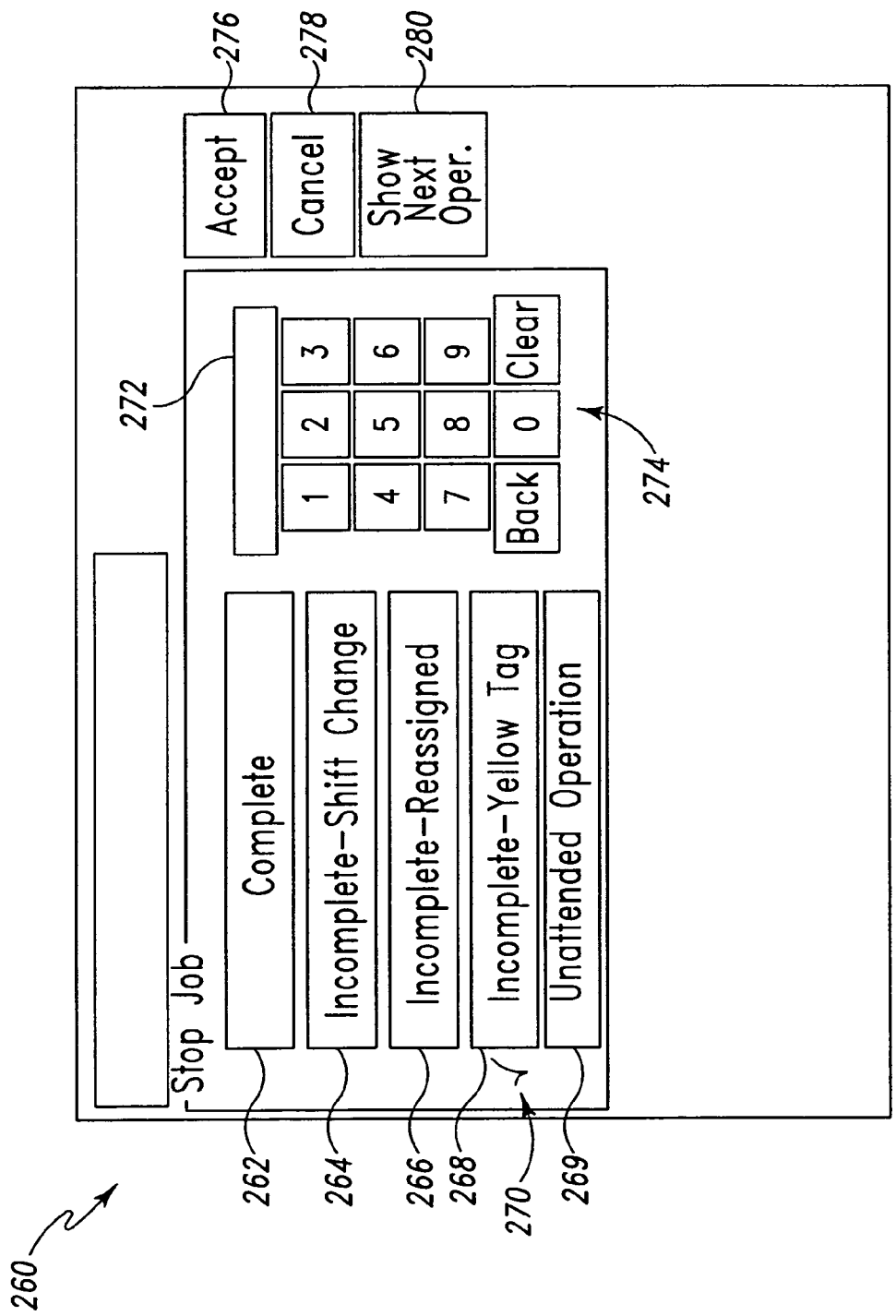
FIG. 23 shows an example of a stop job window.

A functional representation of the steps of the stop job process 46 are shown in FIGS. 22*a* and continue into FIG. 22*b*. At step 470, the stop job process 46 displays a stop job window. FIG. 23 shows an example of a stop job window 260. The stop job window 260 presents the operator with five simulated buttons from which to indicate the status of the stopped job. A complete button 262 is used to indicate that the job is complete. Incomplete buttons 264, 266 and 268 are used to indicate that the job is stopped but is still incomplete for some reason. The Unattended Operation button 269 functions the same a the complete button 262, except that the job is posted as complete only after the expiration of the entire standard time of the job, e.g. if the standard time for a job is 4 hours, and the operator stops the job as unattended after 2 hours, the job will be posted as complete after expiration of the 4 hour period.

The Incomplete-Shift Change button 264 is used to indicate that the operators shift ended before the job was completed. The Incomplete-Reassigned button 266 is used to indicate that the job or operator was reassigned before the job was completed. The Incomplete-Yellow Tag button 268 is used to indicate that the job was stopped due to some discrepancy. Of course other job status buttons could be made available in the stop job window 260. If the operator has highlighted one of the incomplete buttons 264, 266, 268 then a simulated numeric keypad 274 is displayed for the operator to enter the number of items completed in an items completed field 272. If the operator highlights the complete button 262, the numeric keypad 274 is removed from the stop job window 260. The stop job window 260 also contains an Accept button 276 which the operator uses to record his entries, a Cancel button 278 which the operator uses to return to the job interface process 36, and a Show Next Operation button 280 which the operator uses to have the tablet automation application 24 show the next operation to be performed on the parts in the currently selected job.

From the stop job window 260, the operator can switch between any of the four status buttons 262, 264, 266, 268. An indicator 270 is used to indicate the job status currently selected. Alternatively, the status button could be highlighted, or changed in color to indicate that it is currently selected. At step 472, the stop job process 46 determines whether the currently selected job status button is the complete button 262 or one of the incomplete buttons 264, 266, 268. If the currently selected job status button is one of the incomplete buttons 264, 266, 268, then the keypad 274 is displayed for the operator to enter the number of completed items. If the currently selected job status button is the complete button 262, then the keypad 274 is not displayed.

At steps 474, 476 and 477; the stop job process 46 waits for the operator to select either the Accept button 276, the Cancel button 278 or the Show Next Operation button 280, respectively.

The Cancel button 278 is used to exit stop job process 46 without recording the status of the job and without ending the operators assignment to the job. When the Cancel button 278 is selected, step 476 is activated which transfers control to step 478. At step 478, the stop job process 46 returns control to the job interface process 36 and redisplays the main job window 106.

The Show Next Operation button 280 is used to show the next operation to be performed on the parts in the currently selected job. When the Show Next Operation button 280 is selected, step 477 is activated which transfers control to step 479. At step 479, the stop job process 46 displays a window showing the next operation to be performed on the parts in the currently selected job. The operator can view this information to determine where to transport the completed parts for further production. When the window showing the next operation is closed, the stop job process 46 returns to steps 474, 476 and 477 to again wait for the operator to select either the Accept button 276, the Cancel button 278 or the Show Next Operation button 280, respectively.

The Accept button 276 is used to record the job status entries entered by the operator. When the Accept button 276 is selected, step 474 is activated and the stop job process 46 uses steps 480, 482, 484, 486 to determine which of the four job status buttons was selected. If none of the four status buttons was selected, then step 486 transfers control to step 502. At step 502, the stop job process 46 displays a message for the operator to select a job status button, and control returns to steps 474, 476 and 477 to again wait for the operator to select either the Accept button 276, the Cancel button 278 or the Show Next Operation button 280, respectively.

If the Incomplete-Shift Change button 264 is selected then step 480 is activated which transfers control to step 488. At step 488, the tablet application 24 records the operators identification and the status of the job as incomplete due to a shift change. Control is then transferred to step 490, where the tablet application 24 records the number of items completed from the items completed field 272, the end production time for the job, and flags the job as incomplete. Control is then transferred to step 492 shown in FIG. 22b. At step 492, the stop job process 46 of the tablet application 24 determines whether the operator is assigned to any other jobs. If the operator is assigned to another job, then at step 494, the operator is returned to the job interface process 36 which displays the main job window 106 shown in FIG. 11. If the operator is not assigned to any other jobs, then at step 496, the operator is returned to the tablet login process 34 at entry point G which at step 56 displays the welcome window 60 shown in FIG. 5 from which the operator can choose a new job or logout of the tablet application 24.

If the Incomplete-Reassigned button 266 is selected then step 482 is activated which transfers control to step 498. At step 498, the tablet application 24 records the operators identification and the status of the job as incomplete due to a reassignment. Control is then transferred to step 490, where the tablet application 24 records the number of items completed from the items completed field 272, the end production time for the job, and flags the job as incomplete. Control is then transferred to step 492 shown in FIG. 22b. At step 492, the stop job process 46 of the tablet application 24 determines whether the operator is assigned to any other jobs. If the operator is assigned to another job, then at step 494, the operator is returned to the job interface process 36 which displays the main job window 106 shown in FIG. 11. If the operator is not assigned to any other jobs, then at step 496, the operator is returned to the tablet login process 34 at entry point G which displays the welcome window 60 shown in FIG. 5 from which the operator can choose a new job or logout of the tablet application 24.

If the Incomplete-Yellow Tag button 484 is selected then step 484 is activated which transfers control to step 500. At step 500, the stop job process 46 transfers control to the yellow tag process 50.

If the Complete button 266 is selected then step 486 is activated which transfers control to step 504. At step 504, the tablet application 24 checks that all necessary entries for completion of the job have been made by the operator including any required statistical process control (SPC) measurements and any required first piece inspections. If the required entries were not entered then control is transferred to step 506. At step 506, the stop job process 46 displays a message indicating the entries which are still required for the job, and control returns to steps 474, 476 and 477 to again wait for the operator to select either the Accept button 276, the Cancel button 278 or the Show Next Operation button 280, respectively.

If the required entries were made then control is transferred to step 508 where the tablet application 24 records the operator identification, the status of the job as complete, the end production time for the job, and flags the job as complete. Control is then transferred to step 492 where the stop job process 46 determines whether the operator is assigned to any other jobs. If the operator is assigned to another job, then at step 494, the operator is returned to the job interface process 36 which displays the main job window 106 shown in FIG. 11. If the operator is not assigned to any other jobs, then at step 496, the operator is returned to the tablet login process 34 at entry point G which at step 56 displays the welcome window 60 shown in FIG. 5 from which the operator can choose a new job or logout of the tablet application 24.

The yellow tag process 50 is initiated by the operator when the piece is discrepant and needs to be routed to inspection. A supervisors authorization is usually required to yellow-tag a job. Once a job has been yellow-tagged the parts from the job are routed to inspection where an inspector will review the parts and the entered yellow-tag information to determine whether the parts are unacceptable and a discrepancy report should be generated, or whether the parts are acceptable and the yellow-tag should be cleared from the job.

Figure 24:
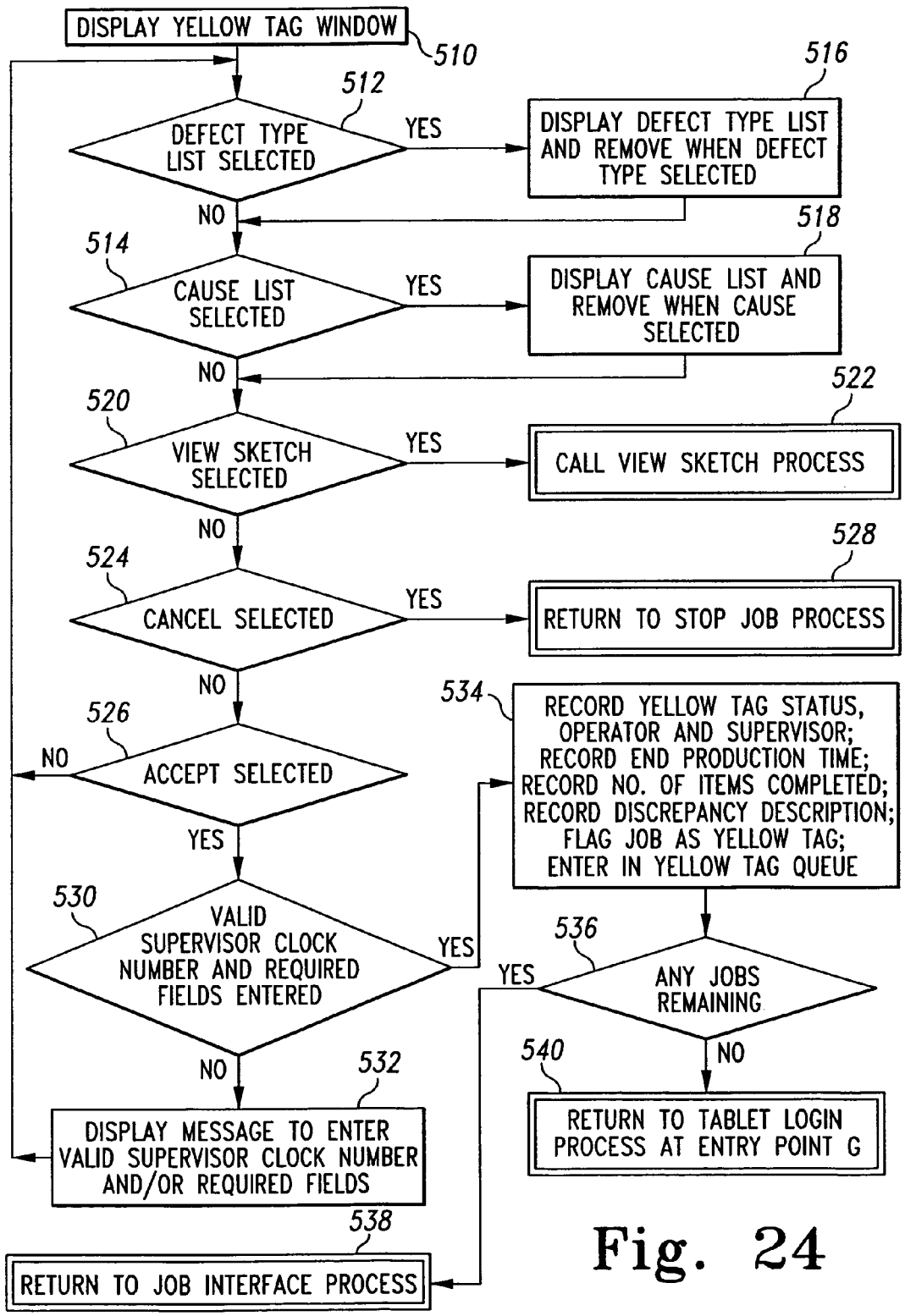
FIG. 24 shows a functional representation of a yellow tag process.
Figure 25:
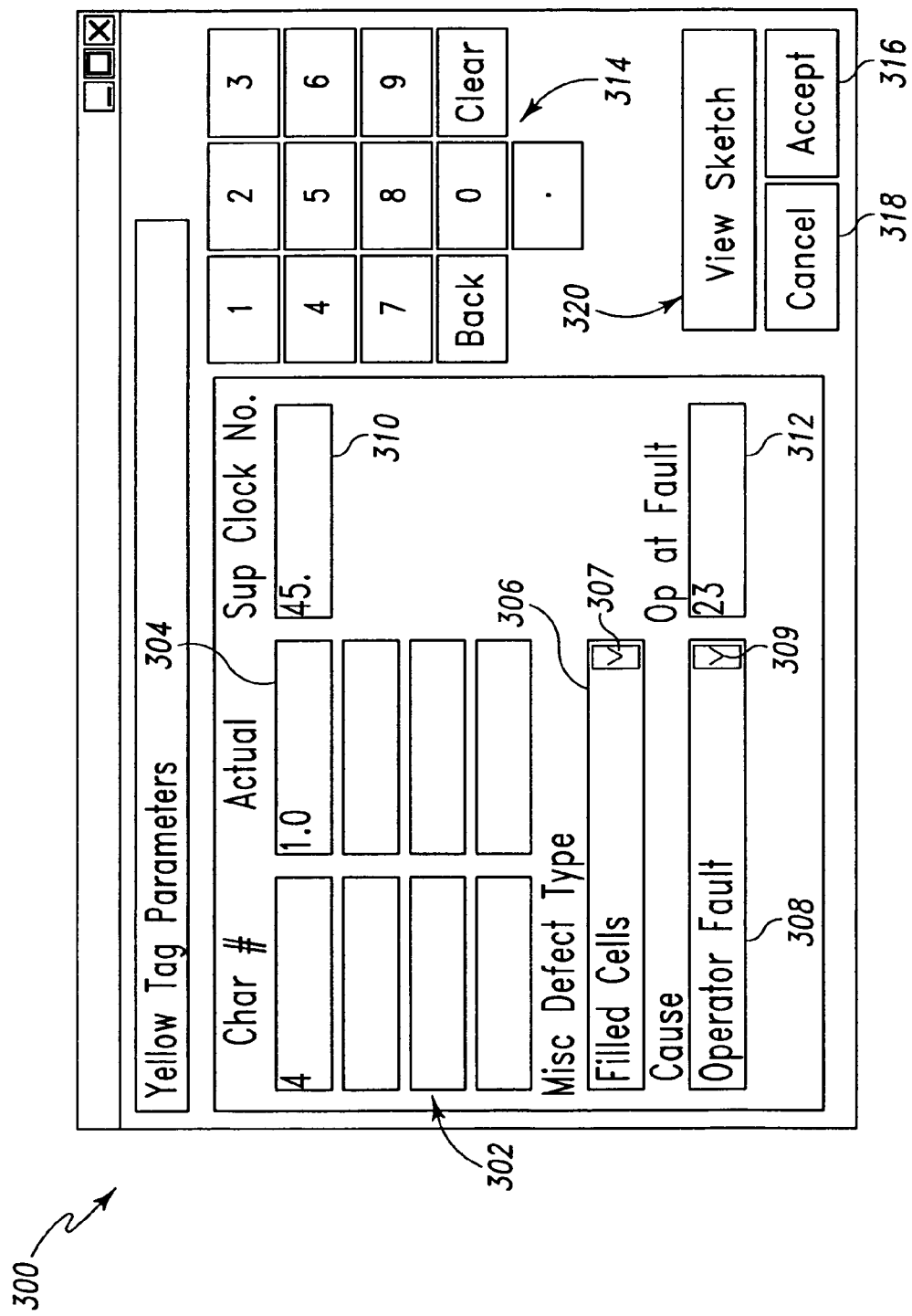
FIG. 25 shows an example of a yellow tag window.

A functional representation of the steps of the yellow tag process 50 are shown in FIG. 24. At step 510, the yellow tag process 50 displays the yellow tag window. FIG. 25 shows an example of a yellow tag window 300. The yellow tag window 300 presents the operator with multiple characteristic number fields 302 and multiple actual measurement fields 304 for the entry of discrepant information for the parts. The characteristic numbers for the parts are shown in the sketches which can be viewed by selecting a view sketch button 320. The operator enters the discrepant characteristic number in the discrepant characteristic field 302 and the actual measurement of the discrepant characteristic in actual measurement fields 304. For each discrepant characteristic the operator must enter an actual measurement for the characteristic. The operator can enter multiple discrepant characteristics and actual measurements for the yellow-tagged job. The yellow tag screen 300 also includes a selectable miscellaneous defects field 306 and a defect cause field 308. Examples of a miscellaneous defects are dent, scratch, filled cells, etc. Examples of discrepancy cause include operator fault. When operator fault is selected in the cause field 308, an operator at fault field 312 is displayed in which the operators identification or clock number is entered. A supervisor clock number field 310 is used for authorization of the yellow tag for the job. A simulated numeric keypad 314 is used to enter the data in the discrepant characteristic fields 302, the actual measurement fields 304, the supervisor clock number field 310, and the operator at fault field 312. The yellow tag screen 300 also includes an accept button 316 which is used to record the yellow tag entries, and a cancel button 318 which the operator uses to return to the stop job process 46 which displays the stop job window 260 shown in FIG. 23.

The operator uses the keypad 314 to enter the appropriate values in the various numeric fields. At step 512, the yellow tag process 50 monitors a defect drop-down list selector 307. When the drop-down list selector 307 is selected, step 512 is activated which transfers control to step 516. At step 516, the yellow tag process 50 displays a defect type drop down list from which the operator can select a defect type to be entered in the miscellaneous defect field 306. At step 514, the yellow tag process 50 monitors a cause list selector 309. When the cause list selector 309 is selected, step 514 is activated which transfers control to step 518. At step 518, the yellow tag process 50 displays a cause drop down list from which the operator can select a cause to be entered in the cause field 308. At step 520, the yellow tag process 50 monitors the view sketch button 320. When the view sketch button 320 is selected, step 520 is activated which transfers control to step 522. At step 522, the yellow tag process 50 calls the view sketch process 41. The operator can find the characteristic numbers to be entered in fields 302 on the sketch.

At steps 524 and 526, the yellow tag process 50 waits for the operator to select either the accept button 316 or the cancel button 318. The accept button 316 is used to record the yellow tag information entered by the operator. The Cancel button 318 is used to exit the yellow tag process 50 without recording the yellow tag information. When the Cancel button 318 is selected, then 524 is activated which transfers control to step 528. At step 528, the yellow tag process 50 returns control to the stop job process 46 and redisplays the stop job window 260.

When the Accept button 316 is selected, step 526 is activated which transfers control to step 530. At step 530, the yellow tag process 50 checks whether a valid supervisor clock number is entered in the supervisor clock number field 310 and whether the required fields have been entered. If a valid supervisor clock number is not entered or the required fields are not entered, then step 530 transfers control to step 532. At step 532, the yellow tag process 50 displays a message for the operator to enter a valid supervisor clock number and/or the required fields, and control is returned to wait for further operator input.

If a valid supervisor clock number and the required fields are entered, then step 530 transfers control to step 534. At step 534, the tablet application 24 records the operator and supervisors identification, the yellow tag status, the end production time for the job, the number of items completed which was entered in the items completed field 272 of the end job window 260, the discrepancy information entered on the yellow tag window 300, flags the job as yellow tagged and enters it in the yellow tag queue for review by an inspector. Control is then transferred to step 536. At step 536, the yellow tag process 50 of the tablet application 24 determines whether the operator has any other pending jobs. If the operator has another pending job, then at step 538, the operator is returned to the job interface process 36 which displays the main job window 106 shown in FIG. 11. If the operator does not have any other pending jobs, then at step 540 the operator is returned to the tablet login process 34 at entry point G which at step 56 displays the welcome window 60 shown in FIG. 5 from which the operator can choose a new job or logout of the tablet application 24.

Throughout its operation the time tracking process 38 of the tablet automation application 24 tracks the operators time allocation to the various jobs accepted by the operator and the operator's excess time which is not allocated to a job. In the described embodiment, time is allocated to either setup, production or excess time. In the time status indicator 112 of the main job window 106 shown in FIG. 11, the tablet automation application 24 displays, how time is currently being accumulated for the job. If an operator logged onto the tablet automation application 24 is not charging to production or setup time for any job, then excess time is accumulating.

Figure 27:
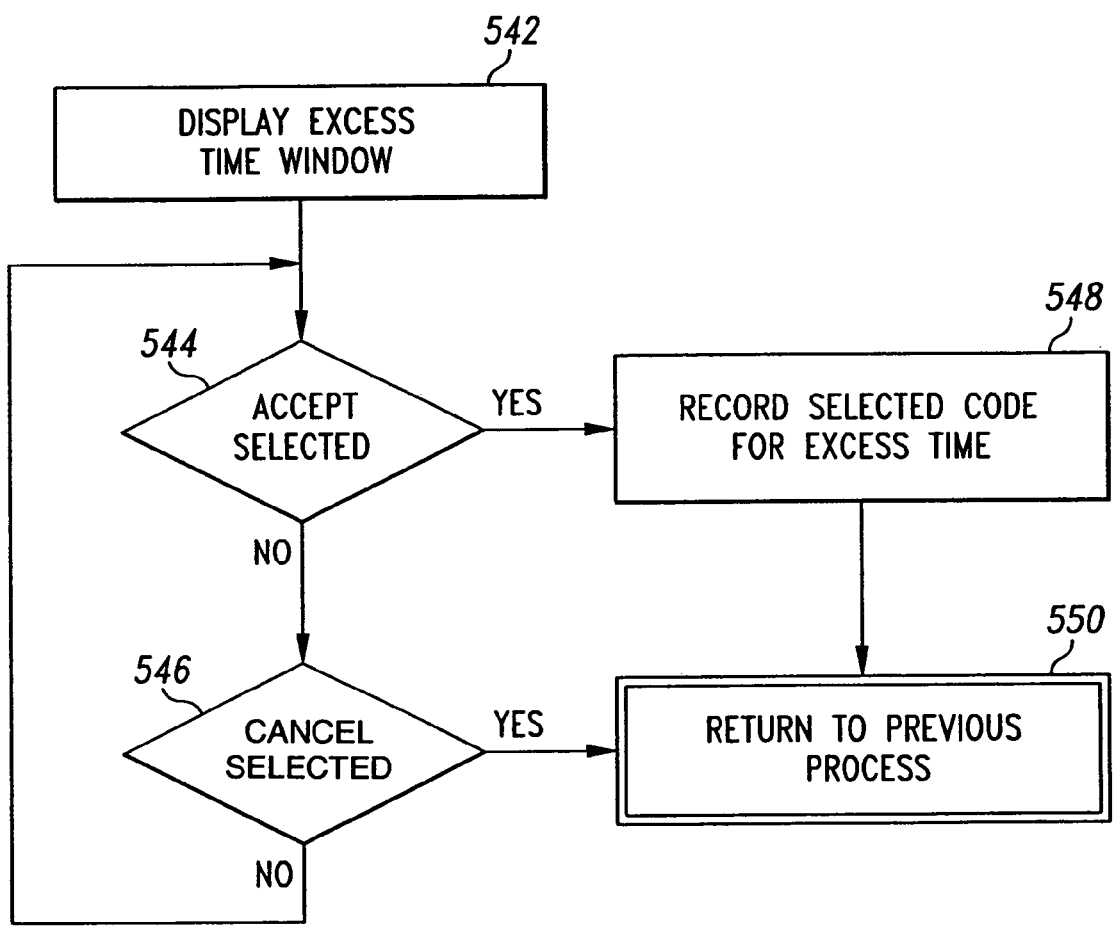
FIG. 27 shows a functional representation of an excess time process.
Figure 28:
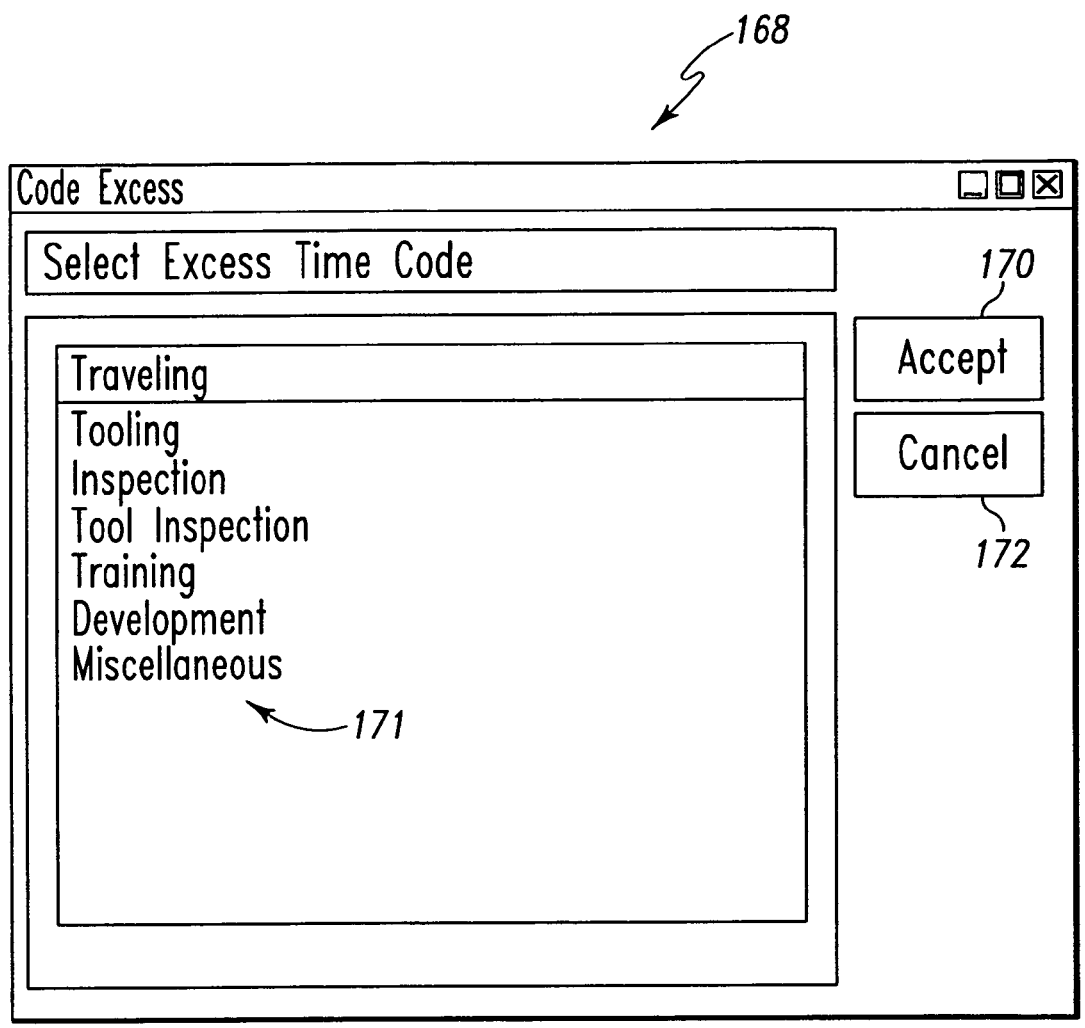
FIG. 28 shows an example of an excess time code selection window.

If excess time is accumulating and exceeds a predetermined duration, for example 5 minutes, the time tracking process 38 automatically activates the excess time process 43. The excess time process 43 can also be activated by the operator from the welcome window 60, shown in FIG. 5, by selecting the Code Elapsed Excess button 67. A functional representation of the excess time process 43 is shown in FIG. 27. When the excess time process 43 is activated, either automatically or manually, an excess time window is displayed at step 542. An example of an excess time window 168 is shown in FIG. 28. The excess time window 168 provides a category list 171 from which the operator can choose to charge the accumulated excess time, a simulated Accept button 170, and a simulated Cancel button 172. The operator selects a category for the accumulated excess time and then chooses the Accept button 170 to record the excess time allocation, or chooses the Cancel button 172 to avoid recording the excess time at this point. If the operator chooses the cancel button 172, excess time continues to accumulate and the operator will still be required to allocate the accumulated excess time to a category before logging off the tablet automation application 24. Accumulations of excess time which are less than the predetermined duration can be charged to a default category, for example traveling.

When the Accept button 170 is selected, step 544 is activated and control is transferred to step 548. At step 548, the excess time process 43 records the selected category for the accumulated excess time. Then at step 550, control is returned to the previous process. When the Cancel button 172 is selected, step 546 is activated and control is transferred to step 550. At step 550, control is returned to the previous process. The excess time process 43 can be called from various processes depending on what process is active when the excess time exceeds the predetermined duration and the tablet automation application 24 automatically activates the excess time process 43.

A discrepant material report ("DMR") can be initiated in different ways. An inspector can convert a job that has been yellow tagged into a DMR. Alternatively, an inspector can create and submit a new DMR. Once a DMR has been created, it is submitted to the discrepant material report station 16 (FIG. 1) for processing by the appropriate department, e.g. engineering. A DMR processing application 600 runs on the discrepant material report station 16 (FIG. 1).

Figure 29:
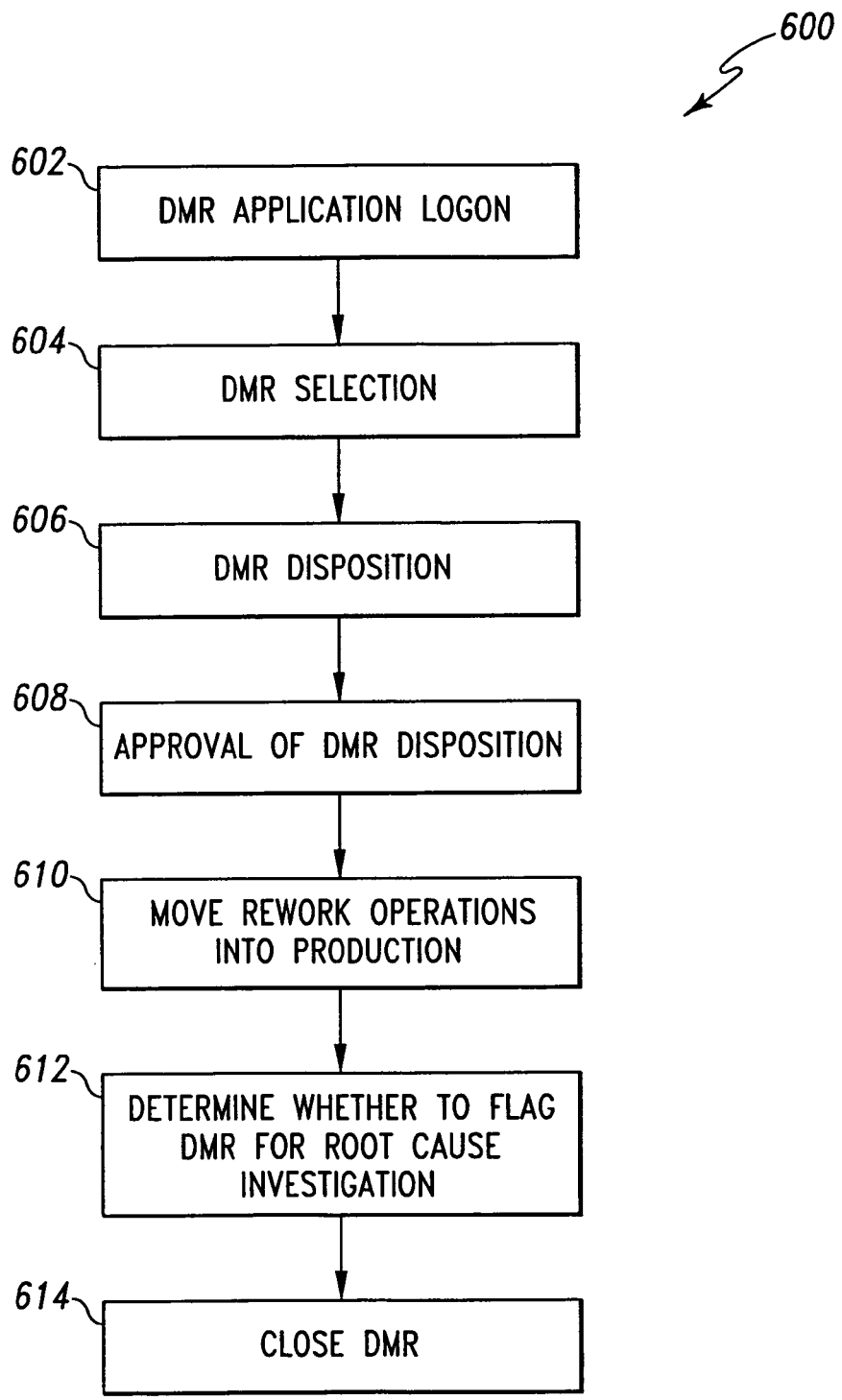
FIG. 29 shows a top-level functional representation of a DMR processing application.

A top-level functional representation of the steps of the DMR processing application 600 are shown in FIG. 29. At step 602, the DMR processing application 600 presents the user with a logon screen through which the application verifies the user identity and authorization. At step 604, after the user successfully logs on, the DMR processing application 600 presents the user with a list of DMRs from which to select a DMR for processing. At step 606, the DMR processing application 600 presents the user with information about the selected DMR and options and support for the disposition of the selected DMR. Dispositions for a DMR could include rework, use as is, return to vendor, send to customer material review board, or scrap. At step 608, the DMR processing application 600 ensures that the DMR disposition receives the proper approvals, e.g. by both a manufacturing engineer and a quality engineer. Once the disposition has been approved, at step 610, the DMR processing application 600 moves any rework operations into production. At step 612, the DMR processing application 600 either automatically flags or prompts the user as to whether to flag the DMR for a root cause investigation, depending on the dispositions of the DMR. At step 614, the DMR processing application 600 closes the DMR.

Figure 30:
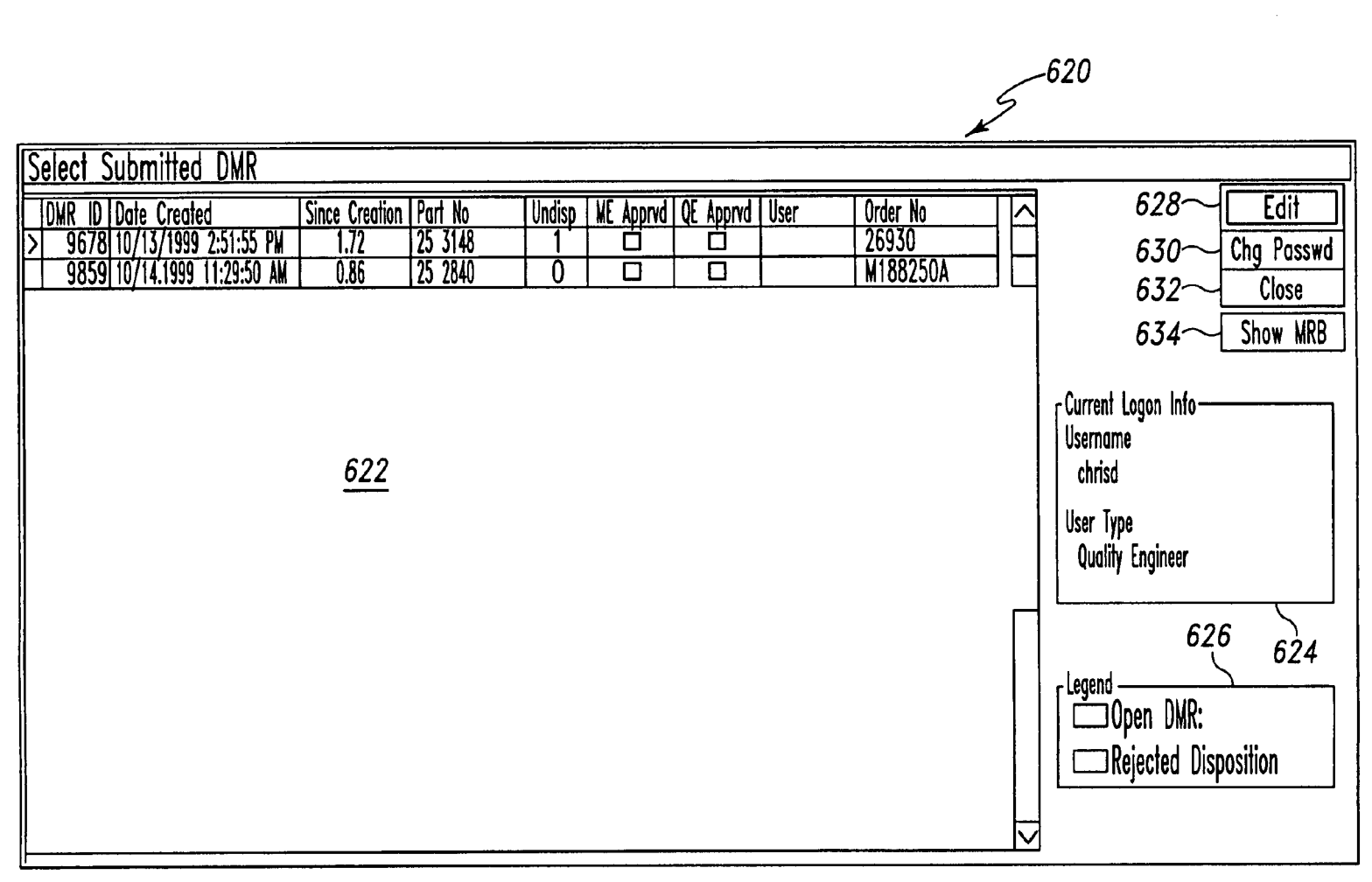

The DMR processing application 600 has a logon screen with fields for the entry of a user name and a password. This information is used to determine the identity of the user and to determine whether they are authorized to use the application. When a user successfully logs on, the DMR processing application 600 displays a DMR selection window from which the user can choose a DMR for processing. An example of a DMR selection window 620 is shown in FIG. 30.

The DMR selection window 620 includes a submitted DMR list 622, a current user login information section 624, a legend section 626, an Edit button 628, a Change Password button 630, a Close button 632 and an MRB button 634.

For each DMR, the submitted DMR list 622 includes: a DMR identifier which is a unique number assigned to each DMR, a date on which the DMR was written, the time in hours that have elapsed since the DMR was created, the part number the DMR is associated with, the number of undisposed items in the DMR, a manufacturing engineer (ME) approval field, a quality engineer (QE) approval field, a user name field, and the order number the DMR is associated with. The number of undisposed items in the DMR must be zero before the DMR can be closed. The user field is blank unless another user has already selected the DMR for processing. If another user has already selected the DMR, then their user name will be displayed in the user field for the DMR.

The current login information section 624 contains the user name and the user type for the user that is currently logged on the DMR application 600. For example, in FIG. 30 the current user is a quality engineer, thus the current user could provide quality engineer approval but not manufacturing engineer approval.

The legend section contains identification information for determining the status of a DMR in the submitted DMR list 622. In the DMR selection window 620 shown in FIG. 30, the legend section 626 shows two background colors for showing the DMR status. A DMR with a light background is an open DMR, and a DMR with a dark background is a DMR that was given a disposition that was rejected during the approval step 608 (FIG. 29).

The Change Password button 630 allows the user to change their password. The new password would be used to logon in subsequent sessions on the DMR application 600. The Close button 632 is used to close the DMR selection window 620.

The MRB button 634 allows the user to view or hide DMRs that have been dispositioned to the customer material review board (MRB). When the MRB button 634 displays the identifier "Show MRB" (see FIG. 30), the submitted DMR list 622 displays the submitted DMRs which have not been dispositioned to the MRB. When the Show MRB button 634 is selected, the submitted DMR list 622 displays only DMRs that have been dispositioned to the MRB and hides the other DMRs, and the identifier displayed on the DMR button 634 changes to "Hide MRB." When the Hide MRB button 634 is selected, the submitted DMR list 622 displays only non-MRB DMRs and hides the DMRs that have been dispositioned to the MRB, and the identifier displayed on the DMR button 634 changes back to "Show MRB."

Figure 31:
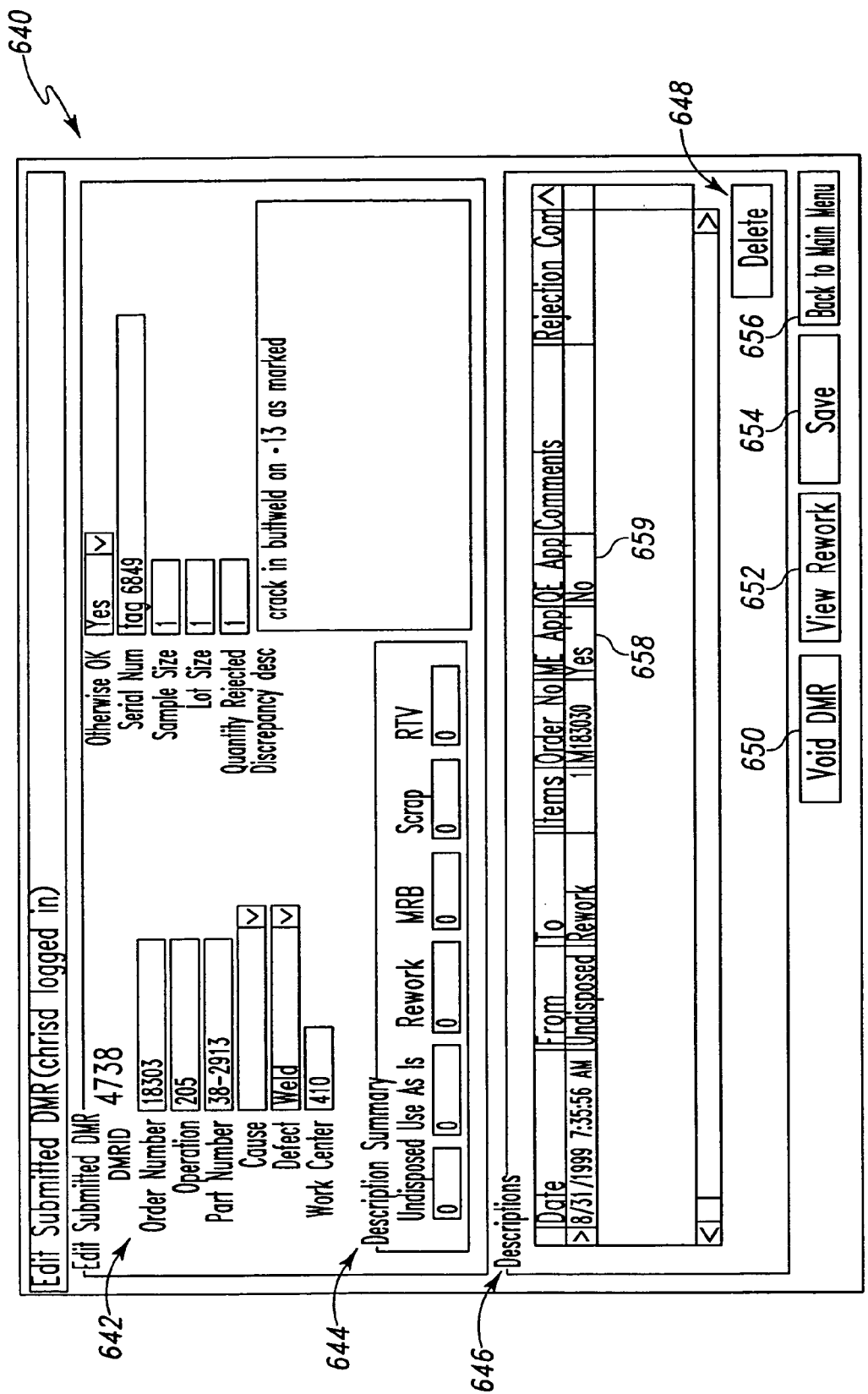
FIG. 31 shows an example of a DMR view window.

A user can select a DMR for processing by either double-clicking on the DMR in the submitted DMR list 622, or by highlighting the DMR in the submitted DMR list 622 and then selecting the Edit button 628. When the user selects a DMR for processing, the DMR application 600 displays a DMR view window 640. An example of a DMR view window 640 is shown in FIG. 31.

The DMR view window 640 displays all of the information available about the selected DMR. The DMR view window 640 includes a header information section 642, a disposition summary section 644, a dispositions created section 646, a Delete button 648, a Void DMR button 650, a View Rework button 652, a Save button 654, and a Main Menu button 656.

The DMR header section 642 contains general information regarding the currently selected DMR. The values in the DMR header section 642 are entered by the operator and supervisor during the yellow-tag process 50, and by the inspector during inspection and processing of the yellow-tagged parts. The information in the DMR header section 642 includes the unique DMR identifier, the manufacturing order number the DMR is associated with, the operation that triggered the DMR, the part number the DMR is associated with, the cause of the discrepancy as determined by the supervisor, the part defect responsible for the DMR, the operator at fault for the defect, the work center at which the defect occurred, an otherwise OK field which indicates whether the inspector determined that all other characteristics of the parts were within specifications, the serial number of the defective part, the sample size inspected, the quantity or lot size of the manufacturing order, the quantity of parts in the order rejected by the inspector, and a discrepancy description field which contains a textual description of the discrepancy as entered by the inspector.

The dispositions summary section 644 displays a summary of the dispositions of the parts associated with the DMR. The dispositions summary section 644 includes an undisposed field and a plurality of disposition fields. The undisposed field indicates the number of parts in the DMR that have not yet had a disposition assigned to them. Initially, the undisposed field has the same value as the quantity rejected in the DMR header section 642. The disposition fields shown in the DMR view window 640 include: Use As Is, Rework, Scrap, RTV (return to vendor), and MRB (send to customer material review board). The value in each disposition field indicates how many parts have been assigned that particular disposition. The sum of the undisposed field and the disposition fields equals the value in the quantity rejected field in the DMR header section 642. A DMR cannot be closed until all of the parts are given a disposition, i.e. the value in the undisposed field is zero. For example, if the quantity rejected is 10 pieces, and 3 have been given a disposition of "rework", 4 have been given a disposition of "use as is," and 1 has been given a disposition of "return to vendor," then the values in the disposition summary section 644 would be: 2 in the undisposed field, 4 in the "Use As Is" field, 3 in the "Rework" field, 0 in the "MRB" field, 0 in the "Scrap" field, and 1 in the "RTV" field.

When an engineer selects a disposition of "Use As Is", the engineer's name is recorded in the manufacturing routing as the completing operator. This allows the parts to be tracked to the engineer who approved the parts for use.

Figure 32:
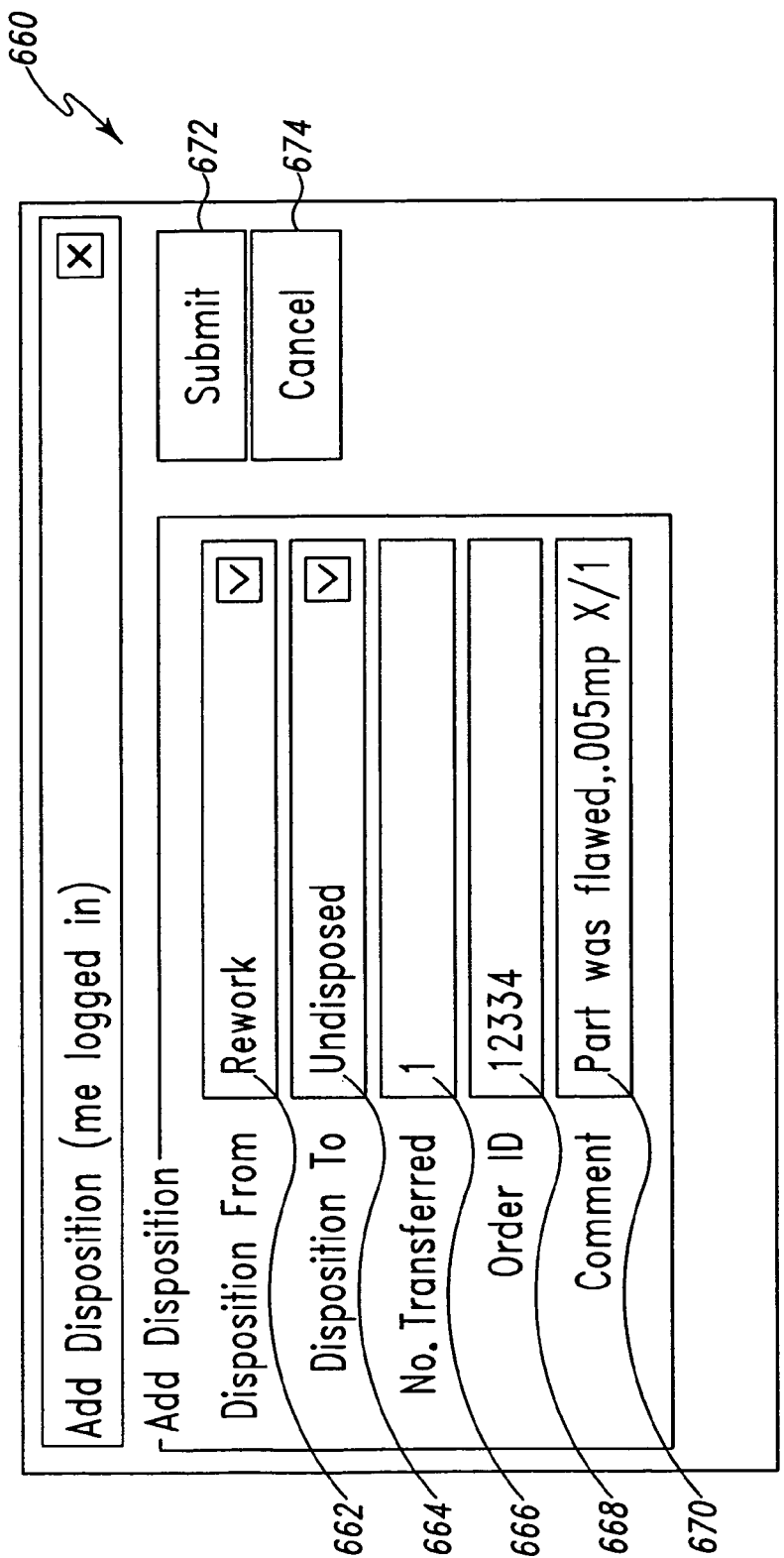
FIG. 32 shows an example of a DMR disposition window.

The fields in the disposition summary section 644 also function as buttons that are selectable by the user to input values for the amount of items that are to receive the selected disposition. When the user selects a disposition field button in the disposition summary section 644, a DMR disposition window is displayed. An example of a DMR disposition window 660 is shown in FIG. 32.

The DMR disposition window 660 includes a disposition from field 662, a disposition to field 664, a number of parts transferred field 666, an order ID field 668, a comment field 670, a submit button 672 and a cancel button 674. The disposition to field 662 and the disposition from field 664 are pull down menus which include entries for each of the fields in the disposition summary section 644. The disposition from field 662 defaults to Undisposed. The disposition to field 664 displays the entry of the disposition field button in the disposition summary section 644 that was selected by the user. The order ID field 668 defaults to the order number associated with the DMR. The user can change the disposition from field 662, the disposition to field 664, or the order ID field 668. The user enters the number of parts to receive the selected disposition in the number transferred field 666, and enters any necessary comments in the comments field 670. When the user selects the Submit button 672, the entries in the DMR disposition window 660 are recorded in the dispositions created section 646 of the DMR view window 640 and the DMR disposition window 660 is closed. When the user selects the Cancel button 674, the DMR disposition window 660 is closed and none of the entries are recorded.

Upon submitting a disposition for an item in the DMR disposition window 660, an entry is created in the dispositions created section 646 of the DMR view window 640. Each entry in the dispositions created section 646 includes the date when the disposition was created, the information entered in the DMR disposition window 660, a manufacturing engineer (ME) approval field 658, and a quality engineer (QE) approval field 659. The Delete button 648 allows a user to delete an entry in the dispositions created section 646. When a user highlights an entry in the dispositions created section 646 and selects the Delete button 648, the entry is removed from the dispositions created section 646 and the disposition summary section 644 is updated to show the status of the dispositions without the deleted entry. A disposition can not be deleted once it has been approved.

When a disposition is submitted, it has not yet been approved by either a quality engineer or a manufacturing engineer. Before the disposition becomes active, it must be approved by both a manufacturing engineer and a quality engineer. To approve a disposition, the user selects the appropriate approval field. If the current user does not have the appropriate authorization for the selected approval, then the DMR application 600 will display a pop-up window for entry of a user name and password with the proper authorization. If the current user has the appropriate authorization for the selected approval, then the DMR application 600 will display a pop-up window asking for confirmation of the approval. When all of the pieces included in the DMR have a disposition and all of the dispositions have been approved, pieces given a rework disposition will be routed to production for completion of the rework by an operator.

The Main Menu button 656 allows the user to return to the DMR selection window 620. The Save button 654 allows the user to save any data that has been changed in the DMR header section 642. The information regarding dispositions in the disposition summary section 644 and the dispositions created list 646 is automatically saved whenever the user enters new disposition information.

The Void DMR button 650 allows the user to void or delete the entire DMR. The Void DMR button 650 is only activated to be selectable by the user if none of the items associated with the DMR have a disposition, i.e. all of the items are undisposed.

Figure 33:
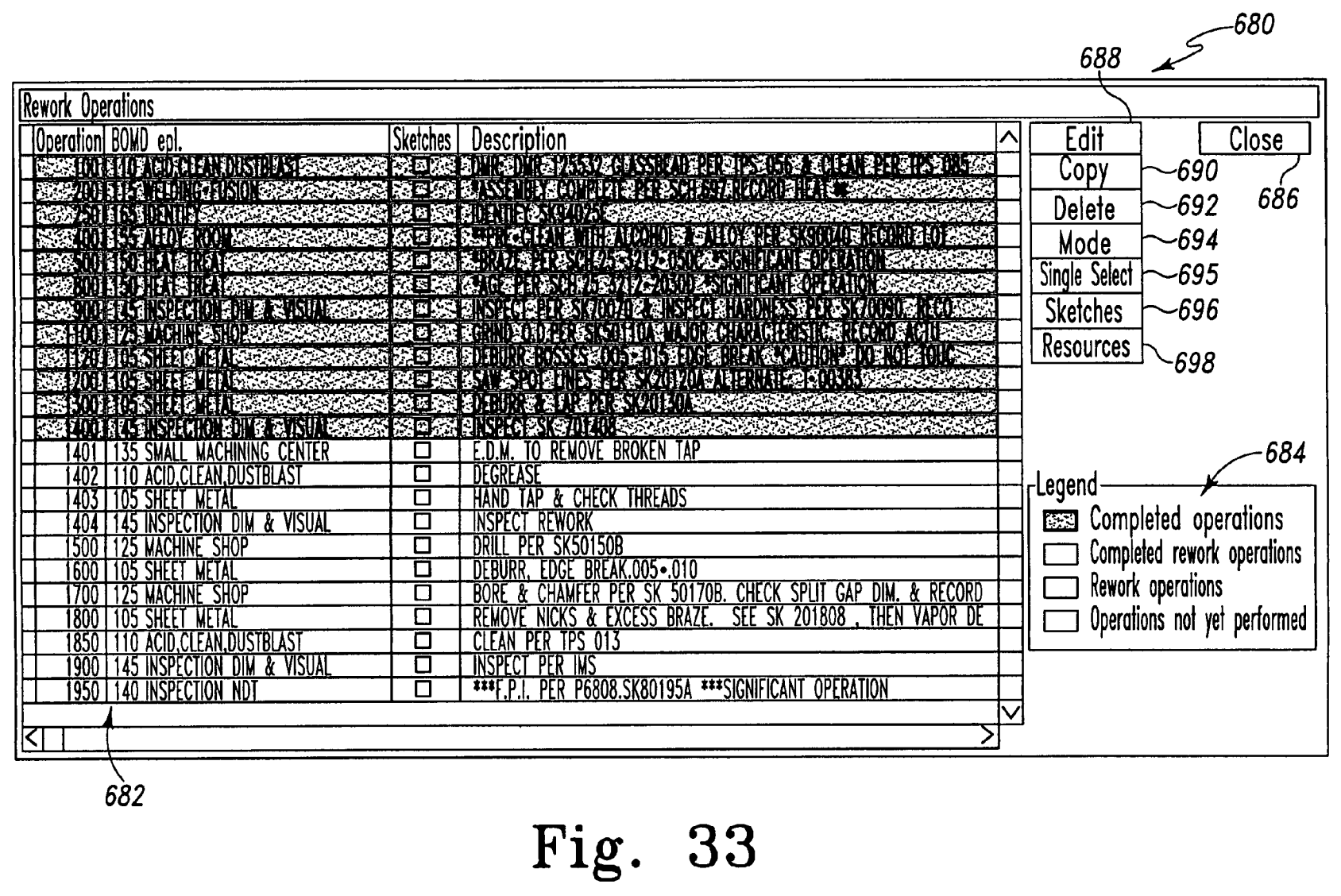

The View Rework button 652 allows the user to review and edit the steps to be performed in the rework operations for the pieces in the selected entry of the dispositions created list 646. When the user highlights an entry in the dispositions created section 646 and selects the View Rework button 652, a rework operations window showing the steps to be performed in the rework of the parts is displayed. An example of a rework operations window 680 is shown in FIG. 33.

The rework operations window 680 shows the steps to be performed in the rework of particular parts that were included in a DMR. The rework operations window 680 includes a rework operations list 682, a legend section 684, a Close button 686, an Edit button 688, a Copy button 690, a Delete button 692, a Mode button 694, a Mode field 695, a Sketches button 696 and a Resources button 698. The Close button 686 allows the user to close the rework operations window 680 and return to the view DMR window 640.

The legend section 684 shows the identifiers that are used to distinguish between the steps in the rework operations list 682. In the Rework operations window 680 shown in FIG. 33, the legend section 684 shows four background colors for indicating the four categories of the operations in the rework operations list 682. The "Completed Operations" category indicates operations that were part of the production process which have already been performed on the parts. The "Completed Rework Operations" category indicates operations that were part of a rework process which have already been performed on the parts. The "Rework Operations" category indicates operations that are part of a rework process which have not been performed on the parts. The "Operations Not Yet Performed" category indicates operations that are part of the production process which have not been performed on the parts. Using the legend 684, the DMR application 600 indicates that the first operation (operation 100) is a completed rework operation, the next operations (operations 200-1400) are completed operations, the next operations (operations 1401-1404) are rework operations that have not yet been performed, and the remaining operations (operations 1500-1950) are operations that have not yet been performed.

When the user highlights an operation in the rework operations list 682 and selects the Edit button 688, the system allows the user to edit the operation selected in the rework operations list 682. When the user highlights one or more operations in the rework operations list 682 and selects the Delete button 692, the system deletes the selected operations from the rework operations list 682.

The rework operations list 682 includes a blank line at the bottom of the list at which the user can add an additional operation. The user would type entries in the fields and select enter on the keyboard of the DMR Station 16. The DMR application 600 will then place the added operation in the rework operations list 682 according to the operation number. The reworks operations list 682 is kept in order according to operation number.

The Mode button 694 allows the user to switch between single-select and multi-select modes. The mode field 695 shows the current mode. In multi-select mode, the user can select multiple operations from the rework operations list 682 for copying or deleting. In the single-select mode the user can only select a single operation at a time from the rework operations list 682 for copying and deleting.

Figure 34:
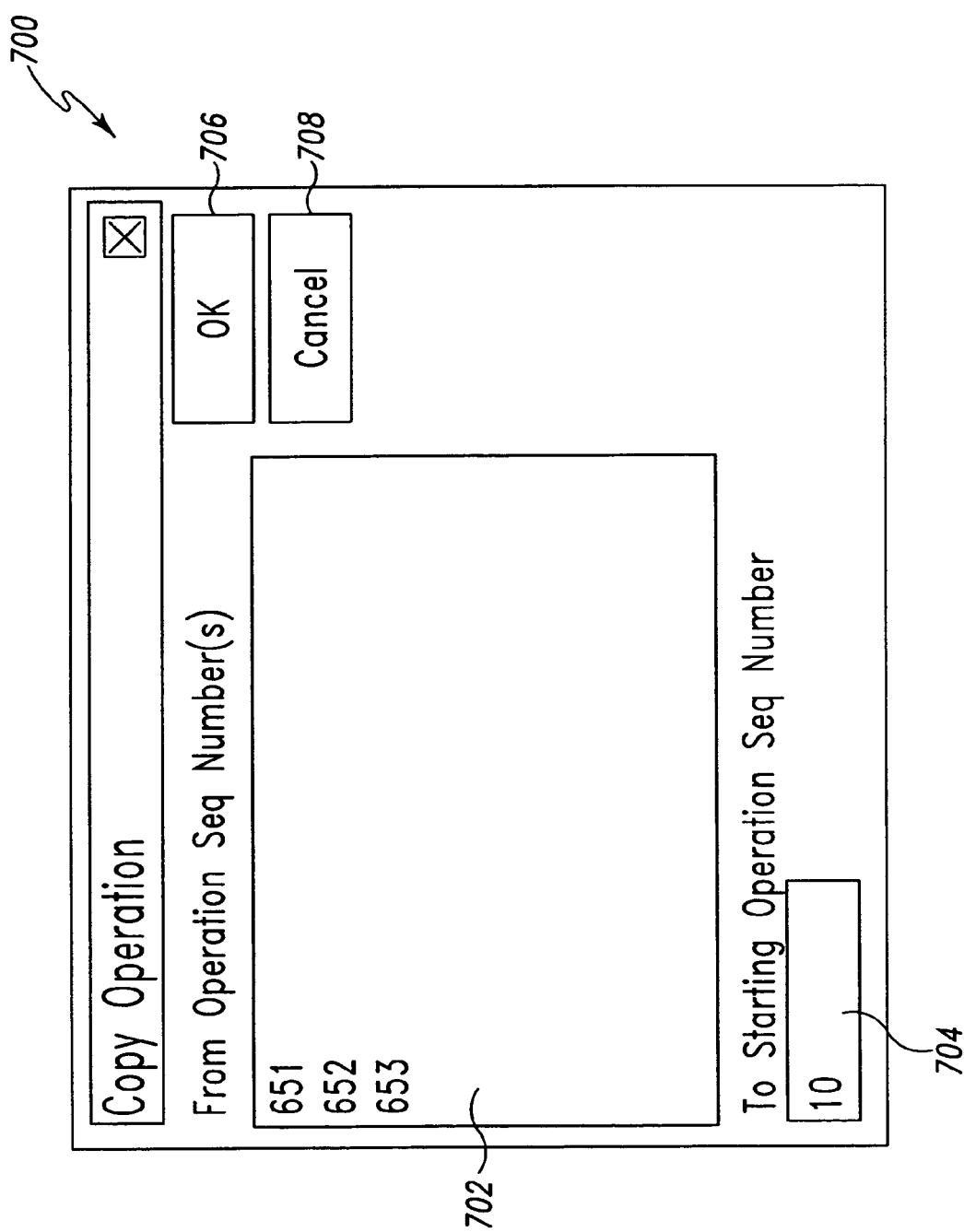
FIG. 34 shows an example of a copy operations window.

The Copy button 690 allows the user to copy one or more operations from the rework operations list 682 into new rework operations with new operation sequence numbers. When the user highlights operations in the rework operations list 682 and selects the Copy button 690, the system copies the selected operations and displays a pop-up copy operations window. An example of a copy operations window is shown in FIG. 34. The copy operations window 700 includes a list of copied operations 702, a starting operation field 704, an OK button 706 and a Cancel button 708. The list of copied operations 704 shows the current operation numbers for the selected operations from the rework operations list 682. The starting operation field 704 is where the user inserts the new starting operation number for the copied operations. The operations in the rework operations list 682 are listed in numeric order, and the copied operations will be renumbered to fit in the numeric order starting from the number entered in the starting operation field 704. When the user selects the OK button 706, the DMR application 600 renumbers the operation sequence numbers of the copied operations to fit in numeric order starting from the number entered in the starting operation field 704; inserts the copied operations into the rework operations list 682; and closes the copy operation window 700. When the user selects the Close button 708, the DMR application 600 closes the copy operation window 700 without copying any operations.

Figure 35:
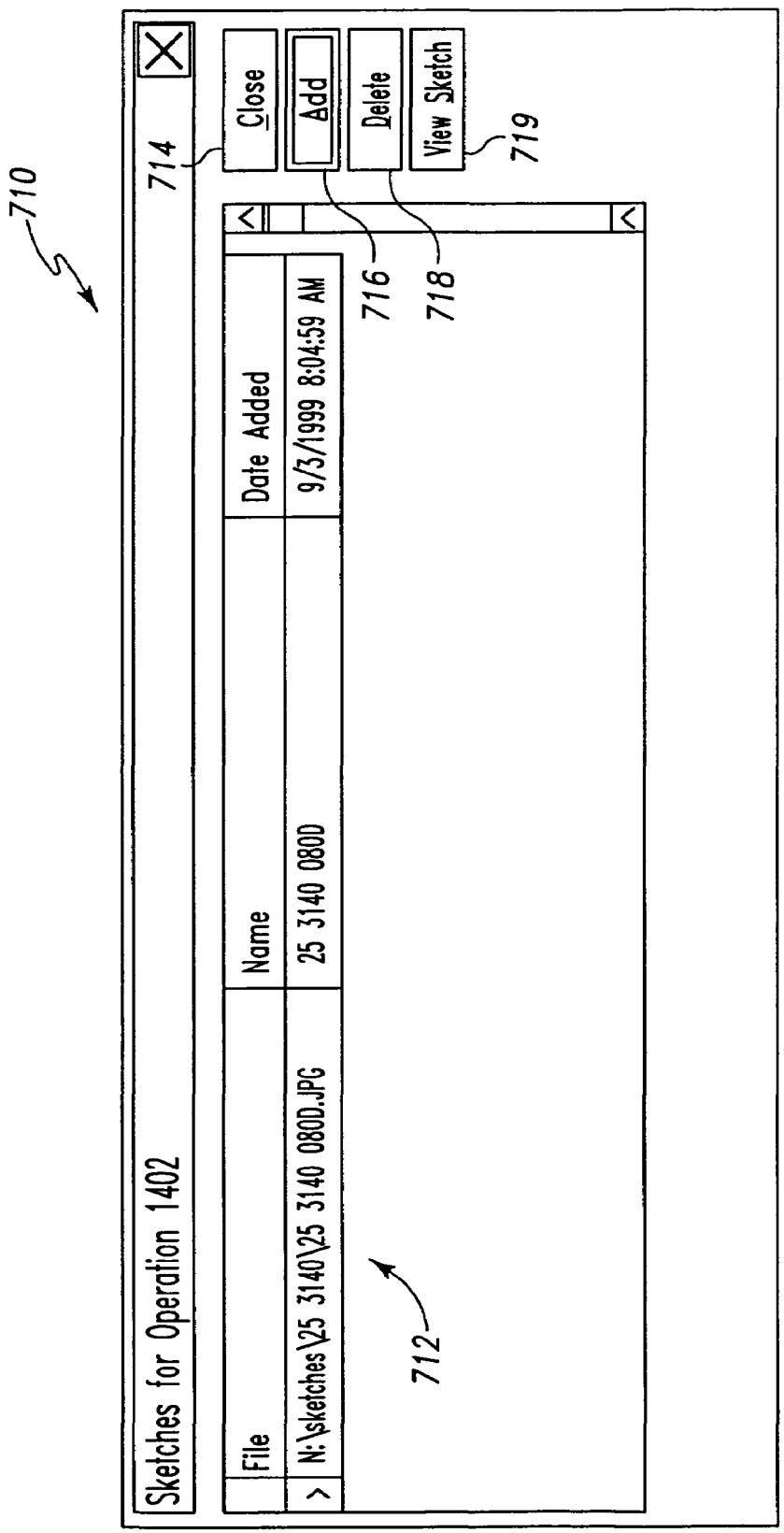
FIG. 35 shows an example of an operation sketches window.

The Sketches button 696 allows the user to add sketches to a selected operation in the rework operations list 682. When the user highlights an operation in the rework operations list 682 and then selects the Sketches button 696, the DMR application 600 displays an operation sketches window showing the sketches associated with the highlighted operation. An example of an operation sketches window 710 is shown in FIG. 35. The operation sketches window 710 includes a list of sketches 712, a Close button 714, an Add button 716, a Delete button 718, and a View Sketch button 719. For each sketch associated with the operation, the list of sketches 712 shows the file name, the sketch name, and the date the sketch was created.

The Close button 714 allows the user to close the operation sketches window 710. The Delete button 718 allows the user to delete the association of a selected sketch with the operation. The user first selects a sketch in the list of sketches 712 and then selects the Delete button 718, the DMR application 600 then removes the selected sketch from the list of sketches 712 and removes the association of the selected sketch with the operation. The View Sketch button 719 allows the user to view a sketch listed in the list of sketches 712. The user first selects a sketch in the list of sketches 712 and then selects the View Sketch button 719, the DMR application 600 then displays a sketch window similar to the sketch windows 200 and 220 shown in FIGS. 19 and 21, respectively.

Figure 36:
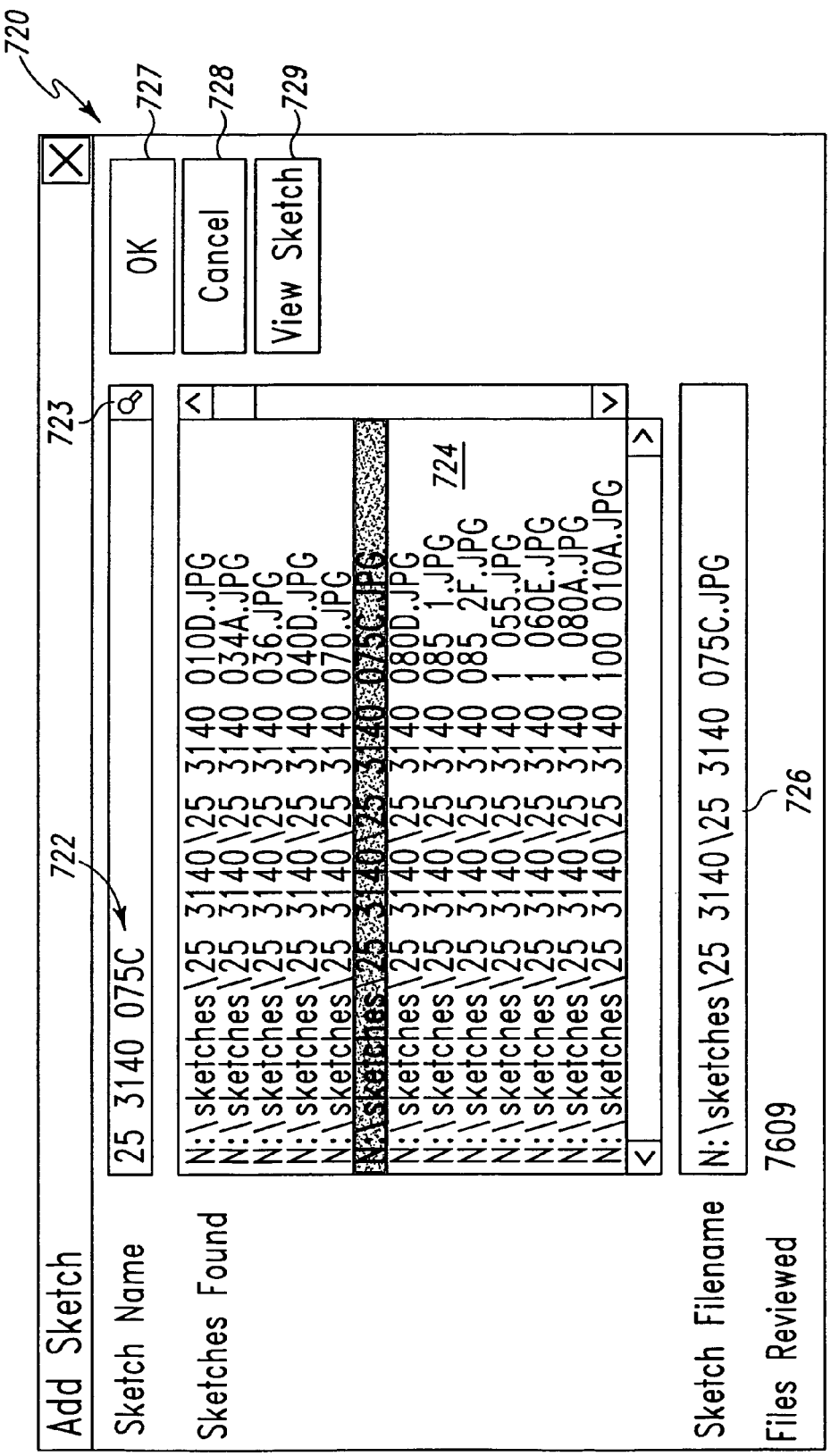
FIG. 36 shows an example of an add sketch window.

The Add button 716 allows the user to add sketches to be associated with the operation. When the user selects the Add button 716, the DMR application 600 displays an add sketch window. An example of an add sketch window 720 is shown in FIG. 36. The add sketch window 720 includes a sketch name field 722, a magnifying glass icon 723, a sketches found list 724, a sketch file name field 726, an OK button 727, a Cancel button 728, and a View Sketch button 729.

The user enters a portion of a file name in the sketch name field 722. The user does not need to enter a complete file name in the sketch name field 722. When the user selects the magnifying glass icon 723, the DMR application 600 searches all sketches for any sketch that contains the text entered in the sketch name field 722 and returns the results in the sketches found list 724. The user can then select a sketch in the sketches found list 724. The sketch filename field 726 contains the filename of the sketch selected in the sketches found list 724. The View Sketch button 729 allows the user to view a sketch listed in the sketches found list 724. The user first selects a sketch in the sketches found list 724 and then selects the View Sketch button 729, the DMR application 600 then displays a sketch window similar to the sketch windows 200 and 220 shown in FIGS. 19 and 21, respectively. The OK button 727 allows the user to add a sketch to be associated with the operation. The user first selects a sketch in the sketches found list 724 and then selects the OK button 727, the DMR application 600 then adds the selected sketch to the list of sketches 712 in the operation sketches window 710 and closes the add sketch window 720. The Cancel button 728 allows the user to close the add sketch window 720 without adding a sketch to be associated with the operation.

Figure 37:
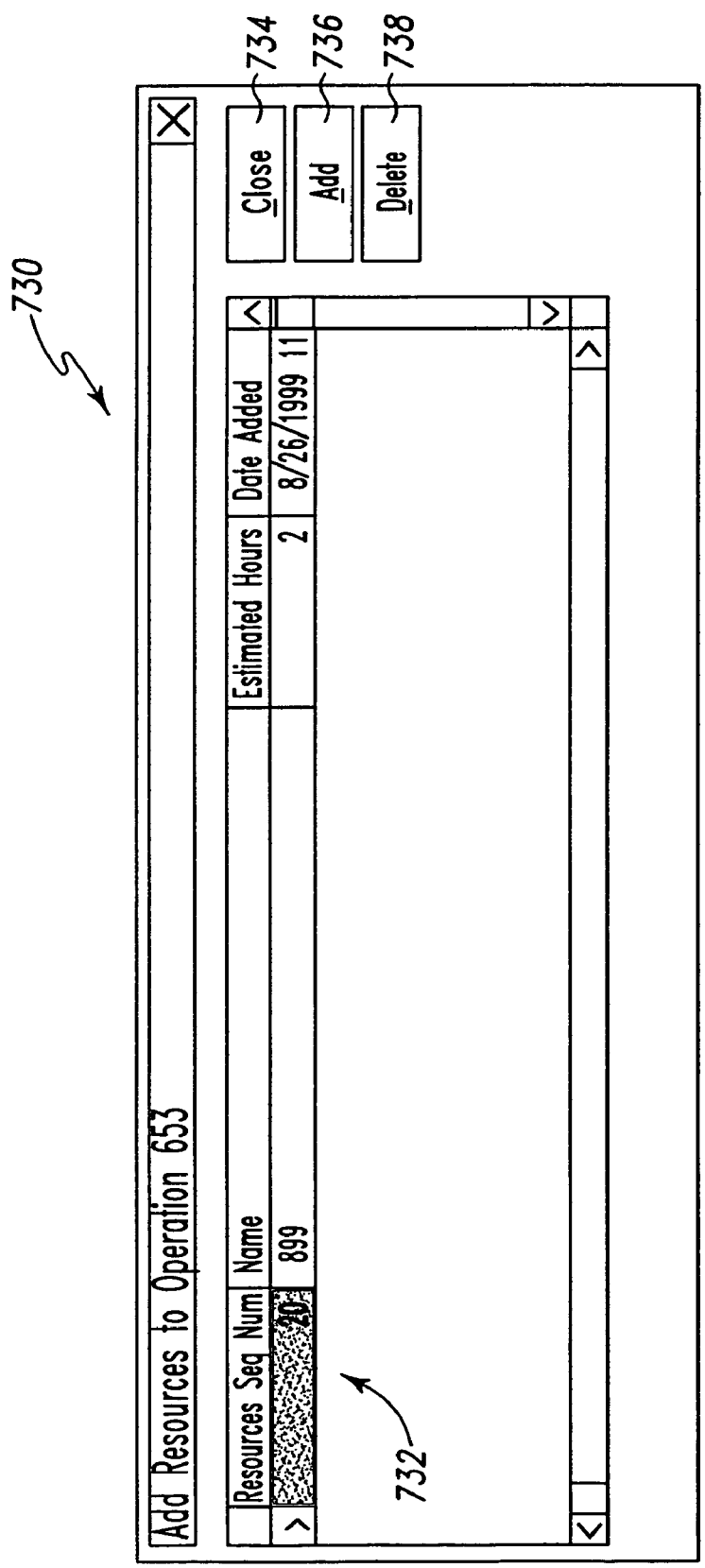
FIG. 37 shows an example of an operation resources window.

The rework operations window 680, shown in FIG. 33, also includes the Resources button 698 which allows the user to add resources, for example a work center or a machine, to a selected operation in the rework operations list 682. When the user highlights an operation in the rework operations list 682 and then selects the Resources button 698, the DMR application 600 displays an operation resources window showing the resources associated with the highlighted operation. An example of a operation resources window 730 is shown in FIG. 37. The operation resources window 730 includes a list of resources 732, a Close button 734, an Add button 736, and a Delete button 738. For each resource associated with the operation, the list of resources 732 shows the resource sequence number, the resource name, the estimated hours for the operation on the resource, and the date the resource was added to the operation.

The Close button 734 allows the user to close the operation resources window 730. The Delete button 738 allows the user to delete the association of a selected resource with the operation. The user first selects a resource in the list of resources 732 and then selects the Delete button 738, the DMR application 600 then removes the selected resource from the list of resources 732 and removes the association of the selected resource with the operation.

Figure 38:
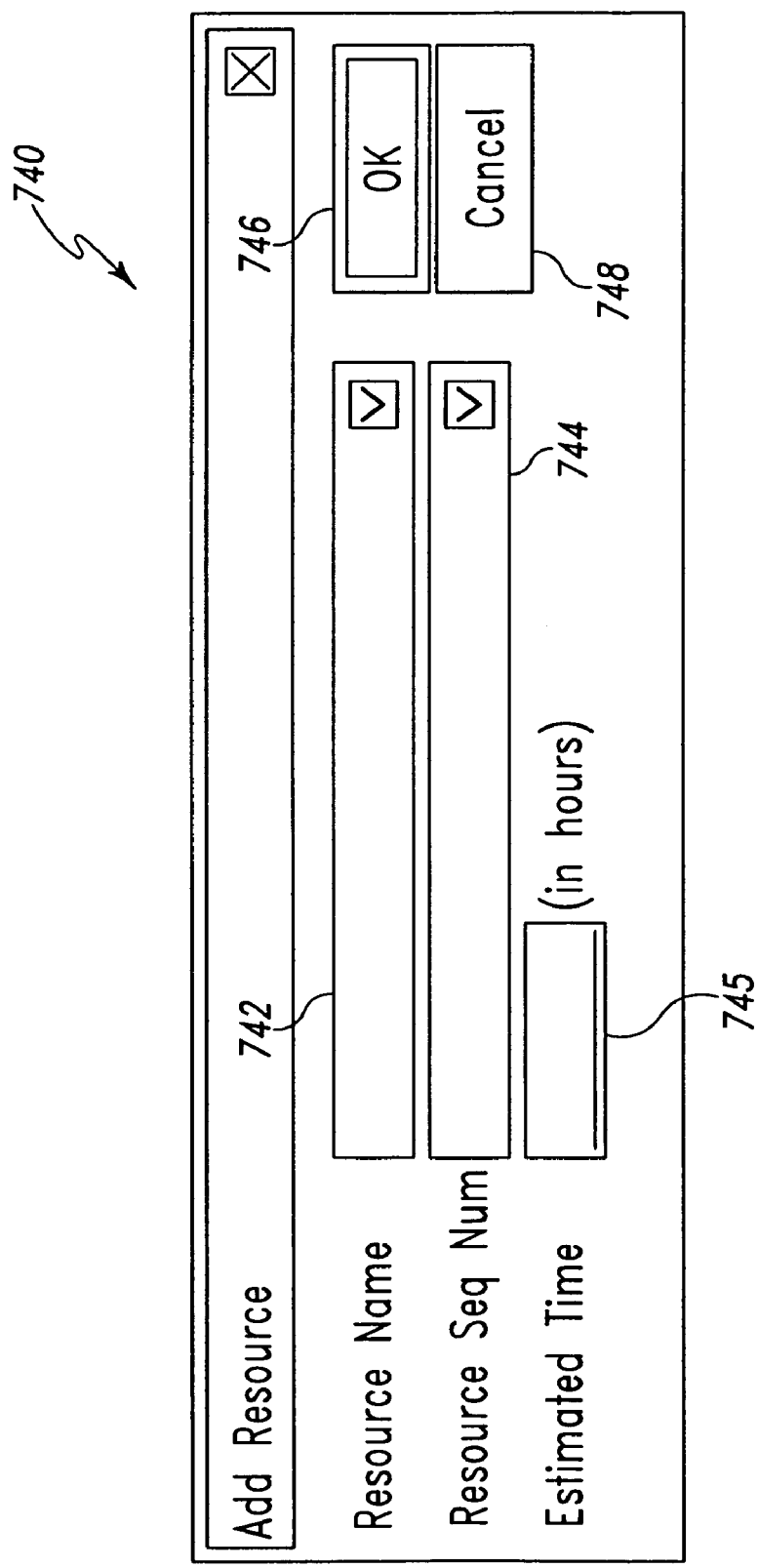
FIG. 38 shows an example of an add resource window.

The Add button 736 allows the user to add resources to be associated with the operation. When the user selects the Add button 736, the DMR application 600 displays an add resource window. An example of an add resource window 720 is shown in FIG. 38. The add resource window 740 includes a resource name field 742, a resource sequence number field 744, an estimated time field 745, an OK button 746, and a Cancel button 748. The resource name field 742 and the resource sequence number field 744 are associated with pull-down lists from which the user selects the desired entries. The user can then enter an estimated time in the estimated time field 745. When the user selects the OK button 746, the DMR application 600 adds the resource information entered in the add resource window 740 into a resource listed in the list of resources 732 in the operation resources window 730 and closes the add resource window 740. When the user selects the Cancel button 748, the DMR application 600 closes the add resource window 740 without adding a resource to be associated with the operation.

The DMR application 600 will automatically flag a DMR for root cause investigation if any of the items of the DMR have been given a disposition of MRB or scrap. If a root cause investigation is initiated, the DMR will be included on a root cause investigation report.

A DMR is automatically closed by the DMR application 600 when the following conditions have been met: (1) all items in the DMR have been disposed of through one of the five disposition types; (2) no item in the DMR currently has a disposition of MRB; and (3) all dispositions for the DMR have been approved. When a DMR is being closed and it has not already been flagged for a root cause investigation, the DMR application 600 will display a window asking the user whether they want to have a root cause investigation performed for the DMR. If a root cause investigation is initiated, the DMR will be included on a root cause investigation report.

An SPC hotspots application 800 allows a user to view sketches associated with a part and operation, to add new SPC (Statistical Process Control) hotspots to an operation, to associate SPC hotspots with quality characteristics of an operation and to delete SPC hotspots from an operation. SPC hotspots are used in the tablet automation application 24 to collect quality data through the tablet 18 during production. The SPC hotspots application 800 runs on the SPC Parameter setup station 13 (FIG. 1).

An SPC hotspot represents a quality measurement that an operator is to take for a given part in an operation which is part of the production process. When a hotspot is created, it is associated with a particular quality collection plan and quality collection element. A quality collection element is essentially a characteristic that is to be measured by the operator and recorded. When an operator views a sketch 200 (FIG. 18) for an operation to which SPC information is to be collected, a small SPC icon 202, 204, 206 appears on the sketch 200. When the operator selects one of the SPC hotspots 204 (see FIG. 21), the tablet automation application 24 displays a field 212 for the entry of measurement information for the quality characteristic associated with the selected SPC hotspot. When an SPC hotspots has been created for a given operation, an operator will not be able to complete the operation until the SPC measurement information has been entered.

Figure 39:
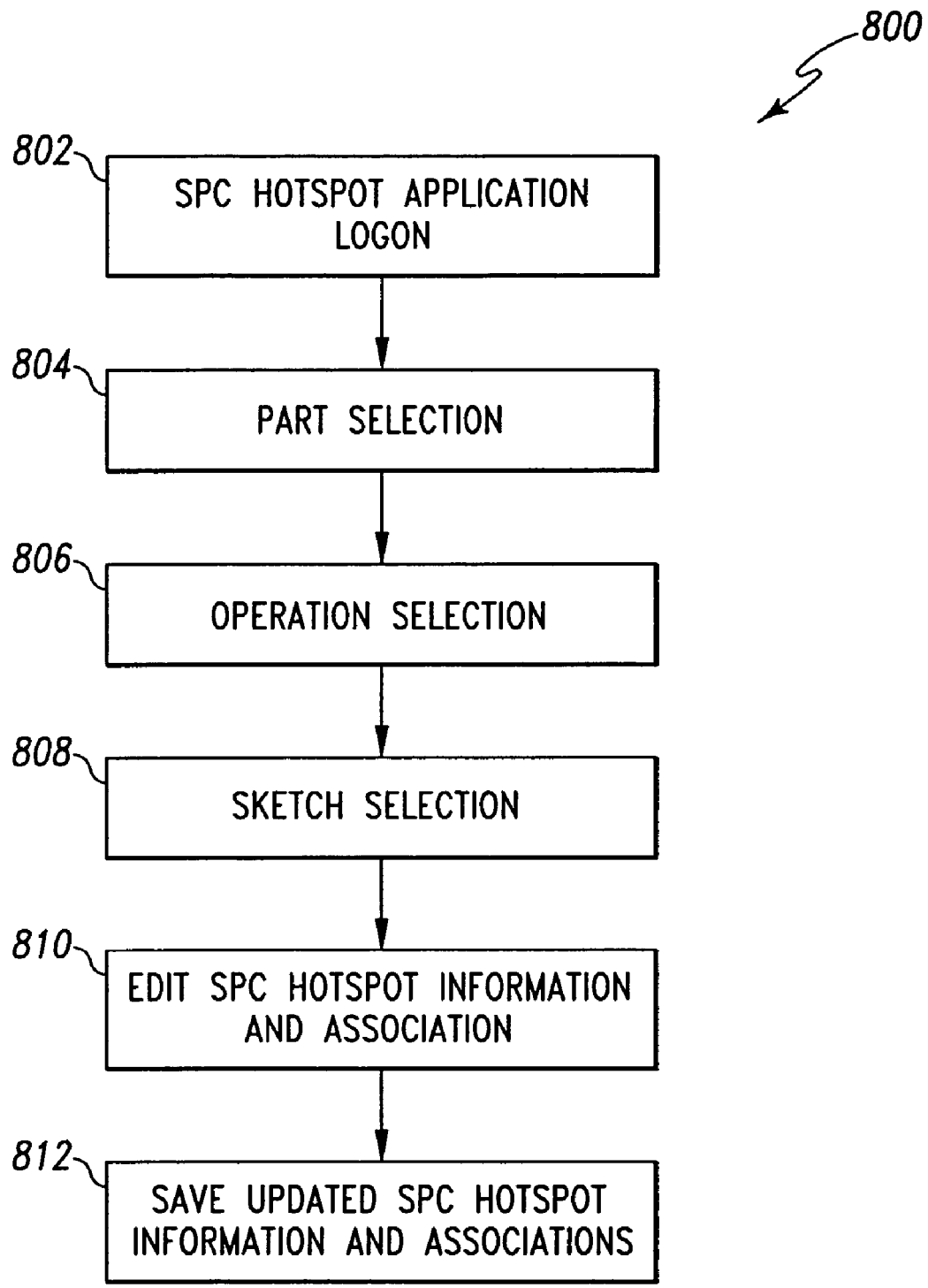
FIG. 39 shows a top-level functional representation of an SPC hotspot application.

A top-level functional representation of the steps of the SPC hotspot application 800 is shown in FIG. 39. At step 802, the SPC hotspot application 800 presents the user with a logon screen through which the application verifies the user identity and authorization. At step 804, after the user successfully logs on, the user selects a part for which SPC hotspot information is to be updated. At step 806, the user selects an operation in the production of the selected part for which SPC hotspot information is to be updated. At step 812, the updated SPC hotspot information is saved for use during production by the automated tablet application 24.

Figure 40:
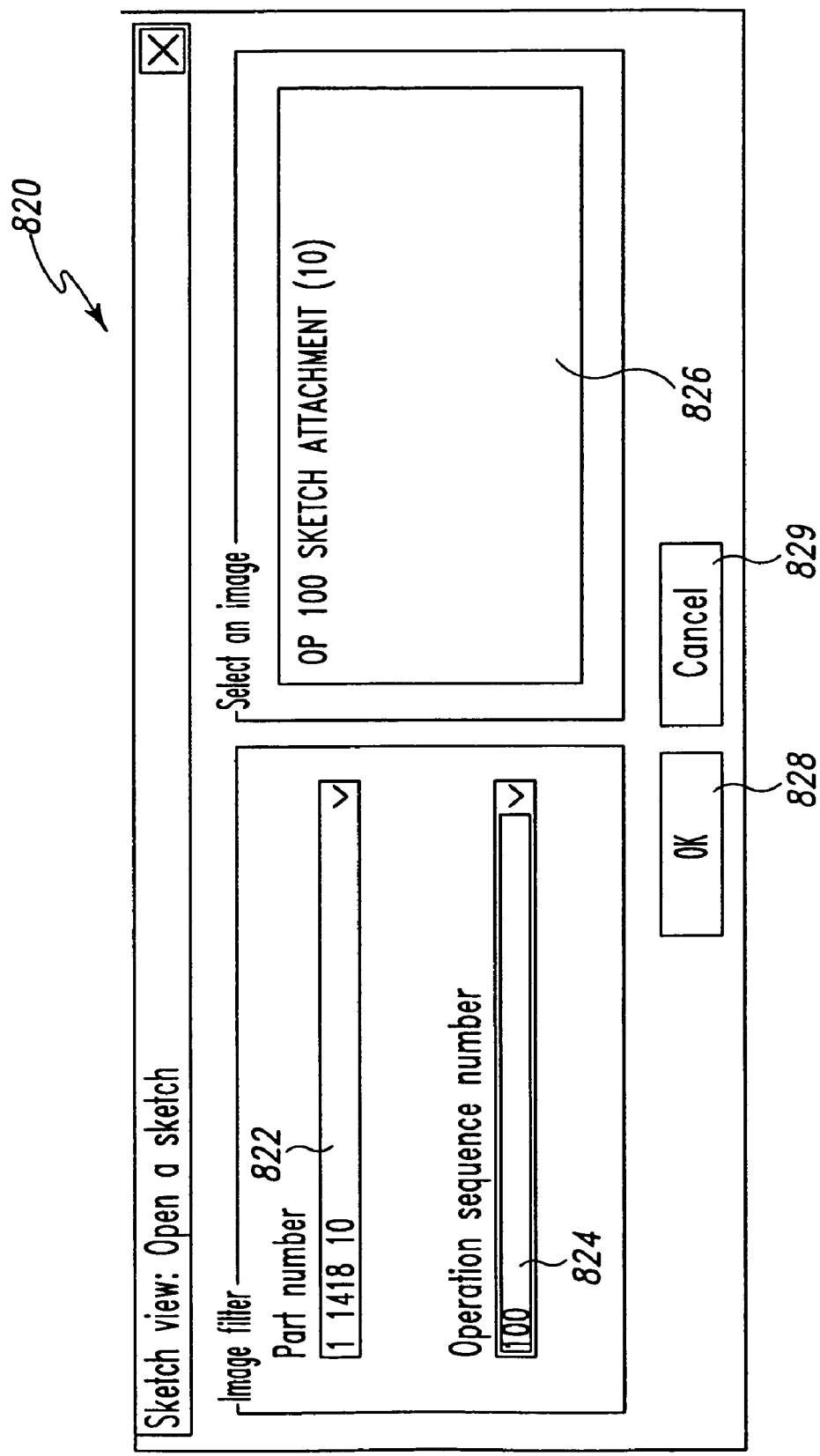
FIG. 40 shows an example of an SPC sketch selection window.

After the user successfully logs on, the SPC hotspot application 800 displays an SPC sketch selection window. An example of an SPC sketch selection window 820 is shown in FIG. 40. The SPC sketch selection window 820 includes a part number field 822, an operation sequence number field 824, and an image list 826, an OK button 828, and a Cancel button 829. The part number field 822 and the operation sequence number field 824 are pull down menus which include entries from which the user can select. The user first selects a part number in the part number field 822. The SPC hotspot application 800 automatically updates the pull down menu of the operation sequence number field 824 to match the operation sequence numbers for the part selected in the part number field 822. The user then selects an operation sequence number in the operation sequence number field 824. The SPC hotspot application 800 automatically displays a list of images associated with the selected part number and operation sequence number in the image list 826. The user can then select a sketch from the image list 826 on which SPC information is to be edited. When the user selects the OK button 828, the SPC hotspot application 800 displays the selected image in an SPC sketch window and closes the SPC sketch selection window 820. When the user selects the Cancel button 748, the SPC hotspot application 800 closes the SPC sketch selection window 820 without opening a sketch.

Figure 41:
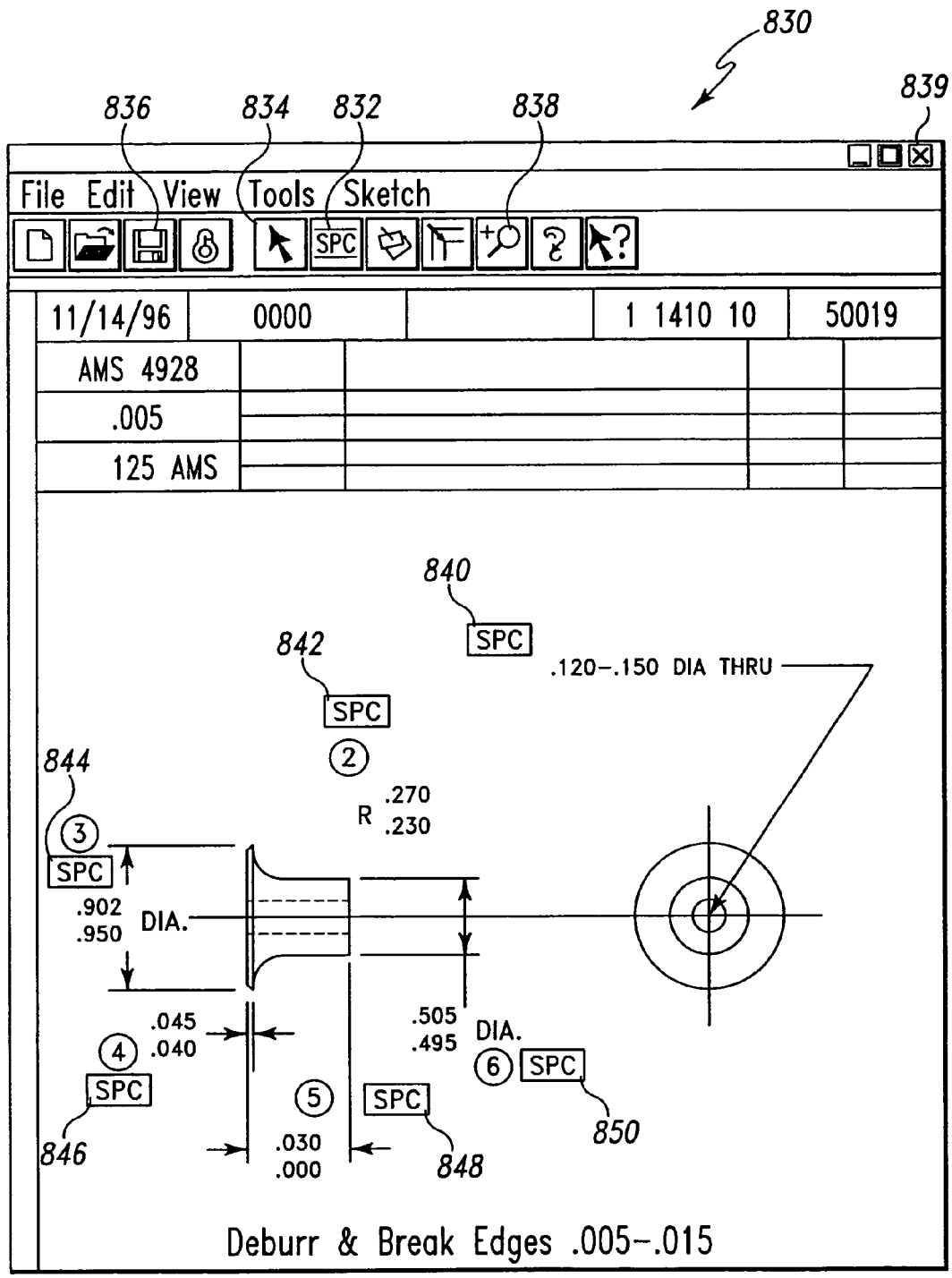
FIG. 41 shows an example of an SPC sketch window.

An example of an SPC sketch window 830 is shown in FIG. 41. The SPC sketch window 830 includes a sketch 831 selected through the SPC sketch selection window 820, an add SPC hotspots icon 832, a select or arrow icon 834, a save icon 836 and a magnifying glass icon 838. The functions described below which are initiated by each of the icons can also be initiated by selecting a corresponding item from the windows drop-down menus. The selected sketch 831 includes any associated SPC hotspots already associated with the sketch 831. An associated SPC hotspot is already associated with a quality characteristic of the part. The SPC hotspot application 800 provides a visual indication on the sketch 831 that an SPC hotspot is associated with a quality characteristic. For example, associated SPC hotspots can be displayed in a different color from non-associated SPC hotspots. The sketch 831 shows six SPC hotspots 840–850.

The draw SPC hotspots icon 832 initiates a function which puts the SPC hotspot application 800 in a add hotspot mode which allows the user to drop SPC hotspots at desired locations on the sketch 831. When the SPC hotspot application 800 is in the add hotspot mode, the mouse pointer changes into an SPC icon 840. The user then positions the mouse pointer on the sketch where they would like a new SPC hotspot to appear and clicks the mouse to drop a non-associated SPC hotspot at the current mouse pointer position. The newly dropped SPC hotspot is not yet associated with a quality characteristic. The SPC hotspot application 800 remains in the add hotspot mode and the user can continue to move the mouse pointer and drop additional SPC hotspots on the sketch 831.

By choosing the select or arrow icon 834, the user can exit the add SPC hotspot mode. When the user selects the arrow icon 834, the SPC hotspot application exits the add SPC hotspot mode and the mouse pointer changes back into an arrow.

The SPC hotspots 840-850 appear in one color when they are first created and in another color after they have been associated with a quality characteristic. This is a visual indication to the user as to whether they need to associate a quality characteristic with a particular SPC hotspot. The SPC hotspots cannot be saved unless they have a quality characteristic associated with them.

Figure 42:
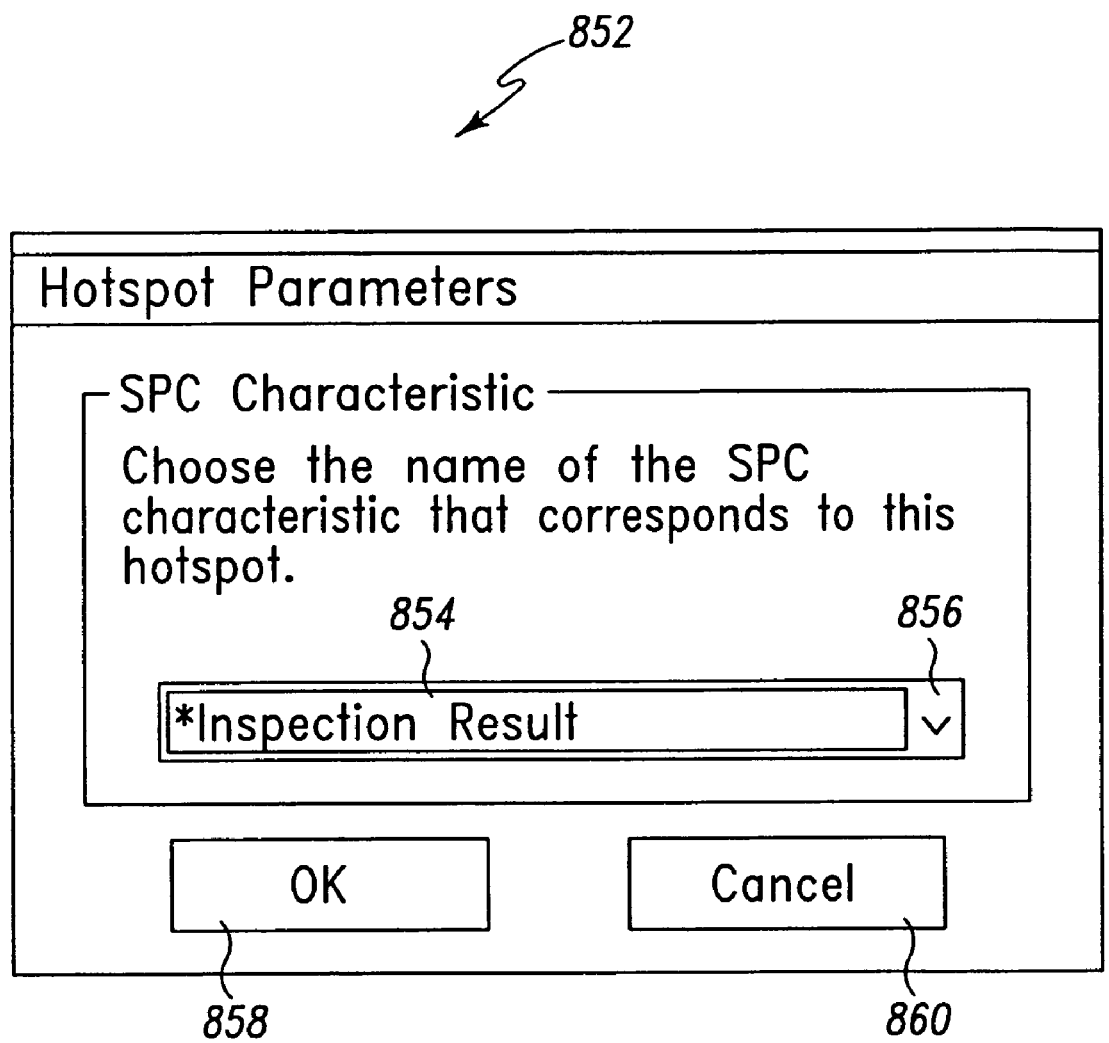
FIG. 42 shows an example of the SPC sketch window with a quality characteristics pop up window.

To associate a quality characteristic with an SPC hotspot, the user must exit the add SPC hotspot mode and select an SPC hotspot on the sketch 831. When the user selects and SPC hotspot, the SPC application 800 displays a quality characteristics window. An example of a quality characteristics pop up window 852 is shown in FIG. 42. The quality characteristics window 852 includes an SPC characteristic field 854 for association with the selected SPC hotspot, an SPC characteristic drop-down list button 856, an OK button 858 and a Cancel button 860. The SPC characteristic drop-down list button 856 is used to activate a list of available SPC characteristics from which the user can select an SPC characteristic for the SPC characteristic field 854. A quality characteristic cannot be associated with more than one SPC hotspot. Thus, once a characteristic is associated with a hotspot, the SPC application 800 will not include the characteristic in the list of available SPC characteristics. The user enters the name of an available SPC characteristic in the SPC characteristic field 854. Alternatively, the user can select the SPC characteristic drop-down list button 856 which displays a list of available SPC characteristics, and then select an SPC characteristic which will automatically fill in the SPC characteristic field 854. When the user selects the OK button 858, the SPC hotspots application 800 associates the quality characteristic in the SPC characteristic field 854 with the selected SPC hotspot. If the selected SPC hotspot was previously unassociated with a quality characteristic, the visual indication of the selected SPC hotspot will change to indicate that it is associated with a quality characteristic. When the user selects the Cancel button 860, the SPC hotspots application 800 closes the quality characteristics pop up window 852 without associating a quality characteristic with the selected SPC hotspot.

The user can also delete and SPC hotspot from the sketch 831. To delete an SPC hotspot from the sketch 831, the user selects the SPC hotspot they wish to delete and then presses the delete key on the keyboard of the SPC Parameter Setup Station 13. The SPC hotspots application 800 will then display a window for the user to confirm that they wish to delete the selected SPC hotspot. If the user confirms that they wish to delete the hotspot, the SPC hotspot will be deleted from the sketch and any associated quality characteristic will become unassigned and will then appear on the list of available quality characteristics 854 to be available for association with another SPC hotspot.

Once all of the SPC hotspots have been associated with a quality characteristic, the sketch 831 with the associated SPC hotspots can be saved. The sketch with the associated SPC hotspots is saved by selecting the save icon 836 from the SPC sketch window 830.

To close the SPC sketch window 830 the user selects the close window icon 839. When the user selects the close window icon 839, the SPC hotspot application 800 first checks to see if any unsaved changes have been made by the user. If there are no unsaved changes, the SPC application 800 closes the SPC sketch window 830 and returns to the SPC sketch selection window 820. If there are unsaved changes, the SPC hotspot application 800 displays a window asking the user if they wish to save changes before exiting. If the user does not wish to save changes, the SPC application 800 closes the SPC sketch window 830 and returns to the SPC sketch selection window 820. If the user indicates they wish to save changes, the SPC application 800 checks that all SPC hotspots are associated with a quality characteristic. If all SPC hotspots are associated with a quality characteristic, the SPC application 800 saves the changes, closes the SPC sketch window 830 and returns to the SPC sketch selection window 820. If some SPC hotspots are not associated with a quality characteristic, the SPC application 800 displays a message indicating that there are SPC hotspots not associated with a quality characteristic and returns the user to the SPC sketch window 830.

Figure 44:
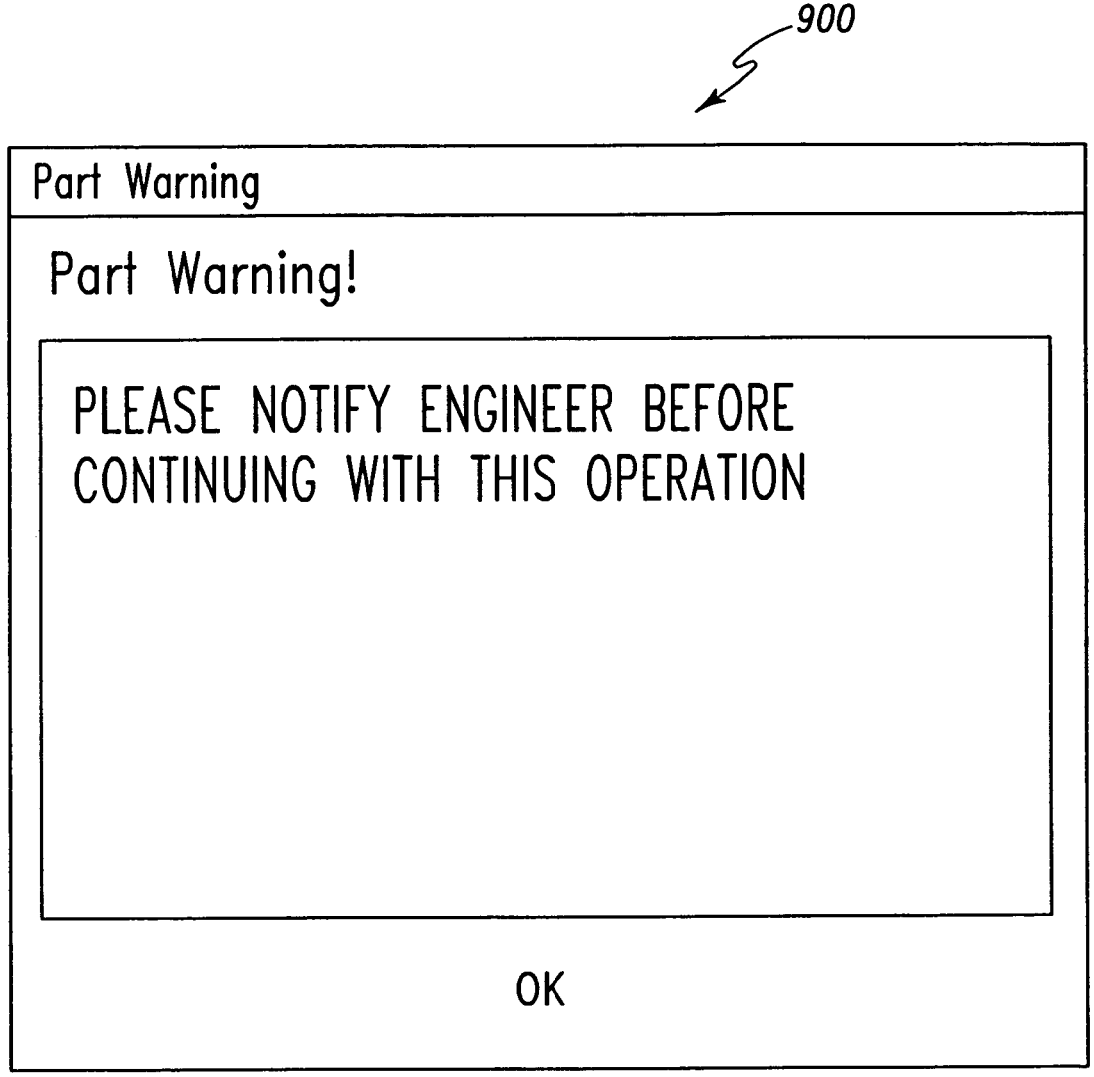
FIG. 44 shows an alert screen generated by an engineering alert.

When an operator is working on a part during a job, and a DMR is issued of particular importance, or an alert is issued by an appropriate department (e.g., engineering), an alert screen 900 is generated, as shown in FIG. 44. Engineering can generate alerts using an Engineering Alert Notification via the server 12. Engineers flag a given order and operation for an alert, and specify the text of the alert. When the operator accepts that operation and order on the tablet 18, the operator receives the alert screen as shown in FIG. 44. At this point, an e-mail is also generated to the engineer that created the alert. Once the alert is acknowledged, the operator may continue with the operation.

Finally, transactions on tablet 18 are logged to a file on server 12. Illustratively, each separate transaction is logged to a separate storage file. Thus, one file stores DMR creations, another file stores rework operations, etc.

Figure 43:
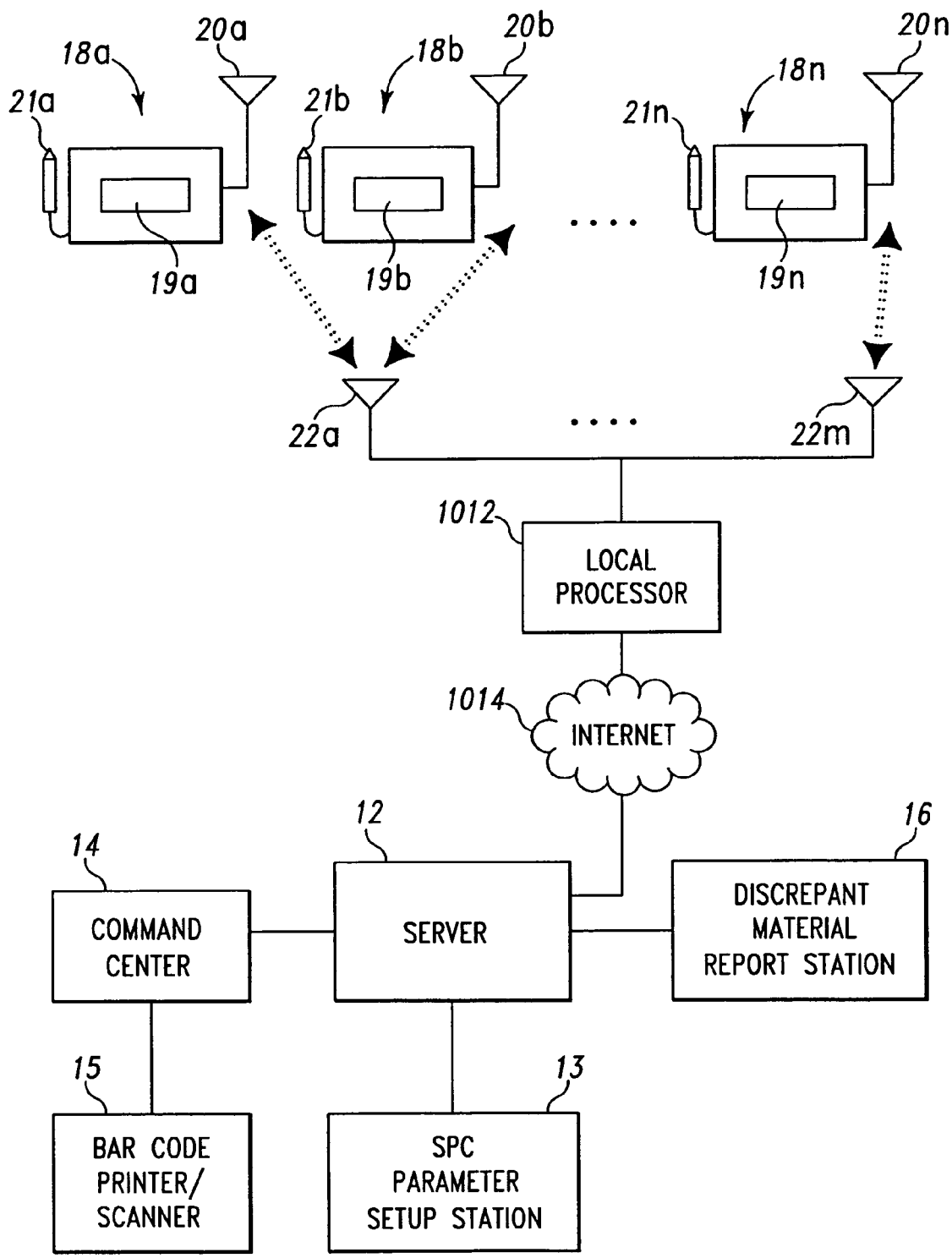
FIG. 43 shows an overview schematic of the main components of a paperless tablet system including internet access.

In an alternative embodiment of the present invention, a factory floor tablet automation system 10 includes access to the server 12 via a network 1014. Illustratively, the network 1014 is the internet. Of course, one of ordinary skill in the art will recognize that any network may be used, such as a LAN, WAN, etc. A standard web browser application is implemented in tablets 18a–18n, as shown in FIG. 43. Each tablet unit 18a–18n includes an antenna 20a–20n. A local processor 1012 is connected to the transceivers 22a–22m which are distributed throughout the factory. The tablet units 18a–18n communicate with the local processor 1012 through transceivers 22a–22m. Local processor 1012 communicates with server 12 via the network 1014, or other equivalent communication means. Note that in the illustrative embodiment, one of ordinary skill in the art will appreciate that local processor 1012 can be a server, a router, or other internet gateway. Thus, a number of remote manufacturing facilities may be linked to server 12 via local processors 1012 and network 1014.

By linking local processor 1012 to server 12, the tablet automation system can be implemented at several remote locations and still maintain data synchronization with the server 12. Thus, all of the data operations described with respect to the exemplary embodiment of FIG. 1 apply to the alternative embodiment of FIG. 43. Additionally, by utilizing a common browser, procedures and documentation regarding operations may be viewed remotely on each tablet 18.

Of course, one of ordinary skill in the art will recognize that local processor 1012 may also be a server, and a job may be assigned to an operator at the facility through the local processor 1012. Information and transactions may then be logged to server 12 located in a central location.

Figure 45:
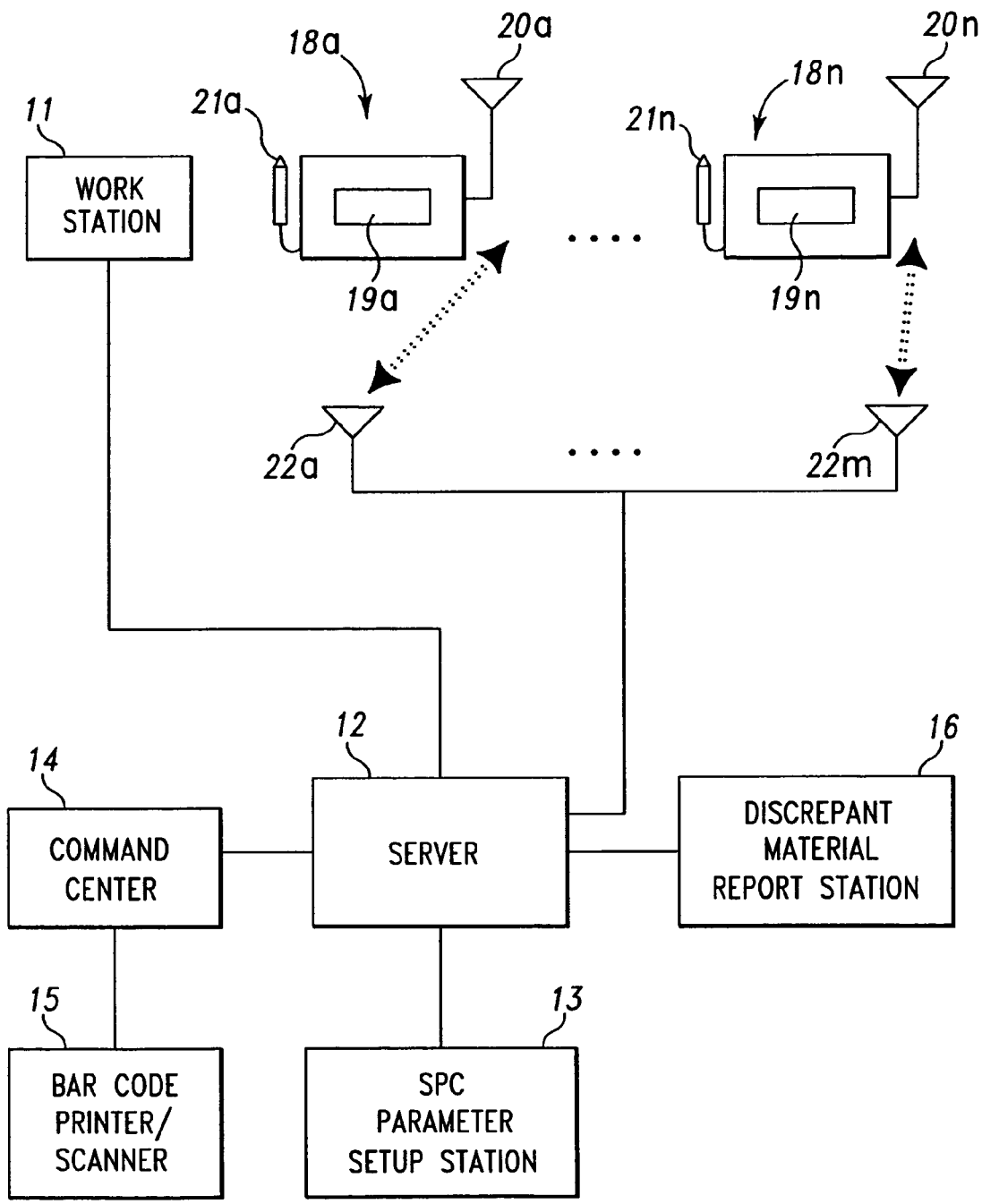
FIG. 45 shows an overview schematic of the main components of a paperless tablet system including a workstation.

In another illustrative embodiment, as shown in FIG. 45, a workstation 11 is connected to server 12 via a LAN or other similar network. The workstation 11 is used in conjunction with the plurality of tablets 18. Illustratively, workstation 11 is a PC. The workstation 11 may run a software program to provide similar functionality of the tablet 18. Thus, the login process, accepting and receiving jobs, and all other operations facilitated by tablet 18 are likewise facilitated by workstation 11. Workstation 11 can be located near a job site, such as a lathe, welding station, or other factory job site.

Screen prints from a particular embodiment of the invention have been used in the description set forth above to aid in understanding the process which is part of the present invention, and not by way of limitation to the particular embodiment shown. While a preferred embodiment of the invention is set forth above and shown in the drawings, those skilled in the art will recognize that various modifications can be made to the system disclosed in this application without departing from the spirit and scope of the invention as set forth in the claims attached hereto.

The invention claimed is:

1. A system for use in tracking a plurality of manufacturing related jobs assigned to a plurality of operators and to track approval of the plurality of jobs by at least one supervisor, the system comprising:
a server computer including a storage device including information related to each of the plurality of jobs each having at least one step, the information for at least a first job assigned to at least a first operator including at least one step description associated with the at least one step of the first job, wherein upon completion of a step of the at least one step, approval of a supervisor is required prior to completion of the first job; and
a plurality of portable computing devices, each of the plurality of portable computing devices being configured to be carried by an operator of the plurality of operators, each of the plurality of portable computing devices having a processor unit, a memory device, a display screen, and an input/output device, the plurality of portable computing devices configured to communicate with the server computer through a network, a first portable computing device of the plurality of portable computing devices being assigned to the first operator and configured to retrieve the at least one step description related to at least the first job from the server computer, the first portable computing device being configured to be carried by the first operator to a location for performing a portion of the at least one step description of the first job, at least one of the portable computing devices further configured to execute an approval routine whereby the supervisor acknowledges approval of the completion of the step of the first job by providing to the at least one of the portable computing devices a unique identifier associated with the supervisor;
wherein the first portable computing device is further configured to receive step data associated with the first job from the operator and to provide the step data to the server computer, and wherein the first job is the manufacturing of a part and the step data includes a display of a schematic image of the part with dimensional data for the part.

2. The system of claim 1, wherein the first portable computing device is disabled from completing the first job unless the unique identifier of the supervisor is associated with the step.

3. The system of claim 1, wherein the first portable computing device in association with the first job is further configured to execute a discrepant routine in connection with a deviation in the part wherein the operator provides discrepant information related to the first job and the supervisor reviews the discrepant information and indicates approval of the deviation by providing the at least one of the portable computing devices the unique identifier associated with the supervisor.

4. The system of claim 3, wherein the plurality of portable computing devices each further includes an antenna and the network associated with the plurality of portable computing devices and the server computer includes a wireless network.

5. A method of tracking a plurality of manufacturing related jobs in a facility assigned to a plurality of operators and to track approval of the plurality of jobs by at least one supervisor, the method comprising the steps of:
storing job information for at least a first job on a computer having a processor unit and a storage device;
linking a plurality of portable computing devices to the computer;
assigning the first job to an assigned operator of the plurality of operators;
providing an assigned computing device of a plurality of portable computing devices to the assigned operator;
determining the assigned computing device provided to the assigned operator;
issuing the job information for the first job to the assigned operator through the assigned computing device;
enabling the assigned operator to carry the assigned computing device to locations for performing the first job;
receiving a job status from the assigned computing device for the first job, wherein a first job status indicates that the first job is in a setup mode and a second job status indicates that the first job is in a production mode; and
receiving a unique identifier associated with the supervisor acknowledging approval of the first job, the unique identifier received by at least one of the plurality of computing devices.

6. The method of claim 5, further comprising the step of: collecting, storing and processing manufacturing information for the first job on the computer.

7. The method of claim 6, wherein the step of storing job information for the first job on the computer includes the step of storing sketch data associated with first job.

8. The method of claim 7, wherein the step of collecting, storing and processing manufacturing information for the first job on the computer includes the step of notifying the one of the plurality of operators of changes in sketch data for parts associated with the first job.

9. The method of claim 6, wherein the step of collecting, storing and processing manufacturing information for the first job on the computer includes the steps issuing an alert specific to the first job, and wherein the alert is sent to at least the assigned computing device.

10. The method of claim 6, wherein the step of storing job information for the first job on the computer includes the step of storing manufacturing procedures and documentation.

11. The method of claim 10, further comprising the step of accessing the manufacturing procedures and documentation from one of the plurality of portable computing devices.

12. The method of claim 11, wherein the step of storing job information for the first job on the computer includes the step of storing sketch data associated with the first job.

13. The method of claim 12, wherein the step of collecting, storing and processing manufacturing information for the first job on the computer includes the step of notifying at least the assigned operator of changes in sketch data for parts associated with the first job.

14. The method of claim 13, wherein the step of collecting, storing and processing manufacturing information for the first job on the computer includes the steps issuing an alert specific to the first job, and wherein the alert is sent to at least the assigned computing device associated with the first job.

15. The method of claim 8, wherein the step of collecting, storing and processing manufacturing information for the first job on the computer includes the steps of issuing an alert specific to the first job, and wherein the alert is sent to at least the assigned computing device associated with the first job.

16. The method of claim 5, further comprising tracking the time allocation of the assigned operator through the assigned computing device.

17. The method of claim 16, wherein the step of tracking the time allocation of the assigned operator includes tracking the time allocation of the assigned operator in the setup mode and the time allocation of the assigned operator in the production mode separately.

18. The method of claim 17, wherein the step of tracking the time allocation of the assigned operator includes tracking excess time of the assigned operator when the assigned operator is neither in the setup mode or the production mode.

19. The method of claim 5, further comprising:

displaying a schematic image of a part to be manufactured during the first job, and including dimension data of the part on the schematic image.

* * * * *